(12) United States Patent
DeCock et al.

(10) Patent No.: US 9,531,210 B2
(45) Date of Patent: Dec. 27, 2016

(54) MONITOR AND CONTROL MODULE AND METHOD

(71) Applicants: Bart DeCock, Wespelaar (BE);
Bernard Gentinne, Auderghem (BE)

(72) Inventors: Bart DeCock, Wespelaar (BE);
Bernard Gentinne, Auderghem (BE)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 576 days.

(21) Appl. No.: 13/753,832

(22) Filed: Jan. 30, 2013

(65) Prior Publication Data
US 2014/0210272 A1  Jul. 31, 2014

(51) Int. Cl.
*H02J 7/00* (2006.01)

(52) U.S. Cl.
CPC ............ *H02J 7/0063* (2013.01); *H02J 7/0016* (2013.01); *H02J 7/0021* (2013.01); *Y10T 307/685* (2015.04)

(58) Field of Classification Search
CPC .............................. H02J 7/0019; H02J 7/0063
USPC ........................................................ 307/77
See application file for complete search history.

(56) References Cited

U.S. PATENT DOCUMENTS

| | | | | |
|---|---|---|---|---|
| 3,555,309 | A * | 1/1971 | Limberg | 327/540 |
| 6,891,352 | B2 * | 5/2005 | Miyazaki et al. | 320/118 |
| 7,876,071 | B2 | 1/2011 | Chen et al. | |
| 2004/0239545 | A1 | 12/2004 | Tsai et al. | |
| 2008/0094042 | A1 * | 4/2008 | Ferrario | G03B 15/05 323/234 |
| 2008/0185994 | A1 | 8/2008 | Altemose | |
| 2008/0238432 | A1 | 10/2008 | Botker et al. | |
| 2008/0309317 | A1 * | 12/2008 | Chen et al. | 324/72 |
| 2009/0091332 | A1 * | 4/2009 | Emori et al. | 324/537 |
| 2009/0278625 | A1 * | 11/2009 | Chen et al. | 333/181 |
| 2010/0283473 | A1 | 11/2010 | Vandensande | |
| 2011/0109270 | A1 * | 5/2011 | Nakao | 320/116 |
| 2012/0161707 | A1 * | 6/2012 | Kim | 320/118 |
| 2012/0161708 | A1 * | 6/2012 | Miura et al. | 320/118 |
| 2012/0194135 | A1 * | 8/2012 | Mizoguchi | H02J 7/0016 320/118 |
| 2012/0249074 | A1 * | 10/2012 | Tsuchiya | G01R 31/3658 320/116 |
| 2013/0026994 | A1 * | 1/2013 | Morikawa | G01R 31/3658 320/134 |

FOREIGN PATENT DOCUMENTS

JP   2001231178 A   2/2000

OTHER PUBLICATIONS

Stephen W. Moore and Peter J. Schneider (Delphi Automotive Systems), A Review of Cell Equalization Methods for Lithium Ion and Lithium Polymer Battery Systems, Society of Automotive Engineers, Inc., 2001, 5 pages, 2001-01-0959.

(Continued)

*Primary Examiner* — Rexford Barnie
*Assistant Examiner* — Thai Tran
(74) *Attorney, Agent, or Firm* — Rennie William Dover

(57) ABSTRACT

A method and module for monitoring a voltage of a power cell, sampling and holding a voltage of the power cell, and balancing a voltage of the power cell. In accordance with an embodiment, an interface circuit is capable of operation in a plurality of operating modes. In accordance with another embodiment, the interface circuit is coupled to a filter section.

20 Claims, 18 Drawing Sheets

(56) References Cited

OTHER PUBLICATIONS

Linear Technology Corporation, Datasheet for LTC6803-1/LTC6803-3, Multicell Battery Stack Monitor, 2011, pp. 1-40.
Analog Device, Datasheet AD7280, Rev. PrF, Lithium Ion Battery Monitoring System, 2007, pp. 1-38.
ATMEL, Datasheet Atmel ATA6870, 9116D-AUTO-03/11, Li-Ion, NiMH Battery Measuring Charge Balancing and Power-supply Circuit, 2011, pp. 1-54.
Texas Instruments, Datasheet bq76PL536, 3 to 6 Series Cell Lithium-Ion Battery Monitor and Secondary Protection IC for EV and HEV Applications, Jul. 2010, www.ti.com, pp. 1-58.
Texas Instruments, Datasheet bq77PL900, Five to Ten Series Cell Lithium-Ion or Lithium-Polymer Battery Protector and Analog Front End, Jan. 2009, www.ti.com, pp. 1-60.
INTERSIL, Datasheet ISL9216, ISL9217, FN6488.1, 8 to 12 Cell Li-Ion Battery Overcurrent Protection and Analog Front End Chip Set, Nov. 2, 2007, pp. 1-33.
Maxim Integrated Products, Datasheet MAX11068, 19-5192; Rev 0; Jun. 2010, 12-Channel, High-Voltage Sensor, Smart Data-Acquisition Interface, 2010, pp. 1-82.

\* cited by examiner

MONITOR AND CONTROL MODULE AND METHOD

BACKGROUND

The present invention relates, in general, to electronics and, more particularly, to methods of forming semiconductor devices and structure.

Power storage units are used in many applications including automotive, aerospace, airline, nautical, computer, communications, heavy equipment, remote sensing, etc. The power storage units may serve as a power supply or a battery that provides a particular rated voltage to drive an electrical load. The power storage units may be comprised of a number of individual battery cells that are connected in parallel or in series. The lifetime of the battery is strongly dependent on the way in which the battery is charged and discharged and will be reduced by over-charging the cells or over-discharging the cells. In addition, it is desirable to keep all the cells of a battery stack at the same capacity. This corresponds to keeping all the cells at about the same open circuit voltage. Use of the battery and over-discharge of one cell will impact the lifetime of that cell and of the battery. Battery manufacturers are constantly striving to find better and more accurate measurement techniques for measuring the voltage across battery cells. Along with improving measurement techniques, battery manufacturers are searching for ways to balance the cell voltages within a battery stack.

Accordingly, it would be advantageous to have a circuit and a method for monitoring and balancing the voltage of a battery stack and the voltages of the cells within a battery stack. It would of further advantage for the circuit and method to be cost efficient.

BRIEF DESCRIPTION OF THE DRAWINGS

The present invention will be better understood from a reading of the following detailed description, taken in conjunction with the accompanying drawing figures, in which like reference characters designate like elements and in which.

Figure 1:
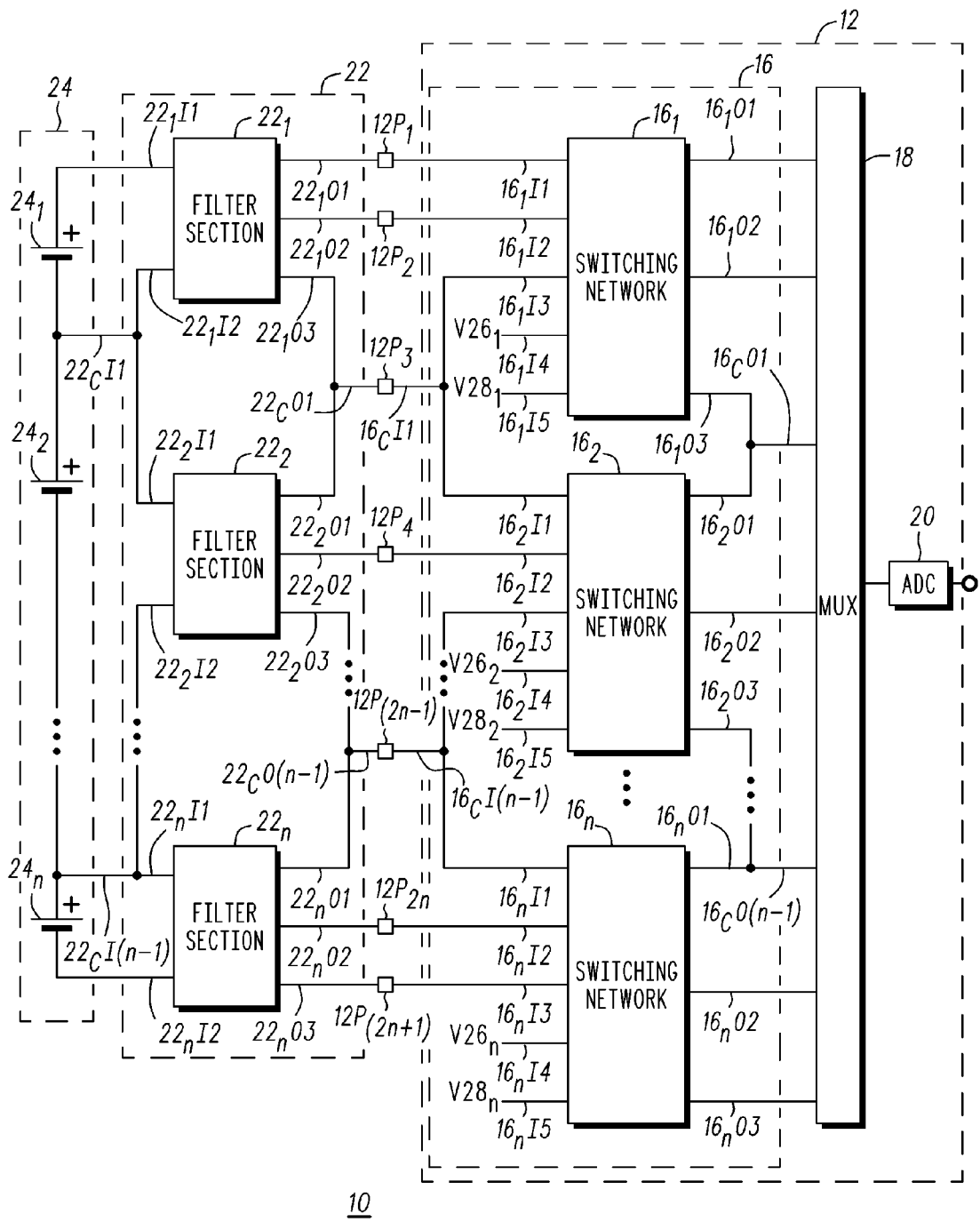
FIG. 1 is a block diagram of a portion of a battery monitoring and balancing system in accordance with an embodiment of the present invention.

For simplicity and clarity of illustration, elements in the figures are not necessarily to scale, and the same reference characters in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or an anode of a diode, and a control electrode means an element of the device that controls current flow through the device such as a gate of an MOS transistor or a base of a bipolar transistor. Although the devices are explained herein as certain n-channel or p-channel devices, or certain n-type or p-type doped regions, a person of ordinary skill in the art will appreciate that complementary devices are also possible in accordance with embodiments of the present invention. It will be appreciated by those skilled in the art that the words during, while, and when as used herein are not exact terms that mean an action takes place instantly upon an initiating action but that there may be some small but reasonable delay, such as a propagation delay, between the reaction that is initiated by the initial action and the initial action. The use of the words approximately, about, or substantially means that a value of an element has a parameter that is expected to be very close to a stated value or position. However, as is well known in the art there are always minor variances that prevent the values or positions from being exactly as stated. It is well established in the art that variances of up to about ten percent (10%) (and up to twenty percent (20%) for semiconductor doping concentrations) are regarded as reasonable variances from the ideal goal of exactly as described.

It should be noted that a logic zero voltage level ($V_L$) is also referred to as a logic low voltage or logic low voltage level and that the voltage level of a logic zero voltage is a function of the power supply voltage and the type of logic family. For example, in a Complementary Metal Oxide Semiconductor (CMOS) logic family a logic zero voltage may be thirty percent of the power supply voltage level. In a five volt Transistor-Transistor Logic (TTL) system a logic zero voltage level may be about 0.8 volts, whereas for a five volt CMOS system, the logic zero voltage level may be about 1.5 volts. A logic one voltage level ($V_H$) is also referred to as a logic high voltage level, a logic high voltage, or a logic one voltage and, like the logic zero voltage level, the logic high voltage level also may be a function of the power supply and the type of logic family. For example, in a CMOS system a logic one voltage may be about seventy percent of the power supply voltage level. In a five volt TTL system a logic one voltage may be about 2.4 volts, whereas for a five volt CMOS system, the logic one voltage may be about 3.5 volts.

DETAILED DESCRIPTION

Generally, the present invention provides a module and a method for, among other things, balancing a voltage of a component such as, for example, a component comprising one or more power cells. In accordance with an embodiment of the present invention, an interface circuit is operated in an operating mode to monitor a voltage of a first component, operated in another operating mode to sample the voltage of the first component, and operated in yet another operating mode to balance the voltage of the first component.

In accordance with various embodiments, the module includes a monolithically integrated interface or switching network and elements such as, for example, a transistor and a resistor, or a resistor that are monolithically integrated with the interface or switching network to accomplish balancing.

In accordance with another embodiment of the present invention, a method for interfacing with one or more power cells is provided that comprises monitoring a voltage of a first power cell of the one or more power cells in response to configuring a first switching element in a first switching element configuration and a second switching element in a second switching element configuration, generating a sampled voltage from the first power cell and holding the sampled voltage in response to the first switching element being in the second switching element configuration and the second switching element being in the second switching element configuration, and balancing the voltage of the first power cell in response to the second switching element being in the first switching element configuration.

In accordance with another embodiment, a module is provided that comprises a first switching network having first, second, and third terminals, a first energy storage element coupled between the first and second terminals of the first switching network, a first impedance element coupled to the first terminal of the first switching network, and a second impedance element coupled to the third terminal of the first switching network.

FIG. 1 is a block diagram of a power cell monitor and control circuit 10 comprising a control module 12 connected to a filter circuit 22. Power cell monitor and control circuit 10 is connected to a power storage unit 24. Control module 12 includes an interface network 16 having inputs that are connected to or, alternatively, that serve as inputs of control module 12 and outputs that are connected to the inputs of a multiplexer (MUX) 18, which has an output connected to an analog-to-digital converter (ADC) 20. Power storage unit 24 may be comprised of a plurality of power cells $24_1$, $24_2$, ..., $24_n$, which are connected to corresponding filter sections $22_1$, $22_2$, ..., $22_n$, respectively, of control circuit 10. Alternatively, the power storage units may be comprised of capacitors, fuel cells, batteries, or the like. Interface network 16 may be comprised of a plurality of switching elements $16_1$, $16_2$, ..., $16_n$, where switching element $16_1$ has input terminals $16_1 I1$, $16_1 I2$, $16_1 I3$, $16_1 I4$, and $16_1 I5$ and output terminals $16_1 O1$, $16_1 O2$, and $16_1 O3$; switching element $16_2$ has input terminals $16_2 I1$, $16_2 I2$, $16_2 I3$, $16_2 I4$, and $16_2 I5$ and output terminals $16_2 O1$, $16_2 O2$, and $16_2 O3$; and switching element $16_n$ has input terminals $16_n I1$, $16_n I2$, $16_n I3$, $16_n I4$, and $16_n I5$ and output terminals $16_n O1$, $16_n O2$, and $16_n O3$. In accordance with an embodiment, input terminal $16_1 I3$ is connected to input terminal $16_2 I1$ to form an input terminal $16_C O1$ and input terminal $16_{(n-1)} I3$ is connected to an input terminal $16_n I1$ to form an input terminal $16_C I(n-1)$; output terminal $16_1 O3$ is connected to output terminal $16_2 O1$ to form an output terminal $16_C O1$ and output terminal $16_{(n-1)} O3$ is connected to output terminal $16_n O1$ to form an output terminal $16_C O(n-1)$. It should be noted that the subscript "n" represents an integer.

In accordance with another embodiment, control module 12 is a monolithically integrated semiconductor device in a semiconductor package having input pins or leads $12P_1$, $12P_2$, $12P_3$, $12P_4$, ..., $12P_{(2n-1)}$, $12P_{2n}$, and $12P_{(2n+1)}$, wherein n represents an integer. By way of example, input terminals $16_1 I1$, $16_1 I2$, $16_C I1$, $16_2 I2$, ..., $16_C I(n-1)$, $16_n I2$, and $16_n I3$ are connected to input pins $12P_1$, $12P_2$, $12P_3$, $12P_4$, ..., $12P_{(2n-1)}$, $12P_{2n}$, and $12P_{(2n+1)}$, respectively. Although, input terminals $16_1 I1$, $16_1 I2$, $16_C I1$, $16_2 I2$, ..., $16_C I(n-1)$, $16_n I2$, and $16_n I3$ are shown as being directly connected to input pins $12P_1$, $12P_2$, $12P_3$, $12P_4$, ..., $12P_{(2n-1)}$, $12P_{2n}$, and $12P_{(2n+1)}$, respectively, this is not a limitation of the present invention and they can be connected to each other through other circuit elements. Alternatively, input terminals $16_1 I1$, $16_1 I2$, $16_C I1$, $16_2 I2$, ..., $16_C I(n-1)$, $16_n I2$, and $16_n I3$ may serve as input pins $12P_1$, $12P_2$, $12P_3$, $12P_4$, ..., $12P_{(2n-1)}$, $12P_{2n}$, and $12P_{(2n+1)}$, respectively.

In accordance with another embodiment, control module 12 and filter section 22 are monolithically integrated to form an integrated semiconductor device. In embodiments in which control module 12 and filter section 22 are monolithically integrated, input pins $12P_1$, $12P_2$, $12P_3$, $12P_4$, ..., $12P_{(2n-1)}$, $12P_{2n}$, and $12P_{(2n+1)}$, are absent and input terminals $22_1 I1$, $22_C I1$, $22_C I(n-1)$, and $22_n I2$ serve as or, alternatively, are connected to input pins.

Input terminals $16_1 I4$ and $16_1 I5$ of switching element $16_1$ are coupled for receiving control signals $V26_1$ and $V28_1$, respectively; input terminals $16_2 I4$ and $16_2 I5$ of switching element $16_2$ are coupled for receiving control signals $V26_2$ and $V28_2$, respectively; and input terminals $16_n I4$ and $16_n I5$ of switching element $16_n$ are coupled for receiving control signals $V26_n$ and $V28_n$, respectively.

Output terminals $16_1O1$, $16_1O2$, $16_CO1$, $16_2O2$, ..., $16_CO(n-1)$, $16_nO2$, and $16_nO3$ of switching elements $16_1, \ldots, 16_n$ are connected to corresponding input terminals of MUX 18.

Filter 22 is comprised of a plurality of filter sections $22_1$, $22_2, \ldots, 22_n$, wherein each filter section includes input terminals connected to corresponding power cells of a power storage unit 24 and output terminals connected to corresponding input pins of interface network 16. Filter section $22_1$ has input terminals $22_1I1$ and $22_1I2$ and output terminals $22_1O1$, $22_1O2$, and $22_1O3$; filter section $22_2$ has input terminals $22_2I1$ and $22_2I2$ and output terminals $22_2O1$, $22_2O2$, and $22_2O3$; and filter section $22_2$ has input terminals $22_nI1$ and $22_nI2$ and output terminals $22_nO1$, $22_nO2$, and $22_nO3$. In accordance with an embodiment, input terminal $22_1I2$ is connected to input terminal $22_2I1$ to form an input terminal $22_CI1$ and input terminal $22_{(n-1)}I2$ is connected to input terminal $22_nI1$ to form an input terminal $22_CI(n-1)$. Output terminal $22_1O3$ is connected to output terminal $22_2O1$ to form an output terminal $22_CO1$ and output terminal $22_{(n-1)}O3$ is connected to output terminal $22_nO1$ to form an output terminal $22_CO(n-1)$. In accordance with embodiments in which control module 12 is a monolithically integrated semiconductor device and filter 22 is formed from discrete circuit elements, output terminals $22_1O1$, $22_1O2$, $22_CO1$, $22_2O2, \ldots, 22_CO(n-1)$, $22_nO2$, $22_nO3$ are connected to input pins $12P_1$, $12P_2$, $12P_3$, $12P_4, \ldots, 12P_{(2n-1)}$, $12P_{2n}$, and $12P_{(2n+1)}$, respectively.

Input terminal $22_nI1$ is connected to the positive terminal of power cell $24_1$ and input terminal $22_CI1$ is connected to the negative and positive terminals of power cells $24_1$ and $24_2$, respectively. Input terminal $22_CI(n-1)$ is connected to the positive terminal of power cell $24_n$. Input terminal $22_nI2$ is connected to the negative terminal of power cell $24_n$.

It should be noted that the numbers of switching elements $16_1$, $16_2, \ldots, 16_n$, filter sections $22_1$, $22_2, \ldots, 22_n$, and power cells $24_1$, $24_2, \ldots, 24_n$, are not limitations of the present invention.

Figure 2:
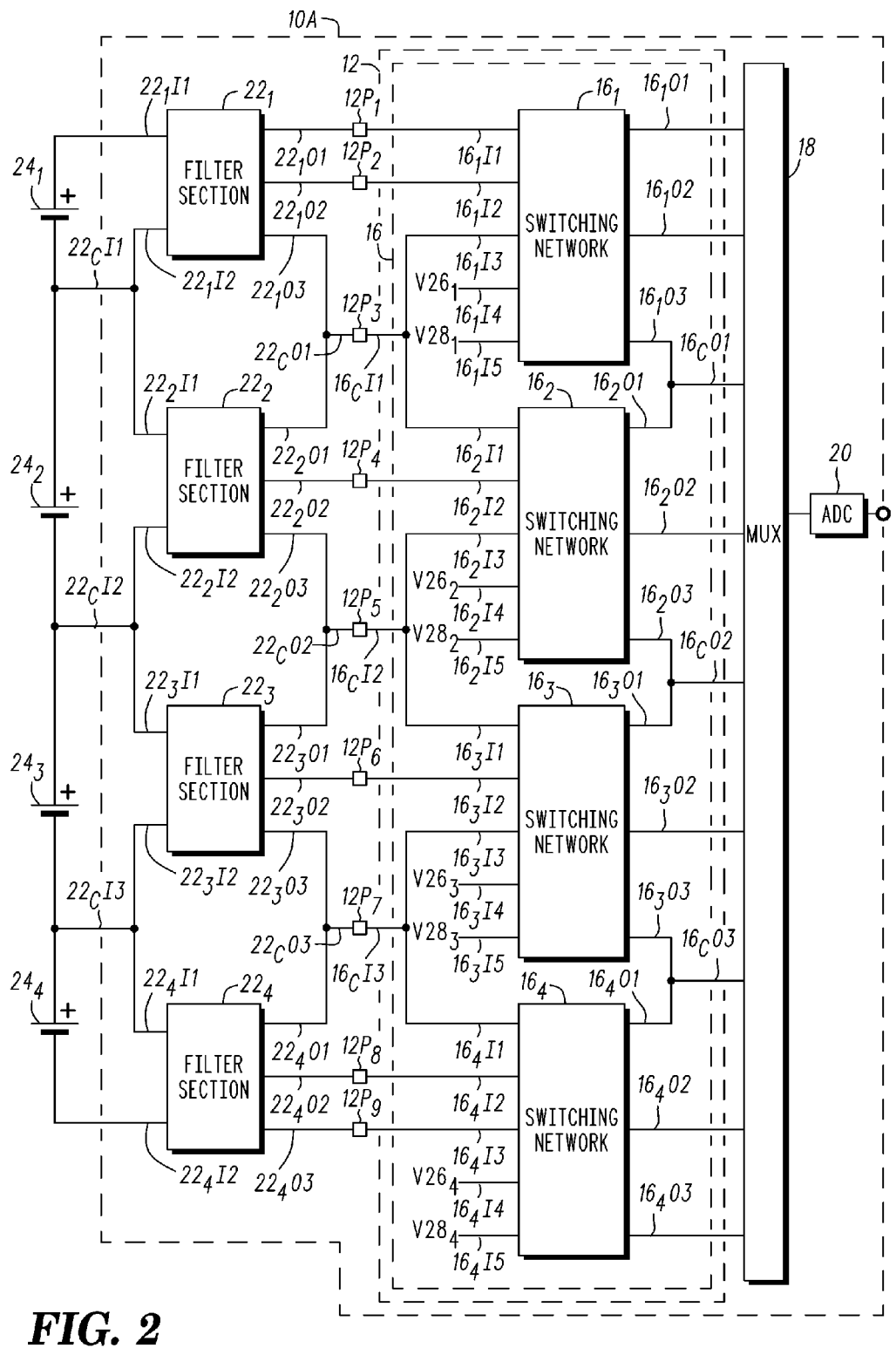
FIG. 2 is a block diagram of a portion of a battery monitoring and balancing system in accordance with another embodiment of the present invention.

For the sake of completeness, FIG. 2 is included to illustrate a power cell monitor and control circuit 10A comprising four switching elements $16_1$, $16_2$, $16_3$, and $16_4$ connected to four filter sections $22_1$, $22_2$, $22_3$, and $22_4$, respectively. Thus, control circuit 10A is connected to four power storage units $24_1$, $24_2$, $24_3$, and $24_4$. Although four switching elements, four filter sections, and four power storage units are shown in FIG. 2, this is not a limitation of the present invention, i.e., there may be more than four or fewer than four switching elements, filter sections, and power storage units. More particularly, switching element $16_1$ has input terminals $16_1I1$, $16_1I2$, $16_1I3$, $16_1I4$, and $16_1I5$ and output terminals $16_1O1$, $16_1O2$, and $16_1O3$; switching element $16_2$ has input terminals $16_2I1$, $16_2I2$, $16_2I3$, $16_2I4$, and $16_2I5$ and output terminals $16_2O1$, $16_2O2$, and $16_2O3$; switching element $16_3$ has input terminals $16_3I1$, $16_3I2$, $16_3I3$, $16_3I4$, and $16_3I5$ and output terminals $16_3O1$, $16_3O2$, and $16_3O3$; and switching element $16_4$ has input terminals $16_4I1$, $16_4I2$, $16_4I3$, $16_4I4$, and $16_4I5$ and output terminals $16_4O1$, $16_4O2$, and $16_4O3$. In accordance with an embodiment, input terminal $16_1I3$ may be connected to input terminal $16_2I1$ to form an input terminal $16_CI1$, input terminal $16_2I3$ may be connected to input terminal $16_3I1$ to form an input terminal $16_CI2$ and input terminal $16_3I3$ is connected an input terminal $16_4I1$ to form an input terminal $16_CI3$, output terminal $16_1O3$ may be connected to output terminal $16_2O1$ to form an output terminal $16_CO1$, output terminal $16_2O3$ may be connected to output terminal $16_3O1$ to form an output terminal $16_CO2$, and output terminal $16_3O3$ may be connected to output terminal $16_4O1$ to form an output terminal $16_CO3$.

Input terminals $16_1I4$ and $16_1I5$ of switching element $16_1$ are coupled for receiving control signals $V26_1$ and $V28_1$, respectively; input terminals $16_2I4$ and $16_2I5$ of switching element $16_2$ are coupled for receiving control signals $V26_2$ and $V28_2$, respectively; input terminals $16_3I4$ and $16_3I5$ of switching element $16_3$ are coupled for receiving control signals $V26_3$ and $V28_3$, respectively; and input terminals $16_4I4$ and $16_4I5$ of switching element $16_4$ are coupled for receiving control signals $V26_4$ and $V28_4$, respectively.

Output terminals $16_1O1$, $16_1O2$, $16_CO1$, $16_2O2$, $16_CO2$, $16_3O2$, $16_CO3$, $16_4O2$, and $16_4O3$ of switching elements $16_1$, $16_2$, $16_3$, and $16_4$, respectively, are connected to corresponding input terminals of MUX 18.

Filter 22 is comprised of a plurality of filter sections $22_1$, $22_2$, $22_3$, and $22_4$, wherein each filter section includes input terminals connected to corresponding power cells $24_1$, $24_2$, $24_3$, and $24_4$ of a power storage unit 24 and output terminals connected to corresponding input pins of switching elements of control module 12. Filter section $22_1$ has input terminals $22_1I1$ and $22_1I2$ and output terminals $22_1O1$, $22_1O2$, and $22_1O3$; filter section $22_2$ has input terminals $22_2I1$ and $22_2I2$ and output terminals $22_2O1$, $22_2O2$, and $22_2O3$; filter section $22_3$ has input terminals $22_3I1$ and $22_3I2$ and output terminals $22_3O1$, $22_3O2$, and $22_3O3$; and filter section $22_4$ has input terminals $22_4I1$ and $22_4I2$ and output terminals $22_4O1$, $22_4O2$, and $22_4O3$. In accordance with an embodiment, input terminal $22_1I2$ is connected to input terminal $22_2I1$ to form an input terminal $22_CI1$, input terminal $22_2I2$ is connected to input terminal $22_3I1$ to form an input terminal $22_CI2$, and input terminal $22_3I2$ is connected to input terminal $22_4I1$ to form an input terminal $22_CI3$. Input terminal $22_nI1$ is connected to the positive terminal of power cell $24_1$ and input terminal $22_CI1$ is connected to the negative and positive terminals of power cells $24_1$ and $24_2$, respectively. Input terminal $22_CI2$ is connected to the negative and positive terminals of power cells $24_2$ and $24_3$, respectively. Input terminal $22_CI3$ is connected to the negative and positive terminals of power cells $24_3$ and $24_4$, respectively. Input terminal $22_4I2$ is connected to the negative terminal of power cell $24_4$.

Output terminal $22_1O3$ may be connected to output terminal $22_2O1$ to form an output terminal $22_CO1$, output terminal $22_2O3$ may be connected to output terminal $22_3O1$ to form an output terminal $22_CO2$, and output terminal $22_3O3$ may be connected to output terminal $22_4O1$ to form an output terminal $22_CO3$. Output terminal $22_1O1$ is connected to input pin $12P_1$; output terminal $22_1O2$ is connected to input pin $12P_2$; output terminal $22_CO1$ is connected to input pin $12P_3$; output terminal $22_2O2$ is connected to input pin $12P_4$; output terminal $22_CO2$ is connected to input pin $12P_5$; output terminal $22_3O2$ is connected to input pin $12P_6$; output terminal $22_CO3$ is connected to input pin $12P_7$; output terminal $22_4O2$ is connected to input pin $12P_8$; and output terminal $22_4O3$ is connected to input pin $12P_9$.

Figure 3:
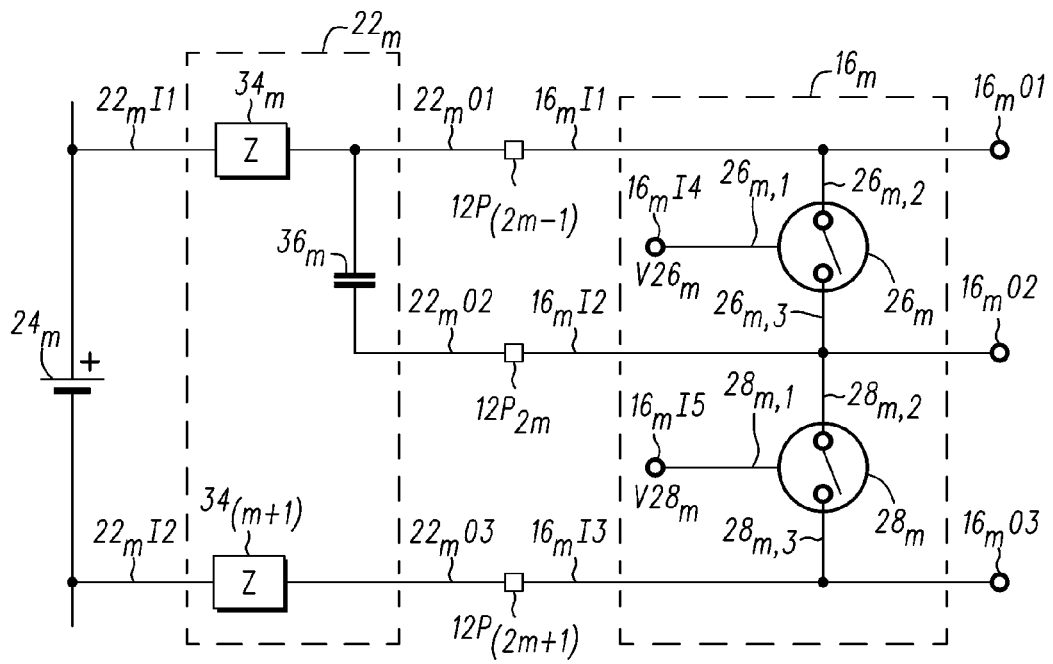
FIG. 3 is a schematic diagram of a portion of a battery monitoring and balancing system in accordance with another embodiment of the present invention.

FIG. 3 is a circuit schematic of a switching element or section $16_m$ of interface network 16 (described with reference to FIGS. 1 and 2) connected to a power cell $24_m$ through a filter section $22_m$ in accordance with another embodiment of the present invention. It should be noted that switching elements $16_1$, $16_2, \ldots, 16_n$ in FIG. 1 are comprised of switching elements $16_m$ and that the variable m is used to represent integers $1, 2, \ldots,$ n. For example, switching element $16_1$ corresponds to switching element $16_m$, where m is replaced by 1, switching element $16_2$ corresponds to switching element $16_m$, where m is replaced by 2, and switching element $16_2$ corresponds to switching element $16_m$, where m is replaced by n. Similarly, switching elements $16_1$, $16_2$, $16_3$, $16_4$ in FIG. 2 are comprised of switching elements $16_m$ where the variable m is used to represent integers 1, 2, 3, and 4. For example, switching element $16_1$ corresponds to switching element $16_m$, where m is replaced by 1, switching element $16_2$ corresponds to switching element $16_m$, where m is replaced by 2, switching element $16_3$ corresponds to switching element $16_m$, where m is replaced by 3, and switching element $16_4$ corresponds to switching element $16_m$, where m is replaced by 4.

Switching section $16_m$ comprises switches $26_m$ and $28_m$, wherein each switch $26_m$ and $28_m$ includes a control terminal and a pair of conduction terminals. Switch $26_m$ may be referred to as a current control element or a balancing switch and switch $28_m$ may be referred to as a sampling switch. More particularly, switch $26_m$ has a control terminal $26_{m,1}$, a conduction terminal $26_{m,2}$, and a conduction terminal $26_{m,3}$. Conduction terminal $26_{m,2}$ is connected to input terminal $16_m$I1 and to output terminal $16_m$O1. It should be noted that conduction terminal $26_{m,2}$ may be connected to terminals $16_m$I1 and $16_m$O1 or, alternatively, terminals $16_m$I1 and $16_m$O1 may form an input/output terminal. Switch $28_m$ has a control terminal $28_{m,1}$, a conduction terminal $28_{m,2}$, and a conduction terminal $28_{m,3}$. Conduction terminal $28_{m,2}$ is connected to conduction terminal $26_{m,3}$ and to terminals $16_m$I2 and $16_m$O2. Conduction terminal $28_{m,3}$ is connected to input terminal $16_m$I3 and to output terminal $16_m$O3. It should be noted that conduction terminal $28_{m,3}$ may be connected to terminals $16_m$I3 and $16_m$O3 or alternatively, terminals $16_m$I3 and $16_m$O3 may form an input/output terminal. It should be further noted that terminals $26_{m,1}$ correspond to terminals $16_1$I4, $16_2$I4, . . . , $16_1$I4 of FIG. 1 and terminals $28_{m,1}$ correspond to terminals $16_1$I5, $16_2$I5, . . . , $16_n$I5 of FIG. 1.

Filter section $22_m$ comprises an impedance element $34_m$ having a terminal connected to or, alternatively, serving as input terminal $22_m$I1 and a terminal connected to or, alternatively, serving as output terminal $22_m$O1. Output terminal $22_m$O1 may be connected to output terminal $22_m$O2 through an energy storage element $36_m$. Input terminal $22_m$I2 may be connected to output terminal $22_m$O3 through an impedance element $34_{(m+1)}$. By way of example, impedance elements $34_m$ and $34_{(m+1)}$ are resistors and energy storage element $36_m$ is a capacitor. Because impedance elements $34_m$ and $34_{(m+1)}$ are not limited to being resistors, they are represented by the symbol Z in FIG. 3. In accordance with embodiments in which switching section $16_m$ is a monolithically integrated semiconductor device or a portion of a monolithically integrated semiconductor device and circuit elements $34_m$, $34_{(m+1)}$, and $36_m$ are discrete circuit elements, circuit elements $34_m$, $34_{(m+1)}$, and $36_m$ are connected to switching section $16_m$ through input pins $12P_{(2m-1)}$, $12P_{2m}$, and $12P_{(2m+1)}$, i.e., output terminal $22_m$O1 is connected to input pin $12P_{(2m-1)}$, output terminal $22_m$O2 is connected to input pin $12P_{2m}$, and output terminal $22_m$O3 is connected to input pin $12P_{(2m+1)}$.

Power cell $24_m$ comprises a battery cell having a positive terminal connected to input terminal $22_m$I1 of filter section $22_m$ and a negative terminal connected to input terminal $22_m$I2 of filter section $22_m$.

It should be noted that output terminal $22_m$O1 is electrically connected to input terminal $16_m$I1, output terminal $22_m$O2 is electrically connected to input terminal $16_m$I2, and output terminal $22_m$O3 is electrically connected to input terminal $16_m$I3.

Still referring to FIG. 3, switching sections $16_m$ operate in at least three different operating modes including a filtering continuous observation mode, a sample and hold mode, and a balancing mode. In the continuous observation operating mode, the voltage across power cell $24_m$ is monitored by configuring switching elements $26_m$ and $28_m$ to be opened or closed. For example, the voltage across power cell $24_m$ can be monitored by applying a control voltage $V26_m$ to the control terminal of switching element $26_m$ that is suitable for opening switching element $26_m$ and applying a control voltage $V28_m$ to the control terminal of switching element $28_m$ that is suitable for closing switching element $28_m$ thereby shorting output terminal $16_m$O2 to output terminal $16_m$O3.

Closing switching element $28_m$ shorts output terminal $16_m$O2 to output terminal $16_m$O3 and capacitor $36_m$ is substantially charged to the voltage of power cell $24_m$, i.e., capacitor $36_m$ is charged to a voltage substantially equal to the voltage across power cell $24_m$. The voltage across capacitor $36_m$ appears across output terminals $16_m$O1 and $16_m$O2. MUX 18 (shown in FIGS. 1 and 2) is configured to transmit the voltage at output terminals $16_m$O1 and $16_m$O2 to analog-to-digital converter 20. Thus, a voltage representing the filtered voltage of power cell $24_m$ is transmitted to ADC 20, thereby observing or monitoring the voltage across power cell $24_m$.

In the sample and hold operating mode, the voltage across power cell $24_m$ can be sampled and stored or held by applying a control voltage $V26_m$ to the control terminal of switching element $26_m$ that is suitable for opening switching element $26_m$ and a control voltage $V28_m$ to the control terminal of switching element $28_m$ suitable for closing switching element $28_m$ thereby shorting output terminal $16_m$O2 to output terminal $16_m$O3. Capacitor $36_m$ is charged to a voltage substantially equal to the voltage across power cell $24_m$, i.e., capacitor $36_m$ samples the voltage of power cell $24_m$.

After sampling the voltage on power cell $24_m$, the control voltage $V26_m$ suitable for opening switching element $26_m$ is maintained at the control terminal of switching element $26_m$ and a control voltage $V28_m$ suitable for opening switching element $28_m$ is applied to the control terminal of switching element $28_m$. MUX 18 and ADC 20 (shown in FIGS. 1 and 2) are configured so that output terminals $16_m$O1 and $16_m$O2 are connected to a high impedance network. Thus, the sampled voltage appearing across capacitor $36_m$ is held. The voltage across capacitor $36_m$ appears across output terminals $16_m$O1 and $16_m$O2. MUX 18 is configured to transmit the voltage at output terminals $16_m$O1 and $16_m$O2 to analog-to-digital converter 20. Thus, a sampled voltage representing the voltage of power cell $24_m$ is transmitted to ADC 20.

In the balancing operating mode, the voltage across power cell $24_m$ can be balanced by applying a control voltage $V26_m$ to the control terminal of switching element $26_m$ that is suitable for closing switching element $26_m$ and a control voltage $V28_m$ to the control terminal of switching element $28_m$ that is suitable for closing switching element $28_m$. Accordingly, a balancing current through impedance element $34_m$, switching element $26_m$, switching element $28_m$, and impedance element $34_{(m+1)}$ discharges power cell $24_m$. Switching element $26_m$ may be referred to as a balancing switch or a switch and switching element $28_m$ may be referred to as a sampling switch or a switch.

Figure 4:
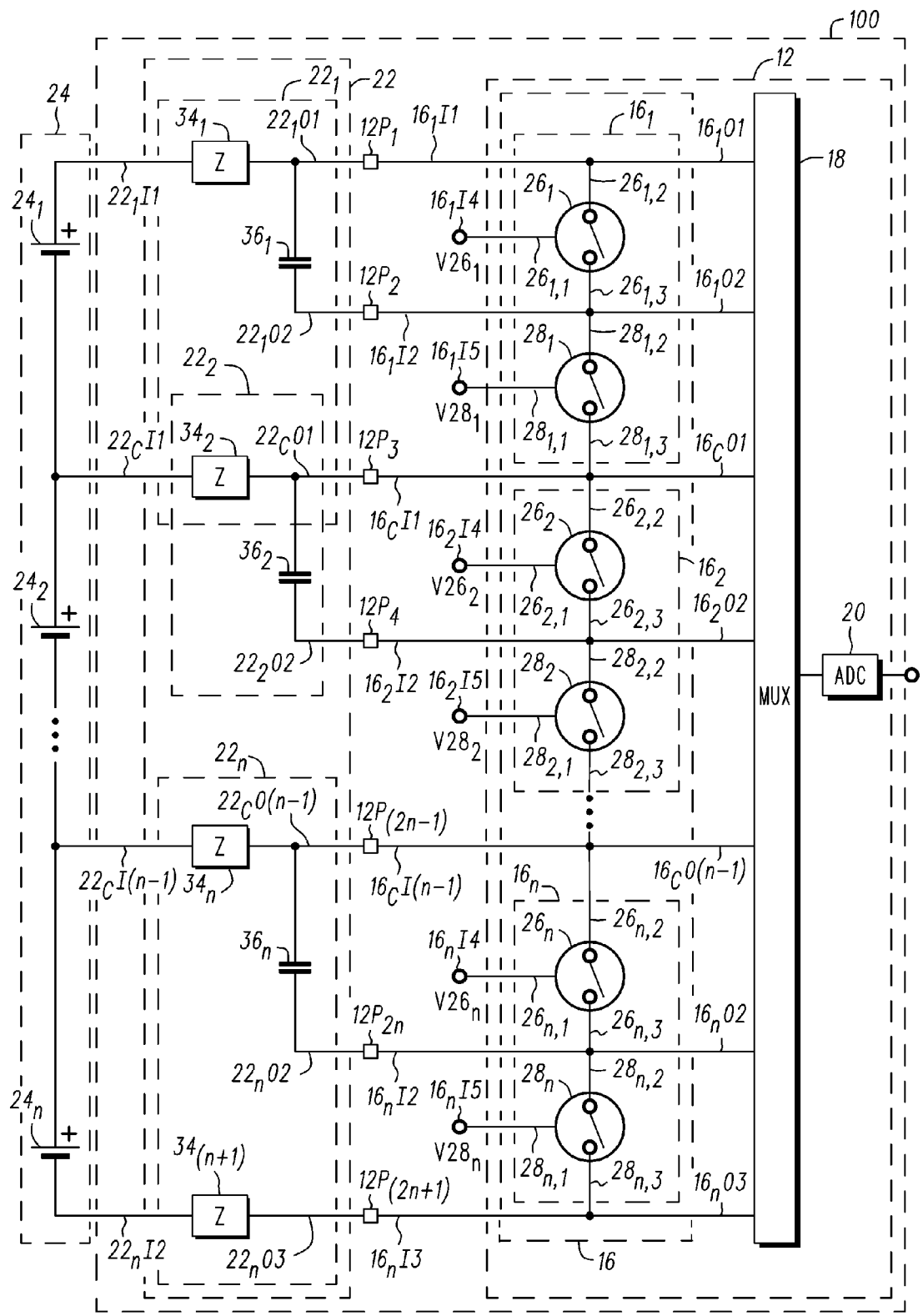
FIG. 4 is a schematic diagram of a portion of a battery monitoring and balancing system in accordance with another embodiment of the present invention.

FIG. 4 is a block diagram of a power cell monitor and control circuit 100 comprising control module 12 and filter circuit 22 as described with reference to FIG. 1, but further including the embodiments of circuit implementations of filter circuit 22 and interface circuit 16 described with reference to FIG. 3. Similar to the embodiment of FIG. 1, switching networks $16_1$, $16_2$, . . . , $16_n$ of interface network 16 shown in FIG. 4 are comprised of switching sections $16_m$ where the variable m is used to represent integers 1, 2, . . . , n as described with reference to FIG. 3. For example, switching network $16_1$ corresponds to switching section $16_m$, where m is replaced by 1, switching network $16_2$ corresponds to switching section $16_m$, where m is replaced by 2, and switching network $16_n$ corresponds to switching section $16_m$, where m is replaced by n.

Control circuit 100 is connected to a battery unit 24. As described above, control module 12 includes an interface network 16 having input terminals that are coupled to, or, alternatively, that serve as inputs of control module 12 and output terminals that are coupled to the inputs of a multiplexer (MUX) 18, which has outputs connected to analog-to-digital converter (ADC) 20. Interface network 16 has been described with reference to FIGS. 1 and 3.

Filter 22 is comprised of a plurality of filter sections $22_1$, $22_2$ . . . , $22_n$, wherein each filter section includes input terminals connected to corresponding power cells $24_1$, $24_2$, . . . , $24_n$ of a power storage unit 24 and output terminals connected to corresponding input terminals of switching networks $16_1$, $16_2$, . . . , $16_n$. Filter section $22_1$ has input terminals $22_1\text{I}1$ and $22_C\text{I}1$ and output terminals $22_1\text{O}1$, $22_1\text{O}2$, and $22_C\text{O}1$; filter section $22_2$ has input terminals $22_C\text{I}1$ and $22_C\text{I}2$ and output terminals $22_C\text{O}1$, $22_2\text{O}2$, and $22_C\text{O}2$; and filter section $22_n$ has input terminals $22_C\text{I}(n-1)$ and $22_n\text{I}2$ and output terminals $22_C\text{O}(n-1)$, $22_n\text{O}2$, and $22_n\text{O}3$.

Input terminal $22_n\text{I}1$ is connected to the positive terminal of power cell $24_1$ and input terminal $22_C\text{I}1$ is connected to the negative and positive terminals of power cells $24_1$ and $24_2$, respectively. Input terminal $22_C\text{I}(n-1)$ is connected to the positive terminal of power cell $24_n$ and input terminal $22_n\text{I}2$ is connected to the negative terminal of power cell $24_1$.

Filter section $22_1$ comprises impedance elements $34_1$ and $34_2$ and an energy storage element $36_1$. More particularly, output terminal $22_1\text{O}1$ is connected to input terminal $22_n\text{I}1$ through impedance element $34_1$ and to output terminal $22_1\text{O}2$ through energy storage element $36_1$. Input terminal $22_C\text{I}1$ is connected to output terminal $22_C\text{O}1$ through impedance element $34_2$. It should be noted that impedance element $34_2$ is common to filter sections $22_1$ and $22_2$. By way of example, impedance elements $34_1$ and $34_2$ are resistors and energy storage element $36_1$ is a capacitor.

Filter section $22_2$ comprises impedance element $34_2$ and energy storage element $36_2$. More particularly, output terminal $22_C\text{O}1$ is connected to input terminal $22_C\text{I}1$ through impedance element $34_2$ and to output terminal $22_2\text{O}2$ through energy storage element $36_2$. By way of example, energy storage element $36_2$ is a capacitor. It should be noted that similar shared components and connections exist between filter section $22_2$ and another filter section connected to filter section $22_2$ as exist between filter section $22_1$ and filter section $22_2$. For the sake of clarity, not all components of filter section $22_2$ are shown.

Filter section $22_n$ comprises impedance elements $34_n$ and $34_{(n+1)}$ and energy storage element $36_n$. More particularly, output terminal $22_C\text{O}(n-1)$ is connected to input terminal $22_C\text{I}(n-1)$ through impedance element $34_n$ and to output terminal $22_n\text{O}2$ through energy storage element $36_n$. Output terminal $22_C\text{O}(n-1)$ is also connected to input pin $12\text{P}_{(2n-1)}$. Input terminal $22_n\text{I}2$ is connected to output terminal $22_n\text{O}3$ through impedance element $34_{(n+1)}$. By way of example, impedance elements $34_n$ and $34_{(n+1)}$ are resistors and energy storage element $36_n$ is a capacitor. Because impedance elements $34_n$ and $34_{(n+1)}$ are not limited to being resistors, they are designated by the symbol Z in FIG. 4, i.e., they can be other types of impedance elements. Interface network 16 of FIG. 4 that is comprised of switching sections $16_1$, $16_2$, . . . , $16_n$ operate in at least three different operating modes including a filtering continuous observation mode, a sample and hold mode, and a balancing mode. The operating modes of interface circuit 16 have been described with reference to FIG. 3.

Figure 5:
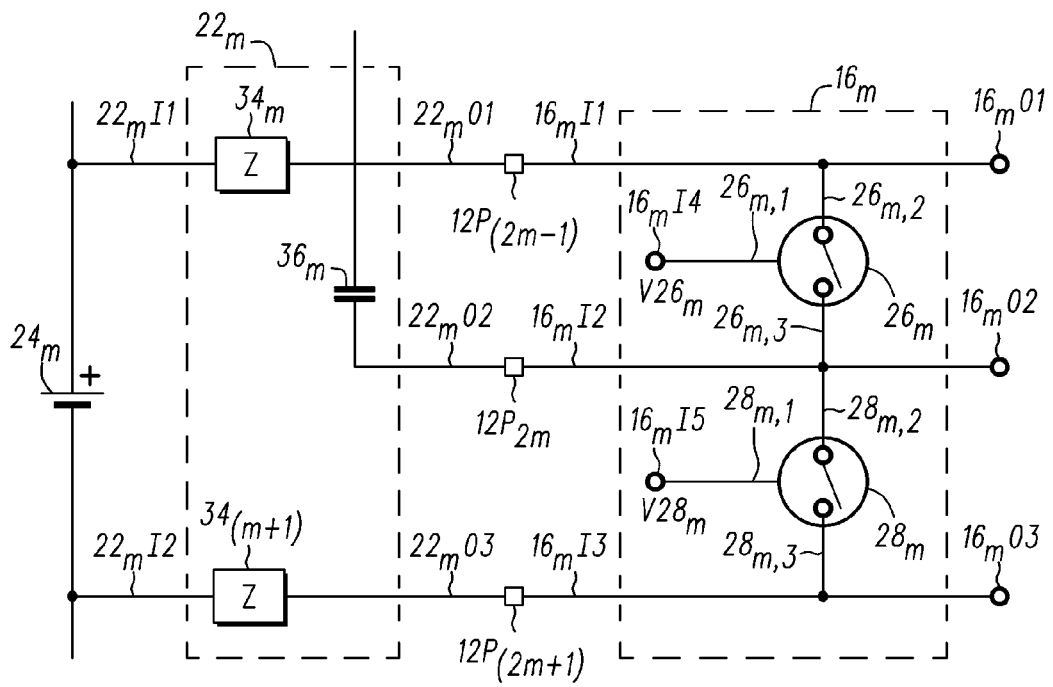
FIG. 5 a schematic diagram of a portion of a battery monitoring and balancing system in accordance with another embodiment of the present invention.

FIG. 5 is a circuit schematic of a switching section $16_m$ of interface network 16 (described with reference to FIGS. 1 and 2) connected to a power cell $24_m$ through a filter section $22_m$ in accordance with another embodiment of the present invention. It should be noted that switching networks $16_1$, $16_2$, . . . , $16_n$ in FIG. 1 are comprised of switching sections $16_m$ and that the variable m is used to represent integers 1, 2, . . . , n. For example, switching network $16_1$ corresponds to switching section $16_m$, where m is replaced by 1, switching network $16_2$ corresponds to switching section $16_m$, where m is replaced by 2, and switching network $16_n$ corresponds to switching section $16_m$, where m is replaced by n. Switching section $16_m$ of FIG. 5 is similar to switching section $16_m$ of FIG. 3, except that one of the terminals of capacitor $36_m$ is not connected to input pin $12\text{P}_{(2m-1)}$. Thus, capacitor $36_m$ has a terminal connected to input pin $12\text{P}_{2m}$ but its other terminal is shared with another circuit (shown in FIG. 6). As discussed with reference to FIG. 3, switching element $26_m$ may be referred to as a balancing switch or a switch and switching element $28_m$ may be referred to as a sampling switch or a switch.

Figure 6:
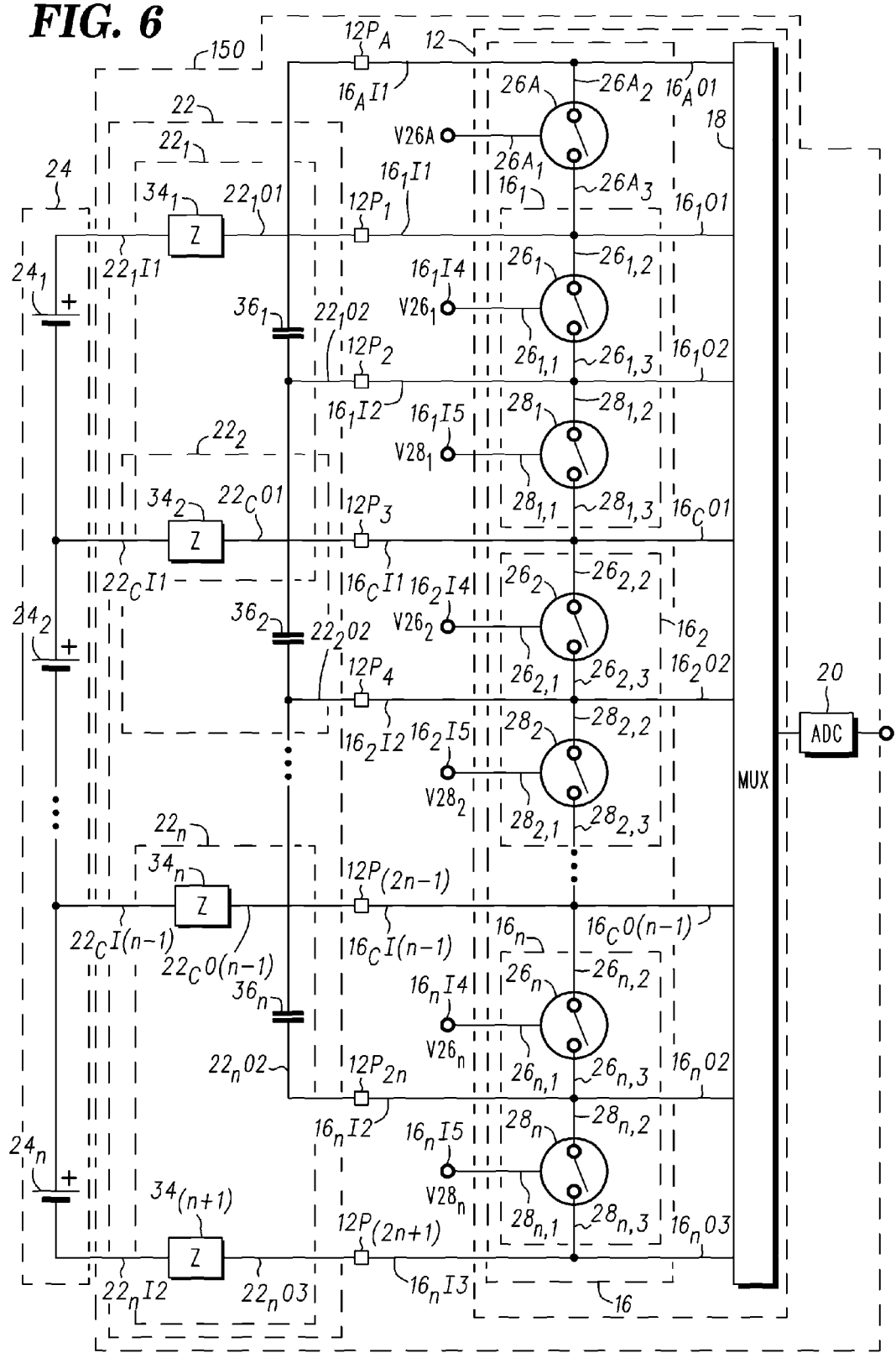
FIG. 6 is a schematic diagram of a portion of a battery monitoring and balancing system in accordance with another embodiment of the present invention.

FIG. 6 is a block diagram of a power cell monitor and control module 150 comprising control module 12 and filter circuit 22 as described with reference to FIG. 1, but further including embodiments of circuit implementations of filter circuit 22 and interface circuit 16 described with reference to FIG. 5. Control module 150 is connected to a battery unit 24. As described above, control module 12 includes an interface network 16 having input terminals that are connected to or, alternatively, that serve as inputs of control module 12 and output terminals that are connected to corresponding inputs of a multiplexer (MUX) 18, which has an output connected to an analog-to-digital converter (ADC) 20. Interface circuit 16 is comprised of switching sections $16_1$, $16_2$, . . . , $16_n$ and a switching element 26A. Switching sections $16_1$ $16_2$, . . . , $16_n$ have been described with reference to FIG. 4.

Switching element 26A has a control terminal $26\text{A}_1$ coupled for receiving a control signal V26A, a conduction terminal $26\text{A}_2$, and a conduction terminal $26\text{A}_3$. Conduction terminal $26\text{A}_2$ is connected to conduction terminal $16_4\text{I}1$ and output terminal $16_4\text{O}1$. Conduction terminal $26\text{A}_3$ is connected to input terminal $16_1\text{I}1$, output terminal $16_1\text{O}1$, and to conduction terminal $26_{1,2}$.

Output terminals $16_4\text{O}1$, $16_1\text{O}1$, $16_1\text{O}2$, $16_C\text{O}1$, $16_2\text{O}2$, . . . , $16_C\text{O}(n-1)$, $16_n\text{O}2$, $16_n\text{O}3$ are connected to corresponding input terminals of MUX 18.

Filter 22 is comprised of a plurality of filter sections $22_1$, $22_2$ . . . , $22_n$, wherein each filter section includes input terminals connected to corresponding power cells $24_1$, $24_2$, . . . , $24_n$ of a power storage unit 24 and output terminals connected to corresponding input terminals of switching networks $16_1$, $16_2$, ..., $16_n$. Filter section $22_1$ has input terminals $22_nI1$ and $22_CI1$ and output terminals $22_1O1$, $22_1O2$, and $22_CO1$; filter section $22_2$ has input terminals $22_CI1$ and $22_CI2$ and output terminals $22_CO1$, $22_2O2$, and $22_CO2$; and filter section $22_n$ has input terminals $22_CI(n-1)$ and $22_nI2$ and output terminals $22_CO(n-1)$, $22_nO2$, and $22_nO3$.

Input terminal $22_nI1$ is connected to the positive terminal of power cell $24_1$ and input terminal $22_CI1$ is connected to the negative and positive terminals of power cells $24_1$ and $24_2$, respectively. Input terminal $22_CI(n-1)$ is connected to the positive terminal of power cell $24_n$ and input terminal $22_nI2$ is connected to the negative terminal of power cell $24_n$.

Filter section $22_1$ comprises impedance elements $34_1$ and $34_2$ and energy storage element $36_1$, wherein energy storage element $36_1$ has a terminal connected to input pin $12P_A$ and a terminal connected to input pin $12P_2$. Output terminal $22_1O1$ is connected to input pin $12P_1$. Input terminal $22_CI1$ is connected to output terminal $22_CO1$ through impedance element $34_2$. It should be noted that impedance element $34_2$ is common to filter sections $22_1$ and $22_2$. By way of example, impedance elements $34_1$ and $34_2$ are resistors and energy storage element $36_1$ is a capacitor.

Filter section $22_2$ comprises impedance element $34_2$ and energy storage element $36_2$. Output terminal $22_CO1$ is connected to input pin $12P_3$. A terminal of energy storage element $36_2$ is connected to input pin $12P_2$ and the other terminal of capacitor $36_2$ is connected to input pin $12P_4$. By way of example, impedance element $34_2$ is a resistor and energy storage element $36_2$ is a capacitor. It should be noted that similar shared components and connections exist between filter section $22_2$ and another filter section connected to filter section $22_2$ as exist between filter section $22_1$ and filter section $22_2$. For the sake of clarity, not all components of filter section $22_2$ are shown.

Filter section $22_n$ comprises impedance elements $34_n$ and $34_{(n+1)}$ and energy storage element $36_n$. Output terminal $22_CO(n-1)$ is connected to input pin $12P_{(2n-1)}$. Input terminal $22_CI(n-1)$ is connected to output terminal $22_CO(n-1)$ through impedance element $34_n$ and input terminal $22_nI2$ is connected to output terminal $22_nO3$ through impedance element $34_{(n+1)}$. Output terminal $22_nO3$ is connected to input pin $12P_{(2n+1)}$. Energy storage element $36_n$ has a terminal connected to input pin $12P_{2n}$ and has a terminal connected to an adjacent filter section. For example, in accordance with an embodiment in which there are three filter sections, index n of energy storage element $36_n$ is 3, i.e., energy storage element $36_n$ is identified by reference character $36_3$ and has a terminal connected to a terminal of energy storage element $36_2$ of filter section $22_2$. By way of example, impedance elements $34_n$ and $34_{(n+1)}$ are resistors and energy storage element $36_n$ is a capacitor. Because impedance elements $34_1$, $34_2$, ..., $34_n$, $34_{(n+1)}$ are not limited to being resistors, they are identified reference characters Z, i.e., they may be other types of impedance elements.

In accordance with another embodiment, the polarities of the cells are switched such that the cells have the opposite polarities shown FIGS. 1, 2, 4, and 6.

Still referring to FIG. 6, interface network 16, which comprises switching sections $16_1$, ..., $16_n$, operates in at least three different operating modes including a filtering continuous observation mode, a differential sample and hold mode, and an internal balancing mode. In the filtering continuous observation operating mode, the voltages across power cells $24_1$, ..., $24_n$ are monitored by configuring switching elements $26_1$, ..., $26_n$ to be opened and switching elements $28_1$, ..., $28_n$, and 26A to be closed. For example, the voltage across power cell $24_1$ can be monitored in response to MUX 18 being configured to transmit the voltage at output terminals $16_AO1$ and $16_1O2$ to analog-to-digital converter 20. Thus, a voltage representing the filtered voltage of power cell $24_1$ is transmitted to ADC 20, thereby observing or monitoring the voltage across power cell $24_1$.

Similarly, the voltage across power cell $24_2$ can be monitored in response to MUX 18 being configured to transmit the voltage at output terminals $16_1O2$ and $16_2O2$ to analog-to-digital converter 20. Thus, a voltage representing the voltage of power cell $24_2$ is transmitted to ADC 20, thereby observing or monitoring the voltage across power cell $24_2$.

The voltage across power cell $24_n$ can be monitored in response to MUX 18 being configured to transmit the voltage at output terminals $16_{(n-1)}O2$ and $16_nO2$ to analog-to-digital converter 20. Thus, a voltage representing the voltage of power cell $24_n$ is transmitted to ADC 20, thereby observing or monitoring the voltage across power cell $24_n$.

In the differential sample and hold operating mode, the voltages across power cell $24_1$, ..., $24_n$ can be sampled and stored or held by applying suitable control voltages V26A, $V26_1$, ..., $V26_n$, and $V28_1$, ..., $V28_n$ to the control terminals of switching elements 26A, $26_1$, ..., $26_n$, and $28_1$, ..., $28_n$, respectively. For sampling, the switching elements are configured to enable the filtering continuous observation mode. In response to these switch configurations, capacitors $36_1$, ..., $36_n$ are charged to voltages substantially equal to the voltages across power cell $24_1$, ..., $24_n$. Capacitors $36_1$, ..., $36_n$ serve as filters and filter the sampled signals. It should be noted that the on-resistances (Rdson's) of switching elements 26A and $28_1$, ..., $28_n$ are in series with both terminals of capacitors $36_1$, ..., $36_n$, which reduces issues associated with common mode noise.

After sampling the voltage of power cells $24_1$, ..., $24_n$, the information is held on capacitors $36_1$, ..., $36_n$ by applying control signals V26A and $V28_1$, ..., $V28_n$ to the control terminals of switching elements 26A and $28_1$, ..., $28_n$, respectively, that are suitable for opening these switching elements. The switching elements $26_1$, ..., $26_n$ remain open, i.e., they keep the same state as in the filtering continuous observation mode. In response to this switching configuration, capacitors $36_1$, ..., $36_n$ are isolated from the stack of power cells $24_1$, ..., $24_n$, thereby holding the voltages that appeared on power cells $24_1$, ..., $24_n$.

The sampled voltage representing the voltage of power cell $24_1$ can be monitored in response to MUX 18 being configured to transmit the voltage at output terminals $16_AO1$ and $16_1O2$ to ADC 20.

In response to MUX 18 being configured to transmit the voltage at output terminals $16_1O2$ and $16_2O2$ to analog-to-digital converter 20 a sampled voltage representing the voltage of power cell $24_2$ is transmitted to ADC 20.

In response to MUX 18 being configured to transmit the voltage at output terminals $16_{(n-1)}O2$ and $16_nO2$ to analog-to-digital converter 20, a sampled voltage representing the voltage of power cell $24_n$ is transmitted to ADC 20.

In the internal balancing operating mode, the voltage across power cell $24_1$ can be balanced by applying control signals $V26_1$ and $V28_1$ to the control terminals of switching elements $26_1$ and $28_1$, respectively that are suitable for closing switching elements $26_1$ and $28_1$. Accordingly, balancing current flowing through impedance element $34_1$, switching element $26_1$, switching element $28_1$ and impedance element $34_2$ discharges power cell $24_1$ It should be noted that the voltages across the other power cells can be balanced using a similar technique.

Figure 7:
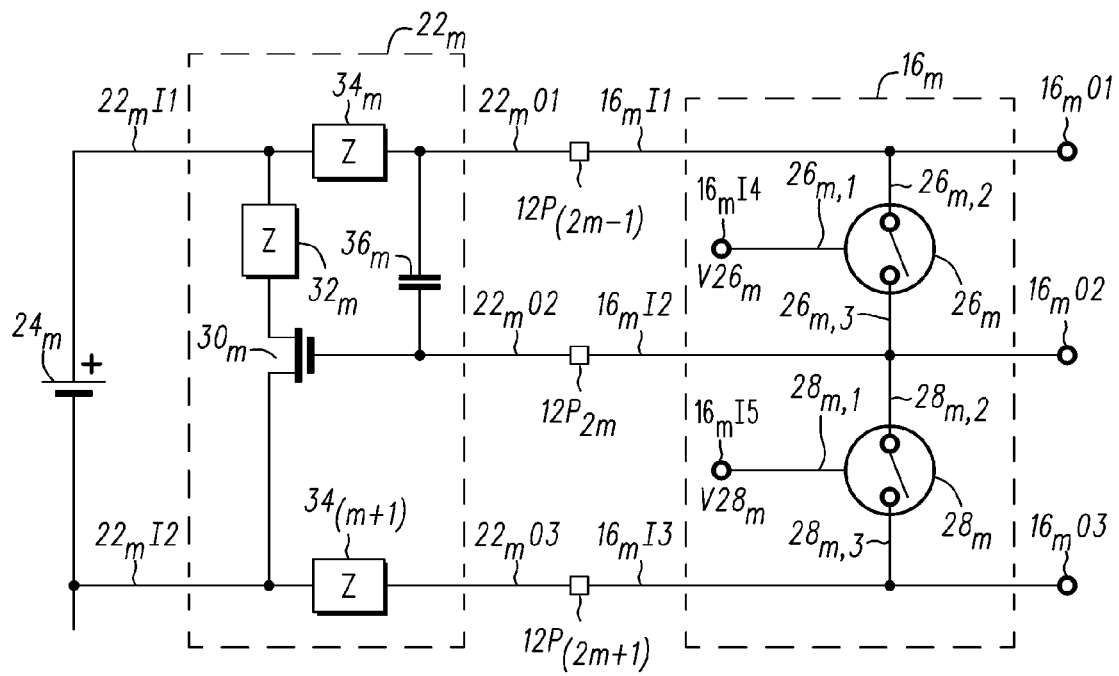
FIG. 7 is a schematic diagram of a portion of a battery monitoring and balancing system in accordance with another embodiment of the present invention.

FIG. 7 is a circuit schematic of a switching section $16_m$ (described with reference to FIGS. 1 and 2) connected to a power cell $24_m$ through a filter section $22_m$ in accordance with another embodiment of the present invention. It should be noted that switching networks $16_1$, $16_2$, ..., $16_n$ in FIG. 1 are comprised of switching sections $16_m$ and that the variable m is used to represent integers 1, 2, ..., n. For example, switching network $16_1$ corresponds to switching section $16_m$, where m is replaced by 1, switching network $16_2$ corresponds to switching section $16_m$, where m is replaced by 2, and switching network $16_n$ corresponds to switching section $16_m$, where m is replaced by n. Similarly, switching networks $16_1$, $16_2$, $16_3$, $16_4$ in FIG. 2 are comprised of switching sections $16_m$ and that the variable m is used to represent integers 1, 2, 3, and 4. For example, switching network $16_1$ corresponds to switching section $16_m$, where m is replaced by 1, switching network $16_2$ corresponds to switching section $16_m$, where m is replaced by 2, switching network $16_3$ corresponds to switching section $16_m$, where m is replaced by 3, and switching network $16_4$ corresponds to switching section $16_m$, where m is replaced by 4.

Switching section $16_m$ has been described with reference to FIG. 3.

Filter section $22_m$ is similar to the filter section described with reference to FIG. 3, except that it also includes balancing elements $30_m$ and $32_m$. By way of example, balancing elements $30_m$ and $32_m$ are a transistor and a resistor, respectively. Transistor $30_m$ has a drain terminal connected to input terminal $22_m I1$ through resistor $32_m$, a source terminal connected to input terminal $22_m I2$, and a gate terminal that serves as or, alternatively, is connected to output terminal $22_m O2$. Output terminal $22_m O1$ is connected to input terminal $22_m I1$ through impedance element $34_m$ and to output terminal $22_m O2$ through energy storage element $36_m$. Input terminal $22_m I2$ is connected to an output terminal $22_m O3$ through impedance element $34_{(m+1)}$. By way of example, impedance elements $34_m$ and $34_{(m+1)}$ are resistors and energy storage element $36_m$ is a capacitor. Resistors $32_m$ and $34_m$ each have a terminal commonly connected together to form a node that is connected to or, alternatively, forms input terminal $22_m I1$. The other terminal of resistor $32_m$ is connected to the drain terminal of transistor $30_m$ and the other terminal of resistor $34_m$ may be connected to a terminal of capacitor $36_m$ to form a node that serves as or, alternatively, may be connected to an output terminal $22_m O1$. The other terminal of capacitor $36_m$ may be connected to the gate terminal of transistor $30_m$ and forms a node that may be connected to or, alternatively, serves as output terminal $22_m O2$. Resistor $34_{(m+1)}$ has a terminal that is connected to the source terminal of transistor $30_m$ to form a node that may be connected to or, alternatively, serves as input terminal $22_m I2$ and a terminal that serves as or, alternatively, may be connected to output terminal $22_m O3$. Because impedance elements $32_m$, $34_m$, and $34_{(m-1)}$ are not limited to being resistors, they are identified by the symbol Z in FIG. 7, i.e., they can be other types of impedance elements.

Power cell $24_m$ comprises a battery cell having a positive terminal connected to input terminal $22_m I1$ of filter section $22_m$ and a negative terminal connected to input terminal $22_m I2$ of filter section $22_m$.

It should be noted that output terminal $22_m O1$ is electrically connected to input pin $12P_{(2m-1)}$, output terminal $22_m O2$ is electrically connected to input pin $12P_{2m}$, and output terminal $22_m O3$ is electrically connected to input pin $12P_{(2m+1)}$.

Still referring to FIG. 7, switching section $16_m$ operates in at least three different operating modes including a filtering continuous monitoring or observation mode, a sample and hold mode, and a balancing mode. In the filtering continuous monitoring mode, a control voltage $V26_m$ suitable for opening switching element $26_m$ is applied to the control terminal of switching element $26_m$ and a control voltage $V28_m$ suitable for closing switching element $28_m$ is applied to the control terminal of switching element $28_m$. Closing switching element $28_m$ sets the gate-to-source voltage of balancing transistor $30_m$ to substantially zero, thereby turning off balancing transistor $30_m$. In addition, the currents flowing through filter resistors $34_m$ and $34_{(m+1)}$ are substantially zero, thus capacitor $36_m$ is charged to a voltage substantially equal to the voltage across power cell $24_m$. MUX 18 (shown in FIGS. 1 and 2) is configured to transmit the voltage at output terminals $16_m O1$ and $16_m O2$ to analog-to-digital converter 20. Thus, a voltage representing the voltage of power cell $24_m$ is transmitted to ADC 20, thereby observing or monitoring the voltage across power cell $24_m$.

In the sample and hold operating mode, a control voltage $V26_m$ suitable for opening switching element $26_m$ is applied to the control terminal of switching element $26_m$ and a control voltage $V28_m$ suitable for closing switching element $28_m$ is applied to the control terminal of switching element $28_m$. Closing switching element $28_m$ sets the gate-to-source voltage of balancing transistor $30_m$ to substantially zero, thereby turning off balancing transistor $30_m$. In addition, the currents flowing through filter resistors $34_m$ and $34_{(m+1)}$ are substantially zero, thus capacitor $36_m$ is charged to a voltage substantially equal to the voltage across power cell $24_m$, i.e., capacitor $36_m$ samples the voltage of power cell $24_m$. Then the control voltage $V26_m$ suitable for opening switching element $26_m$ is maintained at the control terminal of switching element $26_m$ and a control voltage $V28_m$ suitable for opening switching element $28_m$ is applied to the control terminal of switching element $28_m$. MUX 18 and ADC 20 (shown in FIGS. 1 and 2) are configured so that output terminals $16_m O1$ and $16_m O2$ are connected to a high impedance network. Because the gate terminal of transistor $30_m$ is a high impedance node, current does not flow through resistor $34_m$ and capacitor $36_m$. Thus, the sampled voltage appearing across capacitor $36_m$ is held. The voltage across capacitor $36_m$ appears across output terminals $16_m O1$ and $16_m O2$. MUX 18 (shown in FIGS. 1 and 2) is configured to transmit the voltage at output terminals $16_m O1$ and $16_m O2$ to analog-to-digital converter 20. Thus, a sampled voltage representing the voltage of power cell $24_m$ is transmitted to ADC 20.

In the balancing mode of operation, a control voltage $V26_m$ suitable for closing switching element $26_m$ is applied to the control terminal of switching element $26_m$ and a control voltage $V28_m$ suitable for opening switching element $28_m$ is applied to the control terminal of switching element $28_m$. Accordingly, capacitor $36_m$ is discharged through switching element $26_m$ and transistor $30_m$ becomes conductive and a balancing current flowing through resistor $32_m$ and transistor $30_m$ discharges power cell $24_m$. As discussed with reference to FIG. 3, switching element $26_m$ may be referred to as a balancing switch or a switch and switching element $28_m$ may be referred to as a sampling switch or a switch.

Figure 8:
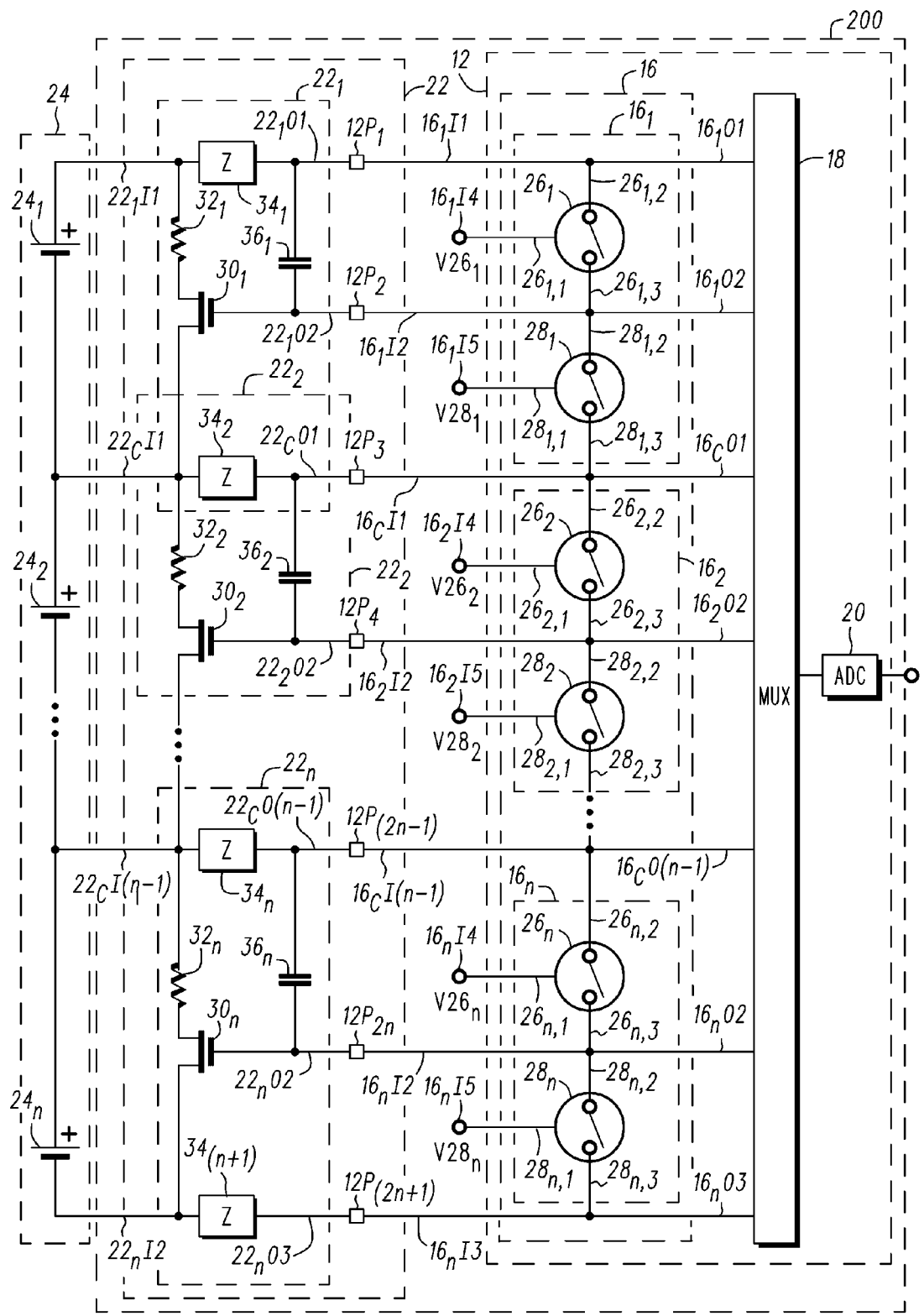
FIG. 8 is a schematic diagram of a portion of a battery monitoring and balancing system in accordance with another embodiment of the present invention.

FIG. 8 is a block diagram of a power cell monitor and control module 200 comprising control module 12 and filter circuit 22 as described with reference to FIG. 1, but further including embodiments of circuit implementations of filter circuit $22_m$ and switching networks $16_m$ as described with reference to FIG. 7. Interface circuit 16 has been described with reference to FIG. 4.

Filter 22 is comprised of a plurality of filter sections $22_1$, $22_2 \ldots , 22_n$, wherein each filter section includes input terminals connected to corresponding power cells $24_1$, $24_2, \ldots , 24_n$ of a power storage unit 24 and output terminals connected to corresponding input pins $12P_1$, $12P_2$, $12P_3$, $12P_4, \ldots , 12P_{(2n-1)}$, $12P_{2n}$, $12P_{(2n+1)}$ of interface network 16. Filter section $22_1$ has input terminals $22_1I1$ and $22_CI1$ and output terminals $22_1O1$, $22_1O2$, and $22_CO1$; filter section $22_2$ has input terminals $22_CI1$ and $22_CI2$ and output terminals $22_CO1$, $22_2O2$, and $22_CO2$; and filter section $22_n$ has input terminals $22_CI(n-1)$ and $22_nI2$ and output terminals $22_CO(n-1)$, $22_nO2$, and $22_nO3$. Filter sections $22_1$, $22_2, \ldots , 22_n$ have been described with reference to FIG. 4. In addition, each filter section $22_1$, $22_2, \ldots , 22_n$ of FIG. 8 includes a balancing transistor and a balancing resistor. More particularly, filter section $22_1$ comprises a transistor $30_1$ having a drain terminal connected to input terminal $22_1I1$ through a resistor $32_1$, a source terminal connected to input terminal $22_CI1$, and a gate terminal that serves as or, alternatively, may be connected to output terminal $22_1O2$. Resistor $32_1$ and impedance element $34_1$ each have a terminal commonly connected together to form a node that may be connected to or, alternatively, forms input terminal $22_1I1$. The other terminal of resistor $32_1$ is connected to the drain terminal of transistor $30_1$ and the other terminal of impedance element $34_1$ may be connected to a terminal of capacitor $36_1$ to form a node that serves as or, alternatively, may be connected to output terminal $22_1O1$. The other terminal of capacitor $36_1$ may be connected to the gate terminal of transistor $30_1$ and forms a node that may be connected to or, alternatively, serves as output terminal $22_1O2$. Impedance element $34_2$ has a terminal that is connected to the source terminal of transistor $30_1$ to form a node that may be connected to or, alternatively, serves as input terminal $22_CI1$ and a terminal that may be connected to or, alternatively, serves as output terminal $22_CO1$. It should be noted that impedance element $34_2$ is common to filter sections $22_1$ and $22_2$.

Filter section $22_2$ comprises a transistor $30_2$ having a drain terminal connected to input terminal $22_CI1$ through a resistor $32_2$, a source terminal connected to input terminal $22_CI2$, and a gate terminal that serves as or, alternatively, may be connected to output terminal $22_2O2$. Resistor $32_2$ and impedance element $34_2$ each have a terminal commonly connected together and to input terminal $22_CI1$. The other terminal of resistor $32_2$ is connected to the drain terminal of transistor $30_2$ and the other terminal of resistor $34_2$ is connected to a terminal of capacitor $36_2$ and to output terminal $22_CO1$. The other terminal of capacitor $36_2$ may be connected to the gate terminal of transistor $30_2$ and forms a node that may be connected to or, alternatively, serves as output terminal $22_2O2$. It should be noted that similar shared components and connections exist between filter section $22_2$ and filter section $22_3$ (not shown) as exist between filter section $22_1$ and filter section $22_2$. For the sake of clarity, not all components of filter section $22_2$ are shown.

Filter section $22_n$ comprises a transistor $30_n$ having a drain terminal connected to input terminal $22_CI(n-1)$ through a resistor $32_n$, a source terminal connected to input terminal $22_nI2$, and a gate terminal that serves as or, alternatively, may be connected to output terminal $22_nO2$. Input terminal $22_CI(n-1)$ is connected to output terminal $22_CO(n-1)$ through an impedance element $34_n$. Resistors $32_n$ and impedance element $34_n$ each have a terminal commonly connected together, to input terminal $22_CI(n-1)$. The other terminal of resistor $32_n$ is connected to the drain terminal of transistor $30_n$ and the other terminal of impedance element $34_n$ may be connected to a terminal of capacitor $36_n$ to form a node that serves as or, alternatively, may be connected to output terminal $22_CO(n-1)$. Output terminal $22_CO(n-1)$ is connected to input pin $12P_{(2n-1)}$. The other terminal of capacitor $36_n$ may be connected to the gate terminal of transistor $30_n$ and forms a node that may be connected to or, alternatively, serves as output terminal $22_nO2$. Impedance element $34_{(n+1)}$ has a terminal that is connected to the source terminal of transistor $30_n$ to form a node that may be connected to or, alternatively, serves as input terminal $22_nI2$ and a terminal that may be connected to or, alternatively, serves as output terminal $22_nO3$.

Still referring to FIG. 8, interface network 16 that is comprised of switching sections $16_1$, $16_2, \ldots , 16_n$ operate in at least three different operating modes including a filtering continuous observation mode, a sample and hold mode, and a balancing mode. The operating modes of interface circuit 16 have been described with reference to FIG. 7.

Figure 9:
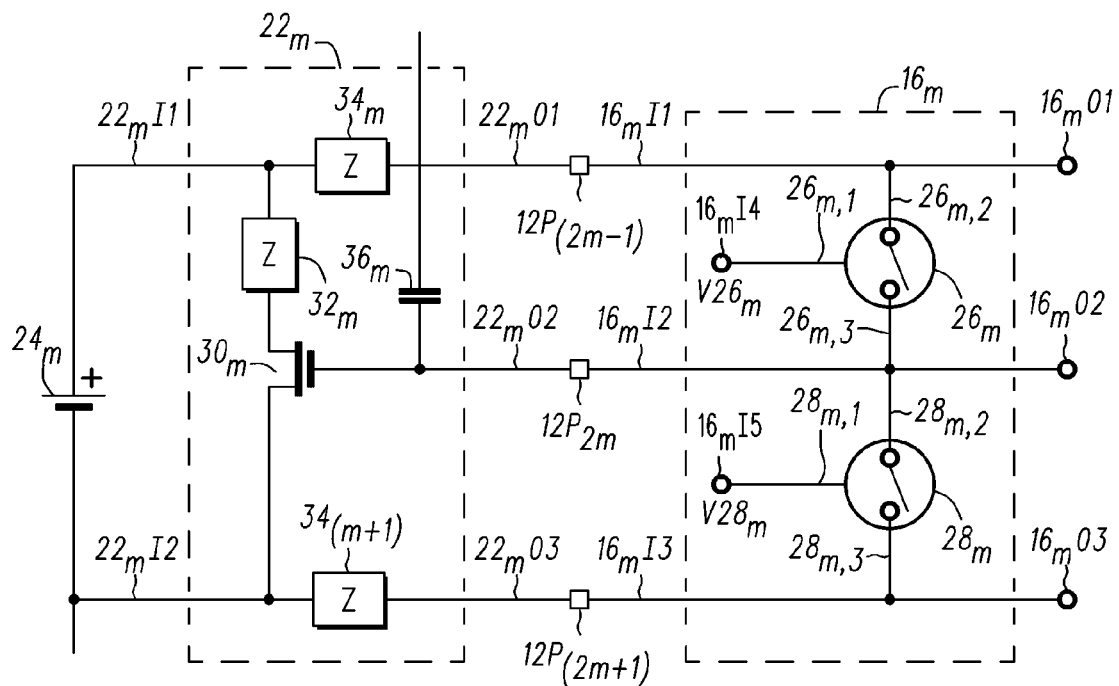
FIG. 9 is a schematic diagram of a portion of a battery monitoring and balancing system in accordance with another embodiment of the present invention.
Figure 10:
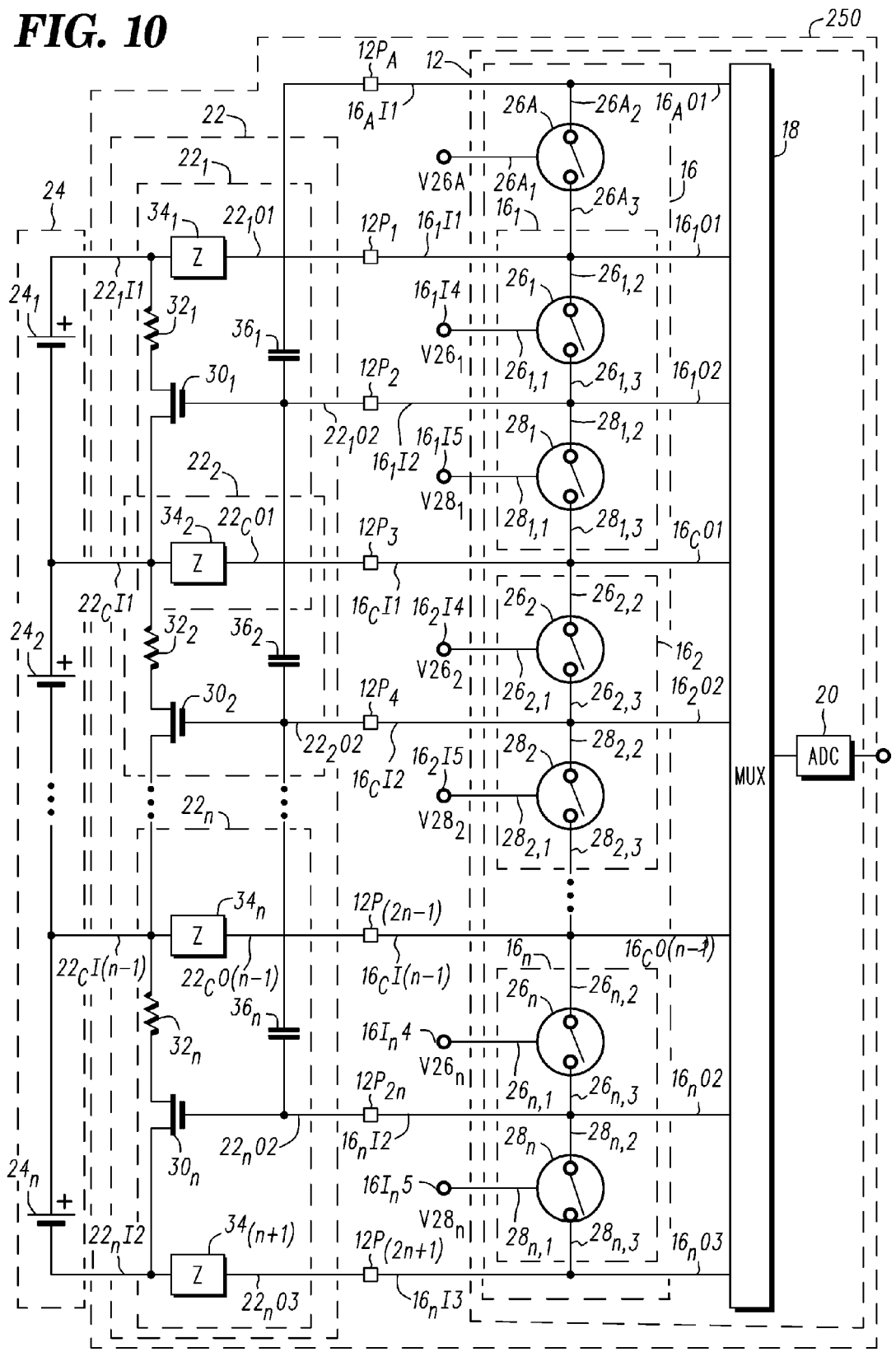
FIG. 10 is a schematic diagram of a portion of a battery monitoring and balancing system in accordance with another embodiment of the present invention.

FIG. 9 is a circuit schematic of a switching section $16_m$ of interface network 16 (described with reference to FIGS. 1 and 2) connected to a power cell $24_m$ through a filter section $22_m$ in accordance with another embodiment of the present invention. It should be noted that switching networks $16_1$, $16_2, \ldots , 16_n$ in FIG. 1 are comprised of switching sections $16_m$ and that the variable m is used to represent integers 1, 2, \ldots, n. For example, switching network $16_1$ corresponds to switching section $16_m$, where m is replaced by 1, switching network $16_2$ corresponds to switching section $16_m$, where m is replaced by 2, and switching network $16_n$ corresponds to switching section $16_m$, where m is replaced by n. Switching section $16_m$ of FIG. 9 is similar to switching section $16_m$ of FIG. 7, except that one of the terminals of capacitor $36_m$ is not connected to input pin $12P_{(2m-1)}$. Thus, capacitor $36_m$ has a terminal connected to input pin $12P_{2m}$ but its other terminal is shared with another circuit as shown in FIG. 10. As discussed with reference to FIG. 3, switching element $26_m$ may be referred to as a balancing switch or balancing switching element and switch $28_m$ may be referred to as a sampling switch or sampling switching element.

FIG. 10 is a block diagram of a power cell monitor and control module 250 comprising control module 12 and interface network 16 as described with reference to FIG. 6, but further including embodiments of circuit implementations of filter circuit 22 and interface circuit 16 described with reference to FIG. 9. Control module 250 is connected to a battery unit 24. Control module 250 is similar to control module 150 of FIG. 6 except that filter circuit 22 further includes balancing elements such as transistors $30_1, \ldots , 30_n$ and impedance elements $32_1, \ldots , 32_n$. More particularly, filter section $22_1I1$ comprises a transistor $30_1$ having a drain terminal connected to input terminal $22_1I1$ through a resistor $32_1$, a source terminal connected to input terminal $22_CI1$, and a gate terminal that serves as or, alternatively, may be connected to output terminal $22_1O2$. Resistor $32_1$ and impedance element $34_1$ each have a terminal commonly connected together to form a node that may be connected to or, alternatively, forms input terminal $22_1I1$. The other terminal of resistor $32_1$ is connected to the drain terminal of transistor $30_1$ and the other terminal of impedance element $34_1$ serves as or, alternatively, may be connected to output terminal $22_1O1$, which output terminal is connected to input pin $12P_1$. A terminal of capacitor $36_1$ is connected to input pin $12P_4$. The other terminal of capacitor $36_1$ is connected to the gate terminal of transistor $30_1$ and forms a node that may be connected to or, alternatively, serves as output terminal $22_1O2$. This terminal of capacitor $36_1$ and output terminal $22_1O2$ are connected to input pin $12P_2$. Impedance element $34_2$ has a terminal that is connected to the source terminal of transistor $30_1$ to form a node that may be connected to or, alternatively, serves as input terminal $22_CI1$ and a terminal that may be connected to or, alternatively, serves as output terminal $22_CO1$. It should be noted that impedance element $34_2$ is common to filter sections $22_1$ and $22_2$.

Filter section $22_2$ comprises a transistor $30_2$ having a drain terminal connected to input terminal $22_CI1$ through a resistor $32_2$, a source terminal connected to input terminal $22_CI2$, and a gate terminal that serves as or, alternatively, may be connected to output terminal $22_2O2$. Resistor $32_2$ and impedance element $34_2$ each have a terminal commonly connected together and to input terminal $22_CI1$. The other terminal of resistor $32_2$ is connected to the drain terminal of transistor $30_2$ and the other terminal of impedance element $34_2$ serves as or, alternatively, may be connected to output terminal $22_CO1$, which output terminal is connected to input pin $12P_3$. A terminal of capacitor $36_2$ is connected to the gate of transistor $30_1$, a terminal of capacitor $36_1$, and to input pin $12P_2$. The other terminal of capacitor $36_2$ is connected to the gate terminal of transistor $30_2$ and forms a node that may be connected to or, alternatively, serves as output terminal $22_2O2$, which output is connected to input pin $12P_4$. It should be noted that similar shared components and connections exist between filter section $22_2$ and filter section $22_3$ (not shown) as exist between filter section $22_1$ and filter section $22_2$. For the sake of clarity, not all components of filter section $22_2$ are shown.

Filter section $22_n$ comprises a transistor $30_n$ having a drain terminal connected to input terminal $22_CI(n-1)$ through a resistor $32_n$, a source terminal connected to input terminal $22_nI2$, and a gate terminal that serves as or, alternatively, may be connected to output terminal $22_nO2$, which is connected to input pin $12P_{2n}$. Impedance element $34_n$ has a terminal that is connected to the source terminal of a transistor to form a node that may be connected to or, alternatively, serves as input terminal $22_CI(n-1)$ and a terminal that may be connected to or, alternatively, serves as output terminal $22_CO(n-1)$. Output terminal $22_CO(n-1)$ is connected to input pin $12P_{(2n-1)}$. Resistor $32_n$ and impedance element $34_n$ each have a terminal commonly connected together and to input terminal $22_CI(n-1)$. The other terminal of resistor $32_n$ is connected to the drain terminal of transistor $30_n$ and the other terminal of impedance element $34_n$ may serve as or, alternatively, may be connected to output terminal $22_CO(n-1)$. The other terminal of capacitor $36_n$ is connected to the gate terminal of transistor $30_n$ and forms a node that may be connected to or, alternatively, serves as output terminal $22_nO2$. Impedance element $34_{(n+1)}$ has a terminal that is connected to the source terminal of transistor $30_n$ to form a node that may be connected to or, alternatively, serves as input terminal $22_nI2$ and a terminal that may be connected to or, alternatively, serves as output terminal $22_nO3$, which is connected to input pin $12P_{(2n+1)}$.

In accordance with another embodiment, the polarities of the cells are switched such that the cells have the opposite polarities shown in the figures. Alternatively, the n-channel transistors can be replaced by p-channel transistors.

The operation of control module 250 is similar to that of control module 150 (FIG. 6) except in the balancing mode of operation. Assuming that the default operating mode is the filtered continuous observation mode, whereby switching elements 26A, $28_1$, ..., $28_n$, are closed and switching elements $26_1$, ..., $26_n$ are open, the voltage across power cell $24_1$ can be balanced by applying a control voltage $V26_1$ to the control terminal of switching element $26_1$ that is suitable for closing switching element $26_1$ and a control voltage $V28_1$ to the control terminal of switching element $28_1$ that is suitable for opening switching element $28_1$. Accordingly, transistor $30_1$ becomes conductive and a balancing current flowing through resistor $32_1$ and transistor $30_1$ discharges power cell $24_1$.

It should be noted that the voltage across the other power cells can be balanced using a similar technique.

Figure 11:
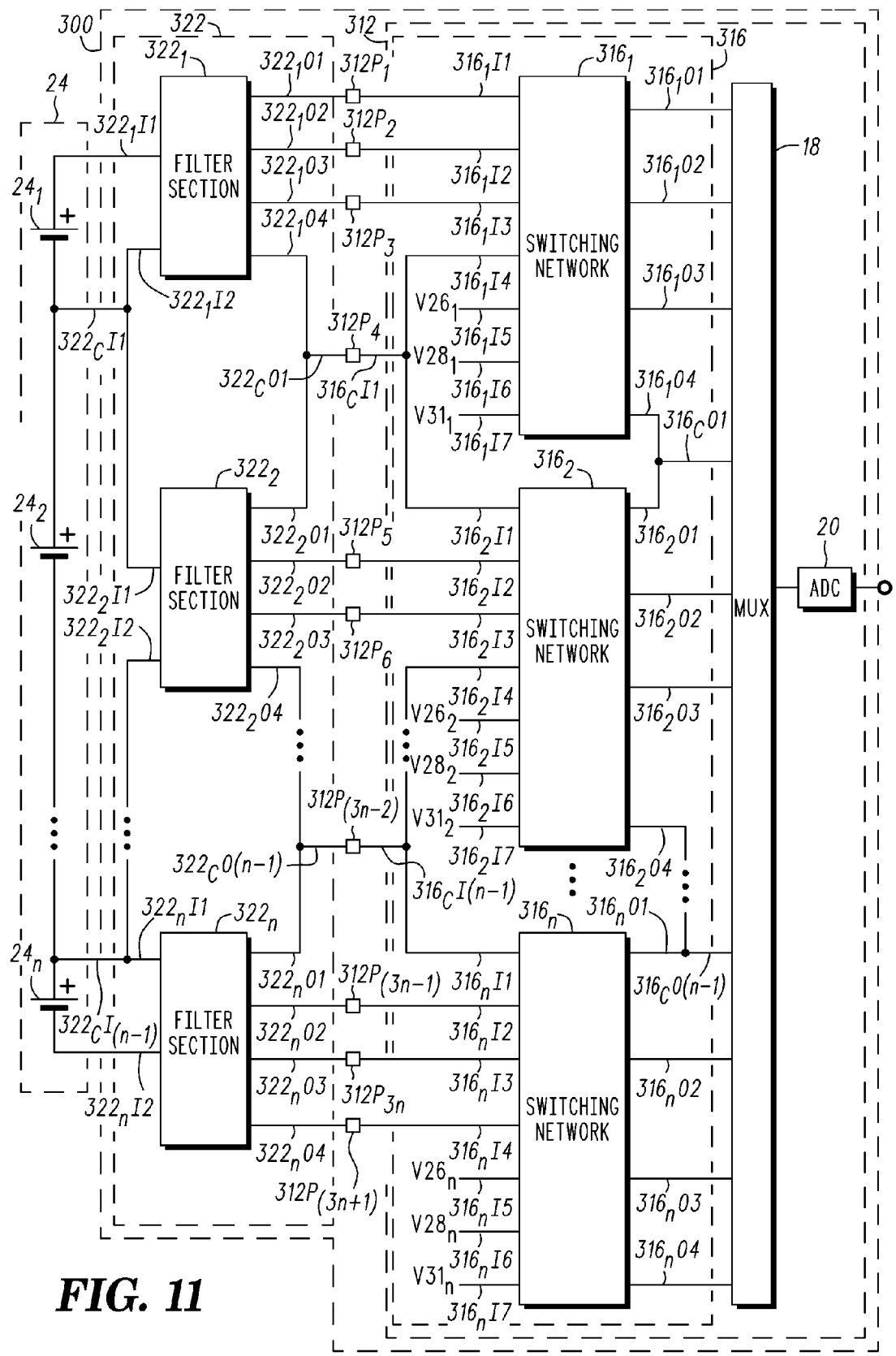
FIG. 11 is a schematic diagram of a portion of a battery monitoring and balancing system in accordance with another embodiment of the present invention.

FIG. 11 is a block diagram of a power cell monitor and control circuit 300 comprising a control module 312 connected to a filter circuit 322 in accordance with an embodiment of the present invention. Power cell monitor and control circuit 300 is connected to a power storage unit 24. Control module 312 includes an interface network 316 having inputs that are connected to or, alternatively, that serve as inputs of control module 312 and outputs that are connected to the inputs of a multiplexer (MUX) 18, which has an output connected to an analog-to-digital converter (ADC) 20. Power storage unit 24 may be comprised of a plurality of power cells or batteries $24_1$, $24_2$, ..., $24_n$, which are connected to corresponding filter sections $322_1$, $322_2$, ..., $322_n$, respectively of control circuit 300. Alternatively, the power storage units may be comprised of capacitors, fuel cells, or the like. Interface network 316 may be comprised of a plurality of switching networks $316_1$, $316_2$, ..., $316_n$, where switching networks $316_1$ has input terminals $316_1I1$, $316_1I2$, $316_1I3$, $316_1I4$, $316_1I5$, $316_1I6$, and $316_1I7$ and output terminals $316_1O1$, $316_1O2$, $316_1O3$, and $316_1O4$; switching network $316_2$ has input terminals $316_2I1$, $316_2I2$, $316_2I3$, $316_2I4$, $316_2I5$, $316_2I6$, and $316_2I7$ and output terminals $316_2O1$, $316_2O2$, $316_2O3$, and $316_2O4$; and switching network $316_n$ has input terminals $316_nI1$, $316_nI2$, $316_nI3$, $316_nI4$, $316_nI5$, $316_nI6$, and $316_nI7$ and output terminals $316_nO1$, $316_nO2$, $316_nO3$, and $316_nO4$. In accordance with an embodiment, input terminal $316_1I4$ is connected to input terminal $316_2I1$ to form an input terminal $316_CI1$ and input terminal $316_{(n-1)}I4$ is connected an input terminal $316_nI1$ to form an input terminal $316_CI(n-1)$; output terminal $316_1O4$ is connected to output terminal $316_2O1$ to form an output terminal $316_CO1$, and output terminal $316_{(n-1)}O4$ is connected to output terminal $316_nO1$ to form an output terminal $316_CO(n-1)$.

In accordance with another embodiment, control module 312 is a monolithically integrated semiconductor device in a semiconductor package having input pins or leads $312P_1$, $312P_2$, $312P_3$, $312P_4$, $312P_5$, $312P_6$, ..., $312P_{(3n-2)}$, $312P_{(3n-1)}$, $312P_{3n}$, and $312P_{(3n+1)}$, wherein n represents an integer. By way of example, input terminals $316_1I1$, $316_1I2$, $316_1I3$, $316_CI1$, $316_2I2$, $316_2I3$, ..., $316_CI(n-1)$, $316_nI2$, $316_nI3$, and $316_1I4$ are connected to input pins $312P_1$, $312P_2$, $312P_3$, $312P_4$, $312P_5$, $312P_6$, ..., $312P_{(3n-2)}$, $312P_{(3n-1)}$, $312P_{3n}$, and $312P_{(3n+1)}$, respectively. Although, input terminals $316_1I1$, $316_1I2$, $316_1I3$, $316_CI1$, $316_2I2$, $316_2I3$, ..., $316_CI(n-1)$, $316_1I2$, $316_1I3$, and $316_1I4$ are shown as being directly connected to input pins $312P_1$, $312P_2$, $312P_3$, $312P_4$, $312P_5$, $312P_6$, ..., $312P_{(3n-2)}$, $312P_{(3n-1)}$, $312P_{3n}$, and $312P_{(3+1)}$, respectively, this is not a limitation of the present invention, e.g., input terminals $316_1I1$, $316_1I2$, $316_1I3$, $316_CI1$, $316_2I2$, $316_2I3$, ..., $316_CI(n-1)$, $316_nI2$, $316_nI3$, and $316_1I4$ can be connected to input pins $312P_1$, $312P_2$, $312P_3$, $312P_4$, $312P_5$, $312P_6$, ..., $312P_{(3n-2)}$, $312P_{(3n-1)}$, $312P_{3n}$, and $312P_{(3n+1)}$, respectively, through other circuit elements.

Figure 22:
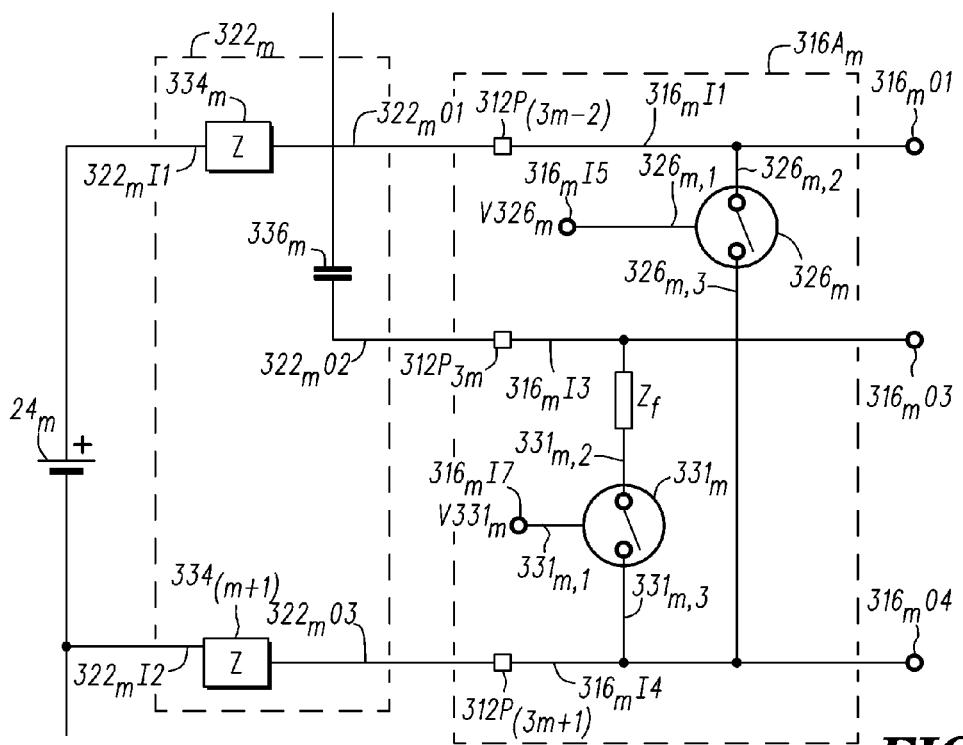
FIG. 22 is a schematic diagram of a portion of a battery monitoring and balancing system in accordance with another embodiment of the present invention.

In accordance with another embodiment, control module 312 and filter section 322 or a part of filter section 322 are monolithically integrated to form an integrated semiconductor device. An example of partial integration of the filter is depicted in FIG. 22. In embodiments in which control module 312 and filter section 322 or part of filter section 322 are monolithically integrated, input pins $312P_1$, $312P_2$, $312P_3$, $312P_4$, $312P_5$, $312P_6$, . . . , $312P_{(3n-2)}$, $312P_{(3n-1)}$, $312P_{3n}$, and $312P_{(3n+1)}$ are absent.

Input terminals $316_1I5$, $316_1I6$, and $316_1I7$ of switching network $316_1$ are coupled for receiving control signals $V26_1$, $V28_1$, and $V31_1$, respectively; input terminals $316_2I5$, $316_2I6$, and $316_2I7$ of switching network $316_2$ are coupled for receiving control signals $V26_2$, $V28_2$, and $V31_2$, respectively; and input terminals $316_1I5$, $316_nI6$ and $316_1I7$ of switching network $316_n$ are coupled for receiving control signals $V26_n$, $V28_n$, and $V31_n$, respectively.

Output terminals $316_1O1$, $316_1O2$, $316_1O3$, $316_CO1$, $316_2O2$, $316_2O3$, $316_CO(n-1)$, $316_nO2$, $316_nO3$, and $316_nO4$ of switching networks $316_1$, . . . , $316_n$ are connected to corresponding input terminals of MUX 18.

Filter 322 is comprised of a plurality of filter sections $322_1$, $322_2$, . . . , $322_n$, wherein each filter section includes input terminals connected to corresponding power cells of a power storage unit 24 and output terminals connected to corresponding input pins of interface network 316. Filter section $322_1$ has input terminals $322_1I1$ and $322_nI12$ and output terminals $322_1O1$, $322_1O2$, $322_1O3$, and $322_1O4$; filter section $322_2$ has input terminals $322_2I1$ and $322_2I2$ and output terminals $322_2O1$, $322_2O2$, $322_2O3$, and $322_2O4$; and filter section $322_n$ has input terminals $322_nI1$ and $322_nI2$ and output terminals $322_nO1$, $322_nO2$, $322_nO3$, and $322_nO4$. In accordance with an embodiment, input terminal $322_1I2$ may be connected to input terminal $322_2I1$ to form an input terminal $322_CI1$ and input terminal $322_{(n-1)}I2$ may be connected to input terminal $322_nI1$ to form an input terminal $322_CI(n-1)$. Output terminal $322_{(n-1)}O4$ may be connected to output terminal $322_2O1$ to form an output terminal $322_CO1$ and output terminal $322_2O4$ may be connected to output terminal $322_nO1$ to form an output terminal $322_CO(n-1)$. In accordance with embodiments in which control module 312 is a monolithically integrated semiconductor device and filter 322 is formed from discrete circuit elements, output terminal $322_1O1$ is connected to input pin $312P_1$; output terminal $322_1O2$ is connected to input pin $312P_2$; output terminal $322_1O3$ is connected to input pin $312P_3$; output terminal $322_CO1$ is connected to input pin $312P_4$; output terminal $322_2O2$ is connected to input pin $312P_5$; output terminal $322_2O3$ is connected to input pin $312P_6$; output terminal $322_CO(n-1)$ is connected to input pin $312P_{(3n-2)}$; output terminal $322_nO2$ is connected to input pin $312P_{(3n-1)}$; output terminal $322_nO3$ is connected to input pin $312P_{3n}$; and output terminal $322_nO4$ is connected to input pin $312P_{(3n+1)}$.

Input terminal $322_nI1$ is connected to the positive terminal of power cell $24_1$ and input terminal $322_CI1$ is connected to the negative and positive terminals of power cells $24_1$ and $24_2$, respectively. Input terminal $322_CI(n-1)$ is connected to the positive terminal of power cell $24_n$ and input terminal $322_nI2$ is connected to the negative terminal of power cell $24_n$.

It should be noted that the subscript "n" represents an integer. It should be further noted that the numbers of switching networks $316_1$, $316_2$, . . . , $316_n$, filter sections $322_1$, $322_2$, . . . , $322_n$, and power cells $24_1$, $24_2$, . . . , $24_n$ are not limitations of the present invention.

Figure 12:
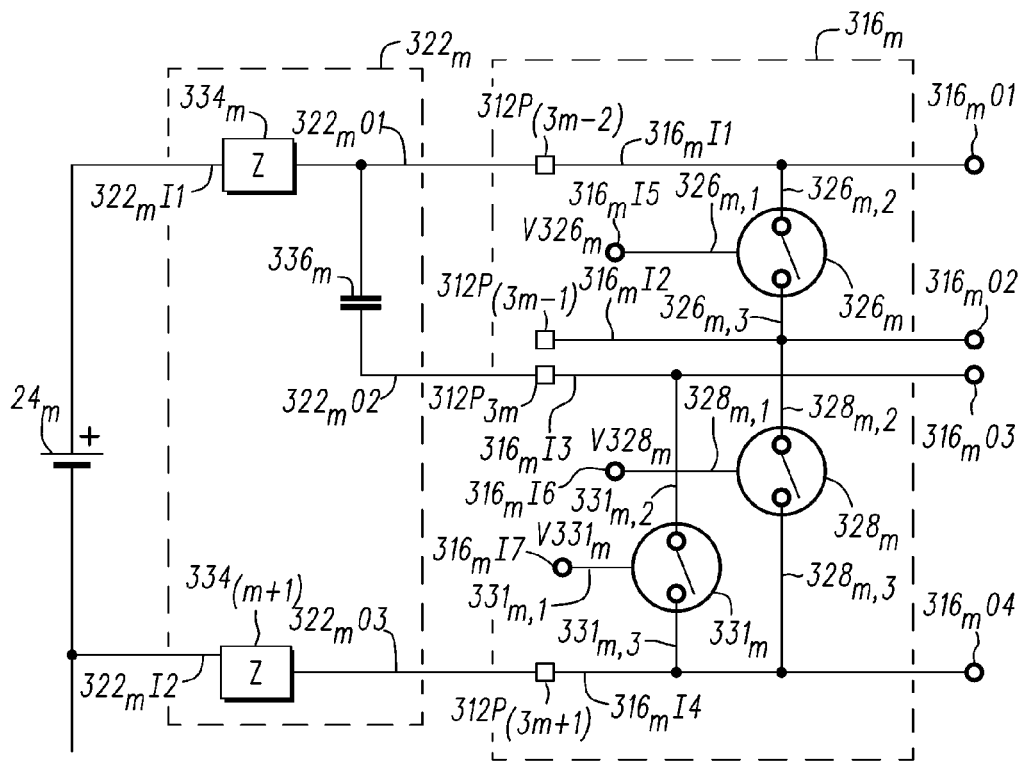
FIG. 12 is a schematic diagram of a portion of a battery monitoring and balancing system in accordance with another embodiment of the present invention.

FIG. 12 is a circuit schematic of a switching section $316_m$ of interface network 316 (described with reference to FIG. 11) connected to a power cell $24_m$ through a filter section $322_m$ in accordance with another embodiment of the present invention. It should be noted that switching networks $316_1$, $316_2$, . . . , $316_n$ in FIG. 11 are comprised of switching sections $316_m$ and that the variable m is used to represent integers 1, 2, . . . , n. For example, switching network $316_1$ corresponds to switching section $316_m$, where m is replaced by 1, switching network $316_2$ corresponds to switching section $316_m$, where m is replaced by 2, and switching network $316_n$ corresponds to switching section $316_m$, where m is replaced by n.

Switching section $316_m$ comprises switching elements $326_m$, $328_m$, and $331_m$, wherein each switching element $326_m$, $328_m$, and $331_m$ includes a control terminal and a pair of conduction terminals. More particularly, switching element $326_m$ has a control terminal $326_{m,1}$, a conduction terminal $326_{m,2}$, and a conduction terminal $326_{m,3}$. Conduction terminal $326_{m,2}$ may be connected to terminals $316_mI1$ and $316_mO1$ or, alternatively, terminals $316_mI1$ and $316_mO1$ may form an input/output terminal. Switching element $328_m$ has a control terminal $328_{m,1}$, a conduction terminal $328_{m,2}$, and a conduction terminal $328_{m,3}$. Conduction terminal $328_{m,2}$ is connected to conduction terminal $326_{m,3}$ and to terminals $316_mI2$ and $316_mO2$. Conduction terminal $328_{m,3}$ is connected to input terminal $316_mI4$ and to output terminal $316_mO4$. Conduction terminal $328_{m,3}$ may be connected to terminals $316_mI4$ and $316_mO4$ or, alternatively, terminals $316_mI4$ and $316_mO4$ may form an input/output terminal. Conduction terminal $331_{m,2}$ is connected to input terminal $316_mI3$ and to output terminal $316_mO3$. It should be noted that terminals $326_{m,1}$, $328_{m,1}$, and $331_{m,1}$ correspond to terminals $316_nI5$, $316_nI6$, and $316_nI7$, respectively, of FIG. 11. Switching element $331_m$ may be referring to as a sampling switch and switching elements $328_m$ and $326_m$ may be referred to as balancing switches or current control elements.

Filter section $322_m$ comprises an impedance element $334_m$ having a terminal connected to or, alternatively, serving as input terminal $322_mI1$ and a terminal connected to or, alternatively, serving as output terminal $322_mO1$. Output terminal $322_mO1$ may be connected to output terminal $322_mO2$ through an energy storage element $336_m$. Input terminal $322_mI2$ may be connected to an output terminal $322_mO3$ through an impedance element $334_{(m+1)}$. By way of example, impedance elements $334_m$ and $334_{(m+1)}$ are resistors and energy storage element $336_m$ is a capacitor. In accordance with embodiments in which switching section $316_m$ is a monolithically integrated semiconductor device or a portion of a monolithically integrated semiconductor device and circuit elements $334_m$, $334_{(m+1)}$, and $336_m$ are discrete circuit elements, circuit elements $334_m$, $336_m$, and $334_{(m+1)}$ are connected to switching section $316_m$ through input pins $312P_{(3m-2)}$, $312P_{3m}$, and $312P_{(3m+1)}$, i.e., output terminal $322_mO1$ is connected to input pin $312P_{(3m-2)}$, output terminal $322_mO2$ is connected to input pin $312P_3$ m, and output terminal $322_mO3$ is connected to input pin $312P_{(3m+1)}$. Input pin $312P_{(3m-1)}$ may not be connected to another circuit element. In accordance with another embodiment, the filter can be partially or fully integrated monolithically and the output pins will change accordingly. Because impedance elements are not limited to being resistors they are identified by the symbol Z, i.e., they can be other types of impedance elements.

Power cell $24_m$ comprises a battery cell having a positive terminal connected to input terminal $322_m\text{I}1$ of filter section $22_m$ and a negative terminal connected to input terminal $322_m\text{I}2$ of filter section $322_m$.

It should be noted that output terminal $322_m\text{O}1$ is electrically connected to input terminal $316_m\text{I}1$ through input pin $312\text{P}_{(3m-2)}$, output terminal $322_m\text{O}2$ is electrically connected to input terminal $316_m\text{I}3$ through input pin $312\text{P}_{3m}$, and output terminal $322_m\text{O}3$ is electrically connected to input terminal $316_m\text{I}4$ through input pin $312\text{P}_{(3m+1)}$.

Still referring to FIG. 12, switching sections $316_m$ operate in at least three different operating modes including a filtering continuous observation mode, a sample and hold mode, and a balancing mode. In the filtering continuous observation operating mode, the voltage across power cell $24_m$ is monitored by applying control voltages $V326_m$ and $V328_m$ to the control terminals of switching elements $326_m$ and $328_m$, respectively, that are suitable for opening these switching elements and applying a control voltage $V331_m$ to the control terminal of switching element $331_m$ that is suitable for closing this switching element. Thus, the voltage across power cell $24_m$ appears at output terminals $316_m\text{O}1$ and $316_m\text{O}3$. MUX 18 (shown in FIG. 11) is configured to transmit the voltage at output terminals $316_m\text{O}1$ and $316_m\text{O}3$ to analog-to-digital converter 20. Thus, a voltage representing the filtered voltage of power cell $24_m$ is transmitted to ADC 20, thereby observing or monitoring the voltage across power cell $24_m$.

In the sample and hold operating mode, the voltage across power cell $24_m$ can be sampled and stored or held by applying control voltages $V326_m$ and $V328_m$ to the control terminals of switching elements $326_m$ and $328_m$, respectively, that are suitable for opening these switching elements and applying a control voltage $V331_m$ to the control terminal of switching element $331_m$ that is suitable for closing this switching element. Capacitor $336_m$ is charged to a voltage substantially equal to the voltage across power cell $24_m$, i.e., capacitor $336_m$ samples the voltage of power cell $24_m$.

After sampling the voltage on power cell $24_m$, the control voltage $V331_m$ suitable for opening switching element $331_m$ is applied to the control terminal of switching element $331_m$ whereas control voltages $V326_m$ and $V328_m$ suitable for maintaining switching elements $326_m$ and $328_m$ in an open configuration are maintained at the control terminals of switching elements $326_m$ and $328_m$. Thus, the sampled voltage appearing across capacitor $336_m$ is held and appears across output terminals $316_m\text{O}1$ and $316_m\text{O}3$. MUX 18 is configured to transmit the voltage at output terminals $316_m\text{O}1$ and $316_m\text{O}3$ to ADC 20. Thus, a voltage representing the sample and hold voltage of power cell $24_m$ is transmitted to ADC 20.

In the balancing operating mode, the voltage across power cell $24_m$ can be balanced by applying control voltages $V326_m$ and $V328_m$ to the control terminals of switching elements $326_m$ and $328_m$, respectively, that are suitable for closing switching elements $326_m$ and $328_m$. Accordingly, a balancing current flowing through impedance element $334_m$, switching element $326_m$, switching element $328_m$ and impedance element $334_{(m+1)}$ discharges power cell $24_m$. Similar to switching elements $26_m$ and $28_m$ of FIG. 3, switching element $326_m$ may be referred to as a balancing switching element or a balancing switch and switching element $331_m$ may be referred to as a sampling switching element or a sampling switch.

It should be noted that switching element $328_m$ is an optional element and in accordance with embodiments in which switching element $328_m$ is absent output terminal $316_m\text{O}2$ is shorted to output terminal $316_m\text{O}4$.

Figure 13:
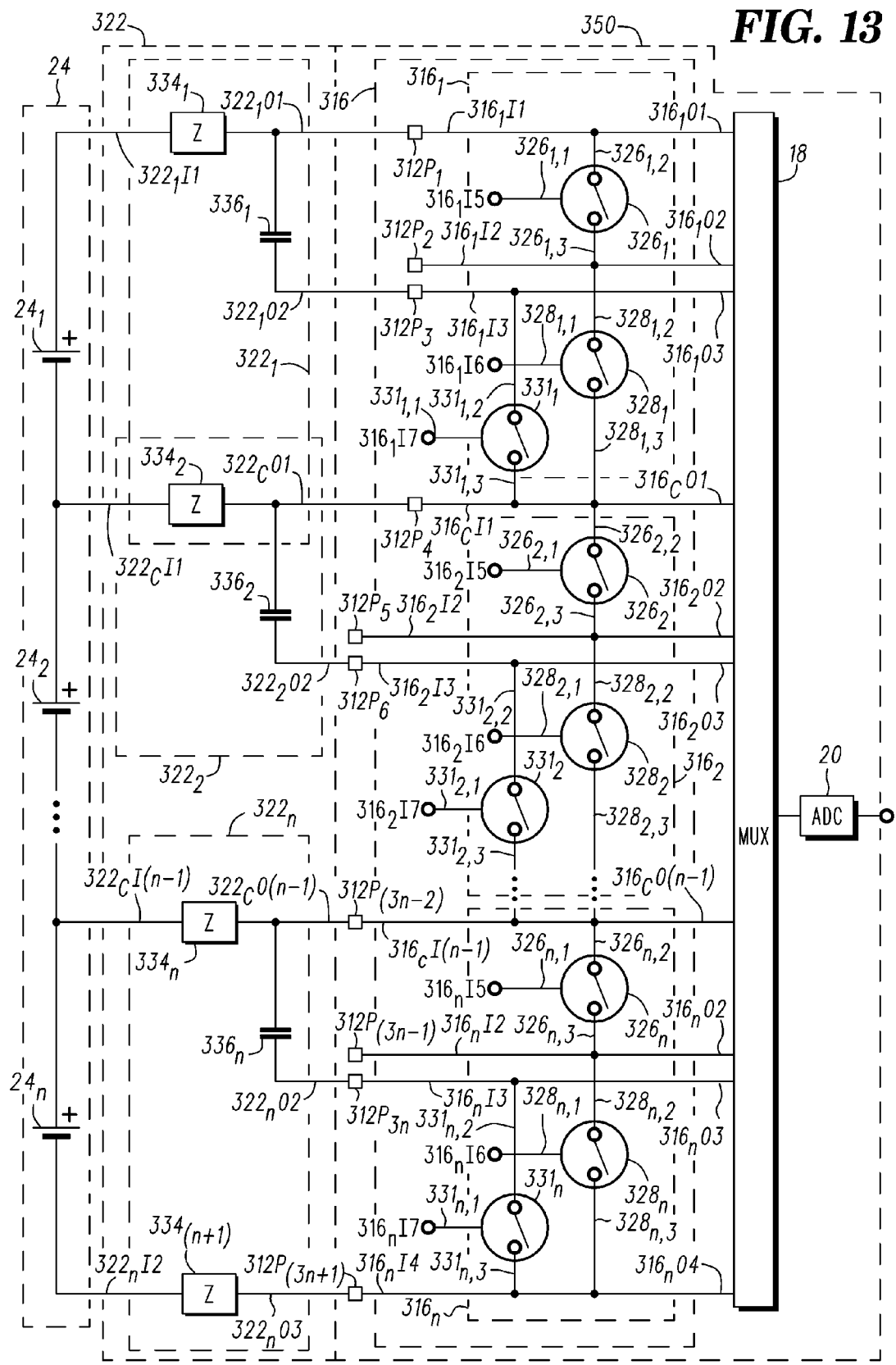
FIG. 13 is a schematic diagram of a portion of a battery monitoring and balancing system in accordance with another embodiment of the present invention.

FIG. 13 is a block diagram of a power cell monitor and control circuit 350 comprising control module 312 and filter circuit 322 as described with reference to FIG. 11, but further including the embodiments of circuit implementations of filter circuit 322 and interface circuit 316 described with reference to FIG. 12. Similar to the embodiment of FIG. 11, switching networks $316_1, 316_2, \ldots, 316_n$ of interface network 316 shown in FIG. 13 are comprised of switching sections $316_m$ where the variable m is used to represent integers $1, 2, \ldots, n$ as described with reference to FIG. 12. For example, switching network $316_1$ corresponds to switching section $316_m$, where m is replaced by 1, switching network $316_2$ corresponds to switching section $316_m$, where m is replaced by 2, and switching network $316_n$ corresponds to switching section $316_m$, where m is replaced by n.

Control circuit 350 is connected to a battery unit 24. As described above, control module 312 includes an interface network 316 having input terminals that are coupled to or, alternatively, that serve as inputs of control module 312 and output terminals that are coupled to the inputs of a multiplexer (MUX) 18, which has outputs connected to an ADC 20.

Switching network $316_1$ comprises switching elements $326_1, 328_1$, and $331_1$, wherein each switching element $326_1, 328_1$, and $331_1$ includes a control terminal and a pair of conduction terminals. More particularly, switching element $326_1$ has a control terminal $326_{1,1}$, a conduction terminal $326_{1,2}$, and a conduction terminal $326_{1,3}$. Conduction terminal $326_{1,2}$ may be connected to terminals $316_1\text{I}1$ and $316_1\text{O}1$ or, alternatively, terminals $316_1\text{I}1$ and $316_1\text{O}1$ may form an input/output terminal. Switching element $328_1$ has a control terminal $328_{1,1}$ a conduction terminal $328_{1,2}$, and a conduction terminal $328_{1,3}$. Conduction terminal $328_{1,2}$ is connected to conduction terminal $326_{1,3}$ and to terminals $316_1\text{I}2$ and $316_1\text{O}2$. Conduction terminal $328_{1,3}$ is connected to input terminal $316_C\text{I}1$ and to output terminal $316_C\text{O}1$. Conduction terminal $328_{1,3}$ may be connected to terminals $316_C\text{I}1$ and $316_C\text{O}1$ or alternatively, terminals $316_C\text{I}1$ and $316_C\text{O}1$ may form an input/output terminal. Conduction terminal $331_{1,2}$ is connected to input terminal $316_1\text{I}3$ and to output terminal $316_m\text{O}3$. It should be noted that terminals $326_{1,1}, 328_{1,1}$, and $331_{1,1}$ correspond to terminals $316_1\text{I}5, 316_1\text{I}6$, and $316_1\text{I}7$, respectively, of FIG. 11.

Switching network $316_2$ comprises switching elements $326_2, 328_2$, and $331_2$, wherein each switching element $326_2, 328_2$, and $331_2$ includes a control terminal and a pair of conduction terminals. More particularly, switching element $326_2$ has a control terminal $326_{2,1}$, a conduction terminal $326_{2,2}$, and a conduction terminal $326_{2,3}$. Conduction terminal $326_{2,2}$ may be connected to terminals $316_C\text{I}1$ and $316_C\text{O}1$ or, alternatively, terminals $316_C\text{I}1$ and $316_C\text{O}1$ may form an input/output terminal. Switching element $328_2$ has a control terminal $328_{2,1}$, a conduction terminal $328_{2,2}$, and a conduction terminal $328_{2,3}$. Conduction terminal $328_{2,2}$ is connected to conduction terminal $326_{2,3}$ and to terminals $316_2\text{I}2$ and $316_2\text{O}2$. Conduction terminal $331_{2,2}$ is connected to input terminal $316_2\text{I}3$ and to output terminal $316_2\text{O}3$. Conduction terminals $328_{2,3}$ and $331_{2,3}$ are connected with the switching network $316_n$ described below. It should be noted that similar shared components and connections exist between switching network $316_2$ and a switching section connected to switching network $316_2$ as exist between switching network $316_1$ and switching network $316_2$. For the sake of clarity, not all components of switching network $316_2$ are shown.

Switching network $316_n$ comprises switching elements $326_n$, $328_n$, and $331_n$, wherein each switching element $326_n$, $328_n$, and $331_n$ includes a control terminal and a pair of conduction terminals. More particularly, switching element $326_n$ has a control terminal $326_{n,1}$, a conduction terminal $326_{n,2}$, and a conduction terminal $326_{n,3}$. Conduction terminal $326_{n,2}$ may be connected to terminals $316_CI(n-1)$ and $316_CO(n-1)$ or, alternatively, terminals $316_CI(n-1)$ and $316_CO(n-1)$ may form an input/output terminal. Switching element $328_n$ has a control terminal $328_{n,1}$, a conduction terminal $328_{n,2}$, and a conduction terminal $328_{n,3}$. Conduction terminal $328_{n,2}$ is connected to conduction terminal $326_{n,3}$ and to terminals $316_nI2$ and $316_nO2$. Conduction terminal $328_{n,3}$ is connected to input terminal $316_1I4$ and to output terminal $316_nO4$. Conduction terminal $328_{n,3}$ may be connected to terminals $316_1I4$ and $316_nO4$ or alternatively, terminals $316_1I4$ and $316_nO4$ may form an input/output terminal. Conduction terminal $331_{n,2}$ is connected to input terminal $316_nI3$ and to output terminal $316_nO3$ and conduction terminal $331_{n,3}$ is connected to input terminal terminals $316_nI4$ and output terminal $316_nO4$.

Filter 322 is comprised of a plurality of filter sections $322_1$, $322_2$ ..., $322_n$, wherein each filter section includes input terminals connected to corresponding power cells $24_1$, $24_2$, ..., $24_n$ of a power storage unit 24 and output terminals connected to corresponding input terminals of switching networks $316_1$, $316_2$, ..., $316_n$. Filter section $322_1$ has input terminals $322_1I1$ and $322_CI1$ and output terminals $322_1O1$, $322_1O2$, and $322_CO1$; filter section $322_2$ has input terminals $322_CI1$ and $322_CI2$ and output terminals $322_CO1$, $322_2O2$, and $322_CO2$; and filter section $322_n$ has input terminals $322_CI(n-1)$ and $322_nI2$ and output terminals $322_CO(n-1)$, $322_nO2$, and $322_nO3$.

Input terminal $322_nI1$ is connected to the positive terminal of power cell $24_1$ and input terminal $322_CI1$ is connected to the negative and positive terminals of power cells $24_1$ and $24_2$, respectively. Input terminal $322_CI(n-1)$ is connected to the positive terminal of power cell $24_n$ and input terminal $322_nI2$ is connected to the negative terminal of power cell $24_n$.

Filter section $322_1$ comprises impedance elements $334_1$ and $334_2$ and an energy storage element $336_1$. More particularly, output terminal $322_1O1$ is connected to input terminal $322_nI1$ through impedance element $334_1$ and to output terminal $322_1O2$ through energy storage element $336_1$. Input terminal $322_CI1$ is connected to output terminal $322_CO1$ through impedance element $334_2$. It should be noted that impedance element $334_2$ is common to filter sections $322_1$ and $322_2$. By way of example, impedance elements $334_1$ and $334_2$ are resistors and energy storage element $336_1$ is a capacitor.

Filter section $322_2$ comprises impedance element $334_2$ and capacitor $336_2$. More particularly, output terminal $322_CO1$ is connected to input terminal $322_CI1$ through impedance element $334_2$ and to output terminal $322_2O2$ through energy storage element $336_2$. By way of example, impedance element $334_2$ is a resistor and energy storage element $336_2$ is a capacitor. It should be noted that similar shared components and connections exist between filter section $322_2$ and another filter section connected to filter section $322_2$ as exist between filter section $322_1$ and filter section $322_2$. For the sake of clarity, not all components of filter section $322_2$ are shown.

Filter section $322_n$ comprises resistors $334_n$ and $334_{(n+1)}$ and energy storage element $336_n$. More particularly, output terminal $322_CO(n-1)$ is connected to input terminal $322_CI(n-1)$ through impedance element $334_n$ and to output terminal $322_nO2$ through energy storage element $336_n$. Input terminal $322_nI2$ is connected to output terminal $322_nO3$ through impedance element $334_{(n+1)}$. By way of example, impedance elements $334_n$ and $334_{(n+1)}$ are resistors and energy storage element $336_n$ is a capacitor.

Still referring to FIG. 13, interface network 316 operates in at least three different operating modes including a filtering continuous observation mode, a sample and hold mode, and a balancing mode. The operating modes of interface circuit 316 have been described with reference to FIG. 12.

It should be noted that switching elements $328_1$, $328_2$, ..., $328_n$ are optional elements and in accordance with embodiments in which switching elements $328_1$, $328_2$, ..., $328_n$ are absent, output terminal $316_1O2$ is shorted to output terminal $316_1O4$, output terminal $316_2O2$ is shorted to output terminal $316_2O4$, and output terminal $316_nO2$ is shorted to output terminal $316_nO4$, respectively.

Figure 14:
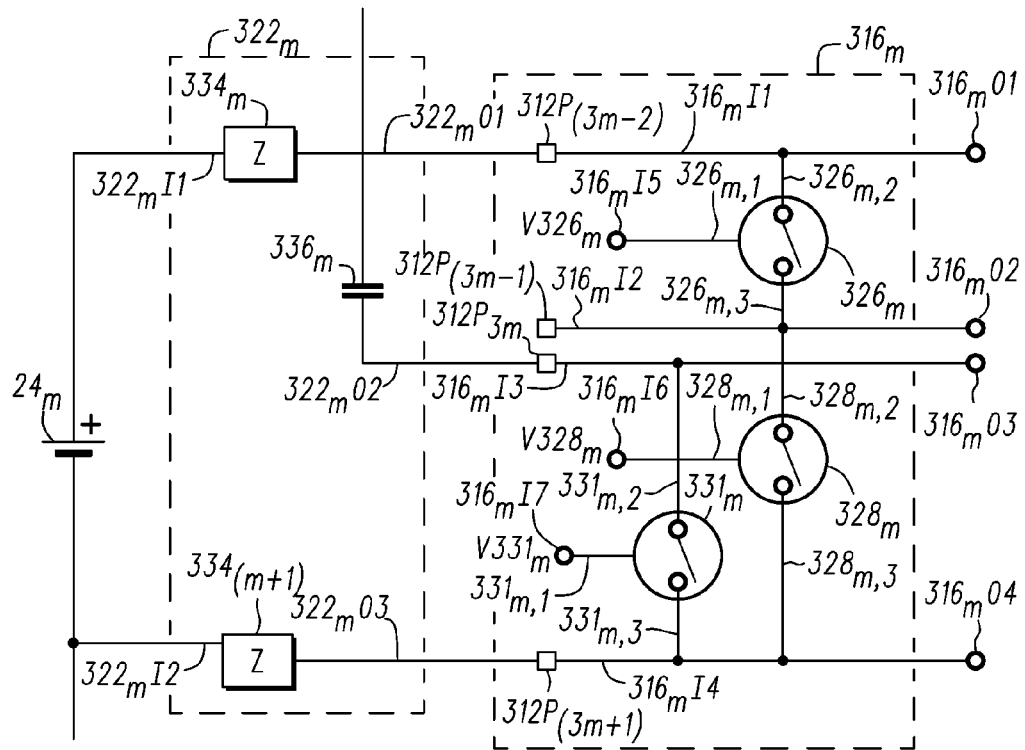
FIG. 14 is a schematic diagram of a portion of a battery monitoring and balancing system in accordance with another embodiment of the present invention.
Figure 15:
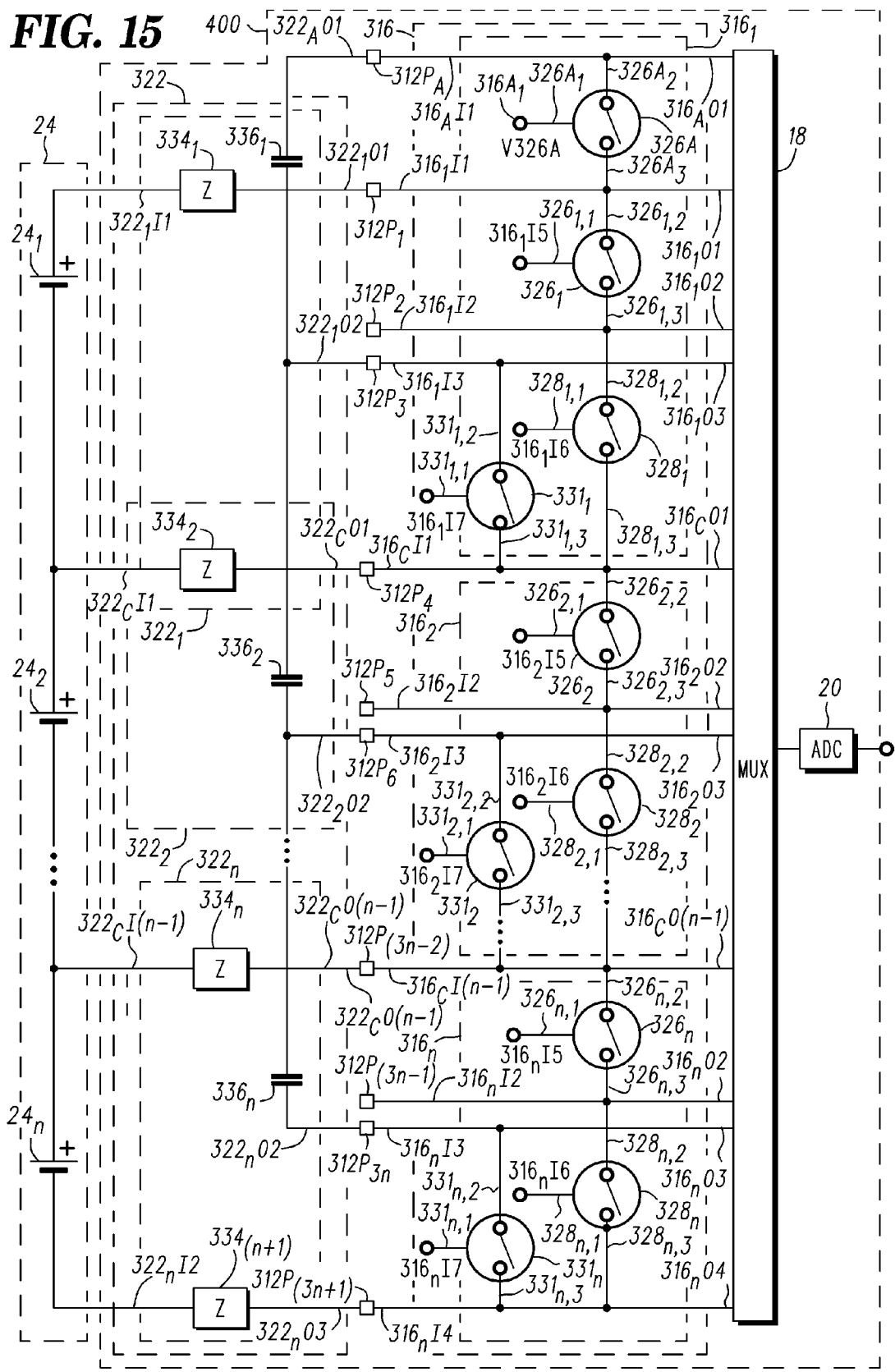
FIG. 15 is a schematic diagram of a portion of a battery monitoring and balancing system in accordance with another embodiment of the present invention.

FIG. 14 is a circuit schematic of a switching section $316_m$ of interface network 316 (described with reference to FIGS. 12 and 13) connected to a power cell $24_m$ through a filter section $322_m$ in accordance with another embodiment of the present invention. It should be noted that switching networks $316_1$, $316_2$, ..., $316_n$ in FIGS. 11 and 15 are comprised of switching sections $316_m$ and that the variable m is used to represent integers 1, 2, ..., n. For example, switching network $316_1$ corresponds to switching section $316_m$, where m is replaced by 1, switching network $316_2$ corresponds to switching section $316_m$, where m is replaced by 2, and switching network $316_n$ corresponds to switching section $316_m$, where m is replaced by n. Switching section $316_m$ of FIG. 14 is similar to switching section $316_m$ of FIG. 12, except that one of the terminals of capacitor $336_m$ is not connected to input pin $312P_{(3m-2)}$. Thus, capacitor $336_m$ has a terminal connected to input pin $312P_{3m}$ but its other terminal is not connected to input pin $312P_{(3m-2)}$. As discussed with reference to FIG. 12, switching element $326_m$ may be referred to as a balancing switching element and switching element $331_m$ may be referred to as a sampling switching element.

It should be noted that switching element $328_m$ is an optional element and in accordance with embodiments in which switching element $328_m$ is absent output terminal $316_mO2$ is shorted to output terminal $316_mO4$.

FIG. 15 is a block diagram of a power cell monitor and control module 400 comprising control module 312 and filter circuit 322 as described with reference to FIG. 11, but further including embodiments of circuit implementations of filter circuit 322 and interface circuit 316 described with reference to FIG. 14. It should be noted that the embodiment of FIG. 15 also differs from the embodiment of FIG. 11 in that input pins $312P_2$, $312P_5$, and $312P_{(3n-1)}$ are left floating in the embodiment of FIG. 15. Control module 400 is connected to a battery unit 24. As described above, control module 312 includes an interface network 316 having input terminals that are connected to or, alternatively, that serve as inputs of control module 312 and output terminals that are connected to the inputs of MUX 18, which has outputs connected to ADC 20. Interface circuit 316 is comprised of switching networks $316_1$, $316_2$, ..., $316_n$ and a switching element 326A. Switching networks $316_1$, $316_2$, ..., $316_n$ have been described with reference to FIG. 13.

Switching element $326A$ has a control terminal $326A_1$ coupled for receiving a control signal $V326A$, a conduction terminal $326A_2$, and a conduction terminal $326A_3$. Conduction terminal $326A_1$ may serve as input terminal $316A_1$. Conduction terminal $326A_2$ is connected to conduction terminal $316_AI1$ and output terminal $316_AO1$. Conduction terminal $326A_3$ is connected to input terminal $316_1I1$, output terminal $316_1O1$, and to conduction terminal $326_{1,2}$.

Output terminals $316_1O1$, $316_1O2$, $316_1O3$, $316_CO1$, $316_2O2$, $316_2O3$, . . . , $316_CO(n-1)$, $316_nO2$, $316_nO3$, $316_nO4$, and $316_AO1$ are connected to corresponding input terminals of MUX 18.

Filter 322 is comprised of a plurality of filter sections $322_1$, $322_2$, . . . , $322_n$, wherein each filter section includes input terminals connected to corresponding power cells $24_1$, $24_2$, . . . , $24_n$ of a power storage unit 24 and output terminals connected to corresponding input terminals of switching networks $316_1$, $316_2$, . . . , $316_n$. Filter section $322_1$ has input terminals $322_1I1$ and $322_CI1$ and output terminals $322_1O1$, $322_1O2$, and $322_CO1$; filter section $322_2$ has input terminals $322_CI1$ and $322_CI2$ and output terminals $322_CO1$, $322_2O2$, and $322_CO2$; and filter section $322_n$ has input terminals $322_CI(n-1)$ and $322_nI2$ and output terminals $322_CO(n-1)$, $322_nO2$, and $322_nO3$.

Input terminal $322_nI1$ is connected to the positive terminal of power cell $24_1$ and input terminal $322_CI1$ is connected to the negative and positive terminals of power cells $24_1$ and $24_2$, respectively. Input terminal $322_CI(n-1)$ is connected to the positive terminal of power cell $24_n$ and input terminal $322_nI2$ is connected to the negative terminal of power cell $24_n$.

Filter section $322_1$ comprises impedance elements $334_1$ and $334_2$ and energy storage element $336_1$, wherein energy storage element $336_1$ has a terminal connected to input pin $312P_4$ and a terminal connected to input pin $312P_3$. Output terminal $322_1O1$ is connected to input pin $312P_1$. Input terminal $322_CI1$ is connected to output terminal $322_CO1$ through impedance element $334_2$ and output terminal $322_CO1$ is connected to input pin $312P_4$. It should be noted that impedance element $334_2$ is common to filter sections $322_1$ and $322_2$. By way of example, impedance elements $334_1$ and $334_2$ are resistors and energy storage element $336_1$ is a capacitor.

Filter section $322_2$ comprises impedance element $334_2$ and energy storage element $336_2$. Output terminal $322_CO1$ is connected to input pin $312P_4$. A terminal of energy storage element $336_2$ is connected to input pin $312P_3$ and the other terminal of capacitor $336_2$ is connected to input pin $312P_6$. By way of example, impedance element $334_2$ is a resistor and energy storage element $336_2$ is a capacitor. It should be noted that similar shared components and connections exist between filter section $322_2$ and another filter section connected to filter section $322_2$ as exist between filter section $322_1$ and filter section $322_2$. For the sake of clarity, not all components of filter section $322_2$ are shown.

Filter section $322_n$ comprises impedance elements $334_n$ and $334_{(n+1)}$ and energy storage element $336_n$. Output terminal $322_CO(n-1)$ is connected to input pin $312P_{(3n-2)}$. Input terminal $322_CI(n-1)$ is connected to output terminal $322_CO(n-1)$ through impedance element $334_n$. Input terminal $322_nI2$ is connected to output terminal $322_nO3$ through impedance element $334_{(n+1)}$. A terminal of energy storage element $336_n$ is connected to input pin $312P_6$ and the other terminal of energy storage element $336_n$ is connected to input pin $312P_{3n}$. By way of example, impedance elements $334_n$ and $334_{(n+1)}$ are resistors and energy storage element $336_n$ is a capacitor.

In accordance with another embodiment, the polarities of the cells are switched such that the cells have the opposite polarities shown in the figures.

Still referring to FIG. 15, switching networks $316_1$, . . . , $316_n$ operate in at least three different operating modes including a filtering continuous observation mode, a sample and hold mode, and an internal balancing mode. As discussed above, the operating mode may be selected in accordance with the states of switching elements $326A$, $326_1$, . . . , $326_n$, $328_1$, . . . , $328_n$, and $331_1$, . . . , $331_n$, i.e., combinations in which these switching elements are opened or closed.

In the filtering continuous observation operating mode, the voltages across power cells $24_1$, . . . , $24_n$ are monitored by configuring switching elements $326_1$, . . . , $326_n$, and $328_1$, . . . , $328_n$, to be opened and switching elements $331_1$, . . . , $331_n$, and $326A$ to be closed. For example, the voltage across power cell $24_1$ can be monitored in response to MUX 18 being configured to transmit the voltage at output terminals $316_AO1$ and $316_1O3$ to ADC 20. Thus, a voltage representing the filtered voltage of power cell $24_1$ is transmitted to ADC 20, thereby observing or monitoring the voltage across power cell $24_1$. Similarly, the voltage across power cell $24_2$ can be monitored in response to MUX 18 being configured to transmit the voltage at output terminals $316_1O3$ and $316_2O3$ to ADC 20. Thus, a voltage representing the filtered voltage of power cell $24_2$ is transmitted to ADC 20, thereby observing or monitoring the voltage across power cell $24_2$. The voltage across power cell $24_n$ can be monitored in response to MUX 18 being configured to transmit the voltage at output terminals $316_{(n-1)}O3$ and $316_nO3$ to ADC 20. Thus, a voltage representing the filtered voltage of power cell $24_n$ is transmitted to ADC 20, thereby observing or monitoring the voltage across power cell $24_n$.

In the differential sample and hold operating mode, the voltages across power cells $24_1$, . . . , $24_n$ can be sampled and stored or held by applying proper control voltages $V326A$, $V326_1$, . . . , $V326_n$, $V328_1$, . . . , $V328_n$ and $V331_1$, . . . , $V331_n$ to the control terminals of switching elements $326A$, $326_1$, . . . , $326_n$, $328_1$, . . . , $328_n$ and $331_1$, . . . , $331_n$, respectively. For sampling, the switching elements are configured to enable the filtering continuous observation mode. In response to these switching element configurations, capacitors $336_1$, . . . , $336_n$ are charged to voltages substantially equal to the voltages across power cells $24_1$, . . . , $24_n$ i.e., capacitors $336_1$, . . . , $336_n$ sample the voltages of power cells $24_1$, . . . , $24_n$. Capacitors $336_1$, . . . , $336_n$ serve as filters and filter the sampled signals. It should be noted that the on-resistances (Rdson's) of switching elements $326A$ and $331_1$, . . . , $331_n$, are in series with both terminals of capacitors $336_1$, . . . , $336_n$, which reduces issues associated with common mode noise.

After sampling the voltages of power cells $24_1$, . . . , $24_n$, the information is held on capacitors $336_1$, . . . , $336_n$ by applying control signals $V326A$ and $V331_1$, . . . , $V331_n$ to the control terminals of switching elements $326_A$ and $331_1$, . . . , $331_n$, respectively, that are suitable for opening these switching elements. The switching elements $326_1$, . . . , $326_n$ and $328_1$, . . . , $328_n$ remain open, i.e., they keep the same state as in the filtering continuous observation mode. In response to this switching element configuration, capacitors $336_1$, . . . , $336_n$ are isolated from the stack of power cells $24_1$, . . . , $24_n$, thereby holding the voltages that appeared on power cells $24_1$, . . . , $24_n$.

The sampled voltage representing the voltage of power cell $24_1$ can be monitored in response to MUX 18 being configured to transmit the voltage at output terminals $316_4O1$ and $316_1O3$ to the analog-to-digital converter 20. In response to MUX 18 being configured to transmit the voltage at output terminals $316_1O3$ and $316_2O3$ to ADC 20, a sampled voltage representing the voltage of power cell $24_2$ is transmitted to ADC 20. In response to MUX 18 being configured to transmit the voltage at output terminals $316_{(n-1)}O3$ and $316_nO3$ to ADC 20, a sampled voltage representing the voltage of power cell $24_n$ is transmitted to ADC 20.

In the internal balancing operating mode, switching elements $331_1, \ldots, 331_n$ and 362A are opened or closed while the voltage across power cells $24_1, \ldots, 24_n$ is balanced using switching elements $326_1, \ldots, 326_n$ and $328_1, \ldots, 328_n$ in a similar manner as described with reference to FIG. 6 and switching elements $26_1, \ldots, 26_n$ and $28_1, \ldots, 28_n$.

It should be noted that switching elements $328_1, 328_2, \ldots, 328_n$ are optional elements and in accordance with embodiments in which switching elements $328_1, 328_2, \ldots, 328_n$ are absent, output terminal $316_1O2$ is shorted to output terminal $316_1O4$, output terminal $316_2O2$ is shorted to output terminal $316_2O4$, and output terminal $316_nO2$ is shorted to output terminal $316_nO4$, respectively.

Figure 16:
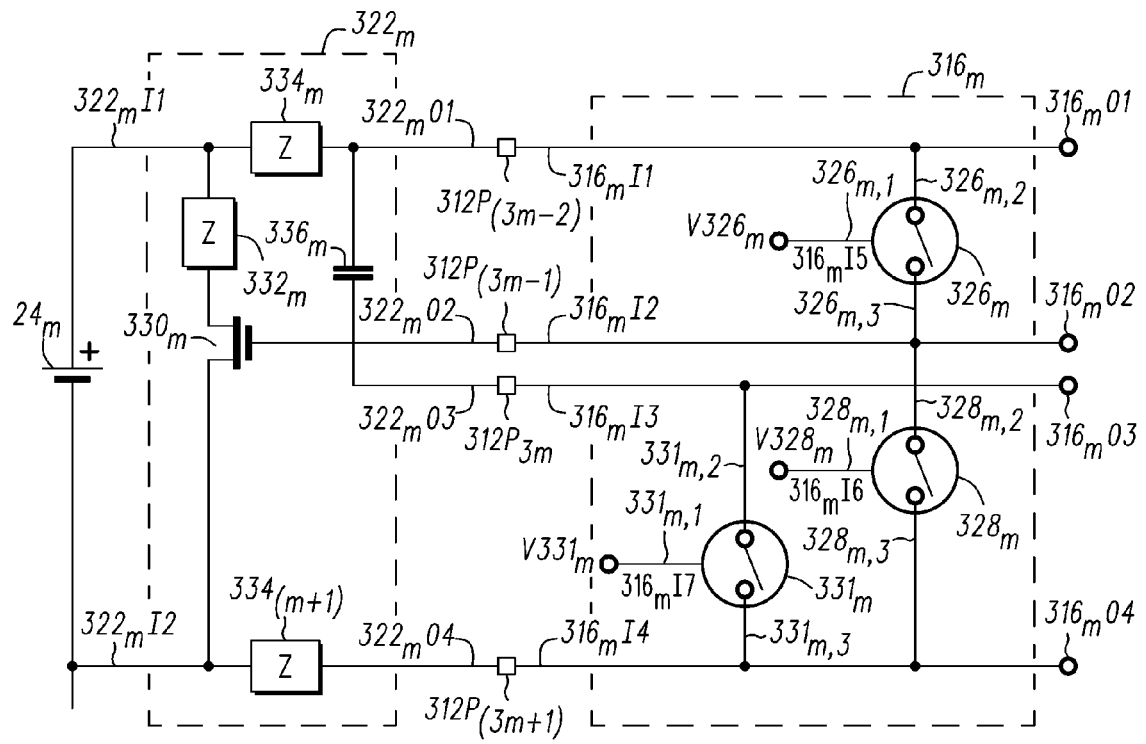
FIG. 16 is a schematic diagram of a portion of a battery monitoring and balancing system in accordance with another embodiment of the present invention.
Figure 17:
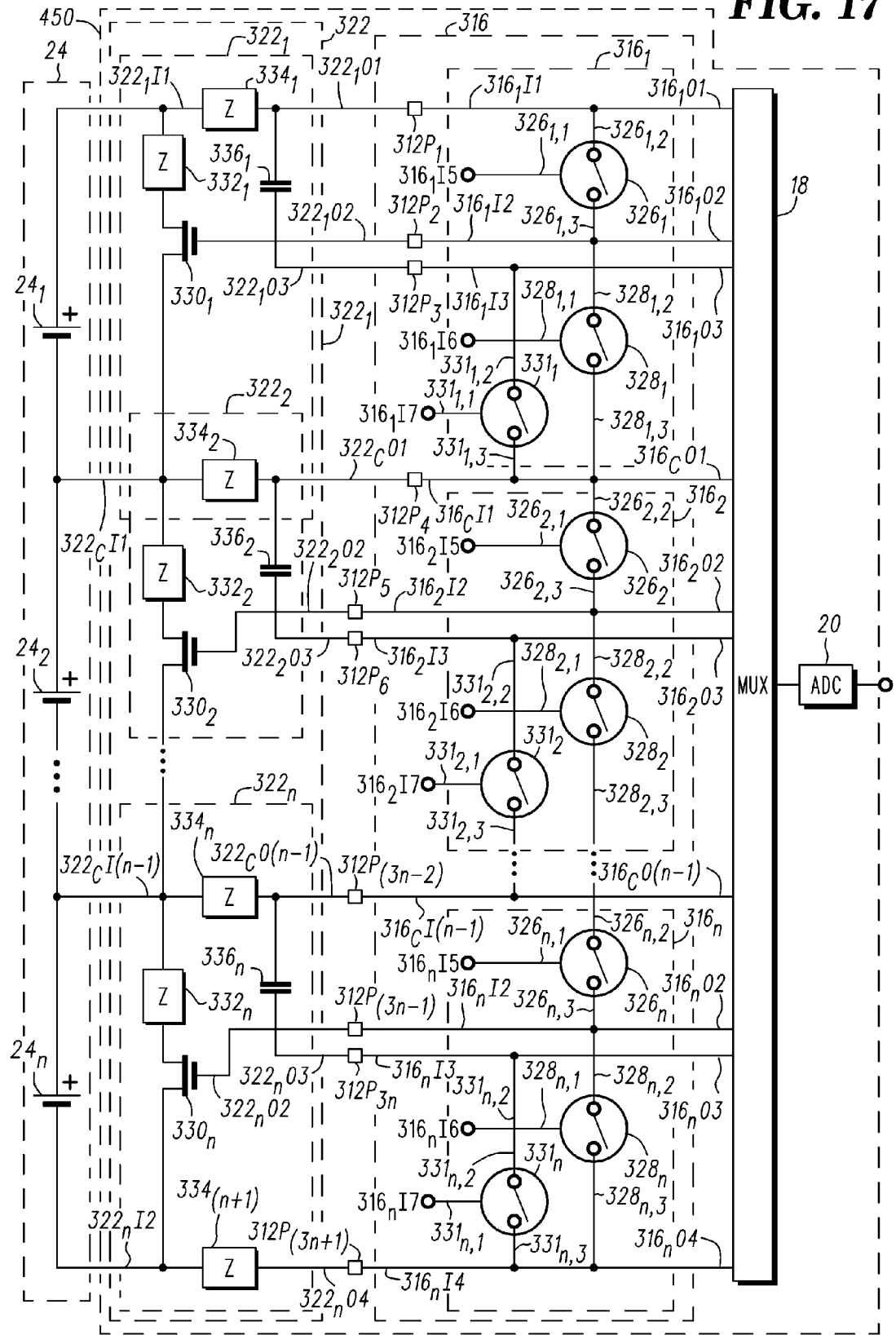
FIG. 17 is a schematic diagram of a portion of a battery monitoring and balancing system in accordance with another embodiment of the present invention.

FIG. 16 is a circuit schematic of a switching section $316_m$ of interface network 316 (described with reference to FIG. 11) connected to a power cell 24 through a filter section 322 in accordance with another embodiment of the present invention. It should be noted that switching networks $316_1, 316_2, \ldots, 316_n$ in FIGS. 13, 15, and 17 are comprised of switching sections $316_m$ and that the variable m is used to represent integers 1, 2, . . . , n. For example, switching network $316_1$ corresponds to switching section $316_m$, where m is replaced by 1, switching network $316_2$ corresponds to switching section $316_m$, where m is replaced by 2, and switching network $316_n$ corresponds to switching section $316_m$, where m is replaced by n.

Switching section $316_m$ has been described with reference to FIG. 12. By way of example, switching elements $326_m$ and $328_m$ form a simple transistor pre-driver circuit but they can be replaced by any other pre-driver circuit capable of driving an external balancing element of any polarity.

Filter section $322_m$ in FIG. 16 is similar to the filter section described with reference to FIG. 12, except that it includes balancing elements $330_m$ and $332_m$. Balancing element $330m$ can be an NPN bipolar transistor, a PNP bipolar transistor, an N-channel MOSFET, a P-channel MOSFET, or the like. By way of example, balancing elements $330_m$ and $332_m$ are an N-channel MOSFET transistor and a resistor, respectively. N-channel MOSFET $330_m$ has a drain terminal connected to input terminal $322_mI1$ through resistor $332_m$, a source terminal connected to input terminal $322_mI2$, and a gate terminal that serves as or, alternatively, is connected to output terminal $322_mO2$, which output terminal is connected to input pin $312P_{(3m-1)}$. Output terminal $322_mO1$ is connected to input terminal $322_mI1$ through impedance element $334_m$. An energy storage element $336_m$ has a terminal connected to input pin $312P_{(3m-2)}$ and a terminal connected to input pin $312P_{3m}$. By way of example, impedance elements $334_m$ and $334_{(m+1)}$ are resistors and energy storage element $336_m$ is a capacitor. Resistors $332_m$ and $334_m$ each have a terminal commonly connected together to form a node that is connected to or, alternatively, forms input terminal $322_mI1$. The other terminal of resistor $332_m$ is connected to the drain terminal of transistor $330_m$ and the other terminal of resistor $334_m$ is connected to a terminal of capacitor $336_m$ to form a node that serves as or, alternatively, may be connected to an output terminal $322_mO1$. As mentioned above, the other terminal of capacitor $336_m$ is connected to output pin $312P_{3m}$. Resistor $334_{(m+1)}$ has a terminal that is connected to the source terminal of transistor $330_m$ to form a node that may be connected to or, alternatively, serves as input terminal $322_mI2$ and a terminal that serves as or, alternatively, is connected to output terminal $322_mO4$.

Power cell $24_m$ comprises a battery cell having a positive terminal connected to input terminal $322_mI1$ of filter section $322_m$ and a negative terminal connected to input terminal $322_mI2$ of filter section $322_m$.

It should be noted that output terminal $322_mO1$ is electrically connected to input pin $312P_{(3m-2)}$, output terminal $322_mO2$ is electrically connected to input pin $312P_{(3m-1)}$, and output terminal $322_mO4$ is electrically connected to input pin $312P_{(3m+1)}$.

Still referring to FIG. 16, switching section $316_m$ operates in at least three different operating modes including a filtering continuous monitoring or observation mode, a sample and hold mode, and a balancing mode. In the filtering continuous observation operating mode, the voltage across power cell $24_m$ is monitored by applying control voltage $V326_m$ to the control terminal of switching element $326_m$ that is suitable for opening this switching element and applying control voltages $V328_m$ and $V331_m$ to the control terminals of switching elements $328_m$ and $331_m$, respectively, that are suitable for closing these switching elements. Thus, the filtered voltage across power cell $24_m$ appears at output terminals $316_mO1$ and $316_mO3$. MUX 18 (shown in FIG. 11) is configured to transmit the voltage at output terminals $316_mO1$ and $316_mO3$ to ADC 20. Thus, a voltage representing the filtered voltage of power cell $24_m$ is transmitted to ADC 20, thereby observing or monitoring the voltage across power cell $24_m$.

In the sample and hold operating mode, the voltage across power cell $24_m$ can be sampled and stored or held by applying a control voltage $V326_m$ to the control terminal of switching element $326_m$ that is suitable for opening this switching element and applying control voltages $V328_m$ and $V331_m$ to the control terminals of switching elements $328_m$ and $331_m$, respectively, that are suitable for closing these switching elements. Capacitor $336_m$ is charged to a voltage substantially equal to the voltage across power cell $24_m$, i.e., capacitor $336_m$ samples the voltage of power cell $24_m$.

After sampling the voltage on power cell $24_m$, the control voltage $V331_m$ suitable for opening switching element $331_m$ is applied to the control terminal of switching element $331_m$ whereas control voltages $V326_m$ and $V328_m$ suitable for maintaining switching elements $326_m$ and $328_m$ in open and closed configurations, respectively, are maintained at the control terminals of switching elements $326_m$ and $328_m$. Thus, the sampled voltage appearing across capacitor $336_m$ is held and appears across output terminals $316_mO1$ and $316_mO3$. MUX 18 is configured to transmit the voltage at output terminals $316_mO1$ and $316_mO3$ to ADC 20. Thus, a voltage representing the sample and hold voltage of power cell $24_m$ is transmitted to ADC 20.

In the balancing operating mode, the voltage across power cell $24_m$ can be balanced by applying control voltages $V326_m$ and $V328_m$ to the control terminals of switching elements $326_m$ and $328_m$, respectively, that are suitable for closing switching element $326_m$ and opening switching element $328_m$. Accordingly, a balancing current flowing through impedance element $332_m$ and transistor $330_m$ discharges power cell $24_m$. As discussed with reference to FIG. 12, switching element $326_m$ may be referred to as a balancing switching element and switching element $331_m$ may be referred to as a sampling switching element.

FIG. 17 is a block diagram of a power cell monitor and control module 450 comprising control module 312 and filter circuit 322 as described with reference to FIGS. 11 and 16, but further including embodiments of circuit implementations of filter circuit 322 and interface circuit 316 described with reference to FIG. 16. Control module 450 is connected to a battery unit 24. Control module 450 is similar to control module 350 except that control module 450 includes balancing structures $330_1$, $330_2$, ..., $330_n$, and balancing structures $332_1$, $332_2$, ..., $332_n$. More particularly and following from the description of control module 350 described with reference to FIG. 13, transistor $330_1$ has a drain terminal connected to input terminal $322_n$I1 through resistor $332_1$, a source terminal connected to input terminal $322_C$ I1, and a gate terminal that is connected to input pin $312P_2$. Output terminal $322_1$O1 is connected to input terminal $322_1$I1 through impedance element $334_1$. An energy storage element $336_1$ has a terminal connected to input pin $312P_1$ and a terminal connected to input pin $312P_3$. By way of example, impedance elements $334_1$ and $334_2$ are resistors and energy storage element $336_1$ is a capacitor. Resistors $332_1$ and $334_1$ each have a terminal commonly connected together to form a node that may be connected to or, alternatively, forms input terminal $322_1$I1. The other terminal of resistor $332_1$ is connected to the drain terminal of transistor $330_1$ and the other terminal of resistor $334_1$ is connected to a terminal of capacitor $336_1$ to form a node that serves as or, alternatively, may be connected to an output terminal $322_1$O1. Resistor $334_2$ has a terminal that is connected to the source terminal of transistor $330_1$ to form a node that may be connected to or, alternatively, may serve as input terminal $322_C$I1 and a terminal that may serve as or, alternatively, may be connected to output terminal $322_C$O1.

Transistor $330_2$ has a drain terminal connected to input terminal $322_C$I1 through resistor $332_2$, a source terminal connected to input terminal $322_C$I(n−1), and a gate terminal that is connected to input pin $312P_5$. Output terminal $322_C$O1 is connected to input terminal $322_C$I1 through impedance element $334_2$. An energy storage element $336_2$ has a terminal connected to input pin $312P_4$ and a terminal connected to input pin $312P_6$. By way of example, impedance element $334_2$ is a resistor and energy storage element $336_2$ is a capacitor. Resistors $332_2$ and $334_2$ each have a terminal commonly connected together to form a node that may be connected to or, alternatively, forms input terminal $322_C$I1. The other terminal of resistor $332_2$ is connected to the drain terminal of transistor $330_2$ and the other terminal of resistor $334_2$ is connected to a terminal of capacitor $336_2$ to form a node that serves as or, alternatively, may be connected to an output terminal $322_C$O1. It should be noted that similar shared components and connections exist between filter section $322_2$ and another filter section connected to filter section $322_2$ as exists between filter section $322_1$ and filter section $322_2$. For the sake of clarity, not all components of filter section $322_2$ are shown.

Transistor $330_n$ has a drain terminal connected to input terminal $322_C$I(n−1) through resistor $332_n$, a source terminal connected to input terminal $322_n$I2, and a gate terminal that is connected to input pin $312P_{(3n-1)}$. Output terminal $322_n$O4 is connected to input terminal $322_n$I2 through impedance element $334_{(n+1)}$. An energy storage element $336_n$ has a terminal connected to input pin $312P_{(3n-2)}$ and a terminal connected to input pin $312P_{3n}$. By way of example, impedance element $334_{(n+1)}$ is a resistor and energy storage element $336_n$ is a capacitor. Resistors $332_n$ and $334_n$ each have a terminal commonly connected together to form a node that is connected to or, alternatively, forms input terminal $322_C$I(n−1). The other terminal of resistor $332_n$ is connected to the drain terminal of transistor $330_n$ and the other terminal of resistor $334_n$ is connected to a terminal of capacitor $336_n$ to form a node that serves as or, alternatively, is connected to an output terminal $322_C$O(n−1). Resistor $334_{(n+1)}$ has a terminal that is connected to the source terminal of transistor $330_n$ to form a node that may be connected to or, alternatively, serves as input terminal $322_n$I2 and a terminal that serves as or, alternatively, may be connected to output terminal $322_n$O4, which output terminal may be connected to input pin $312P_{(3n+1)}$.

Still referring to FIG. 17, switching sections $316_1$, ..., $316_n$ operate in at least three different operating modes including a filtering continuous observation mode, a sample and hold mode, and a balancing mode. As discussed with reference to FIG. 16, the operating mode may be selected in accordance with the states of switching elements $326_1$, ..., $326_n$, $328_1$, ..., $328_n$, and $331_1$ ..., $331_n$, i.e., combinations in which these switching elements are opened or closed.

Figure 18:
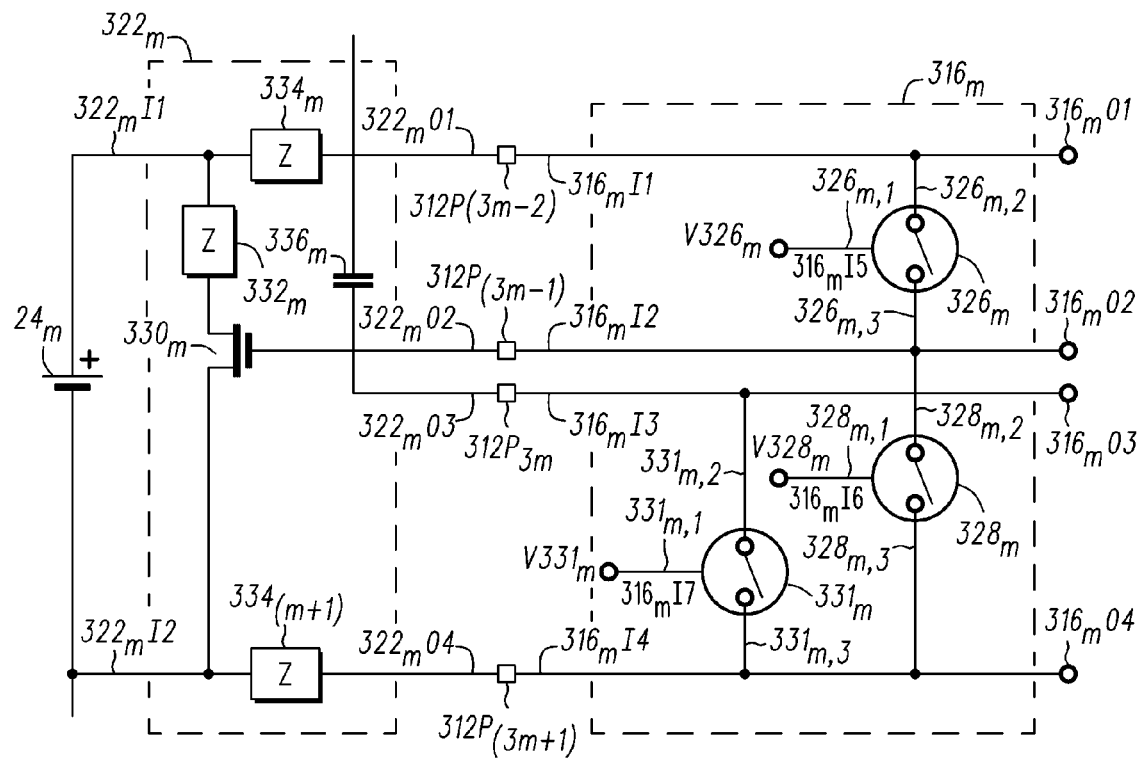
FIG. 18 is a schematic diagram of a portion of a battery monitoring and balancing system in accordance with another embodiment of the present invention.

FIG. 18 is a circuit schematic of a switching section $316_m$ of interface network 316 (described with reference to FIG. 11) connected to a power cell $24_m$ through a filter section $322_m$ in accordance with another embodiment of the present invention. It should be noted that switching networks $316_1$, $316_2$, ..., $316_n$ in FIG. 11 are comprised of switching sections $316_m$ and that the variable m is used to represent integers 1, 2, ..., n. For example, switching network $316_1$ corresponds to switching section $316_m$, where m is replaced by 1, switching network $316_2$ corresponds to switching section $316_m$, where m is replaced by 2, and switching network $316_n$ corresponds to switching section $316_m$, where m is replaced by n. Switching section $316_m$ of FIG. 18 is similar to switching section $316_m$ of FIG. 16, except that one of the terminals of capacitor $336_m$ is not connected to input pin $312P_1$. Thus, capacitor $336_m$ has a terminal connected to input pin $312P_{3m}$ but its other terminal is not connected to input pin $312P_{(3m-1)}$. As discussed with reference to FIG. 12, switching element $326_m$ may be referred to as a balancing switching element and switching element $331_m$ may be referred to as a sampling switching element.

Figure 19:
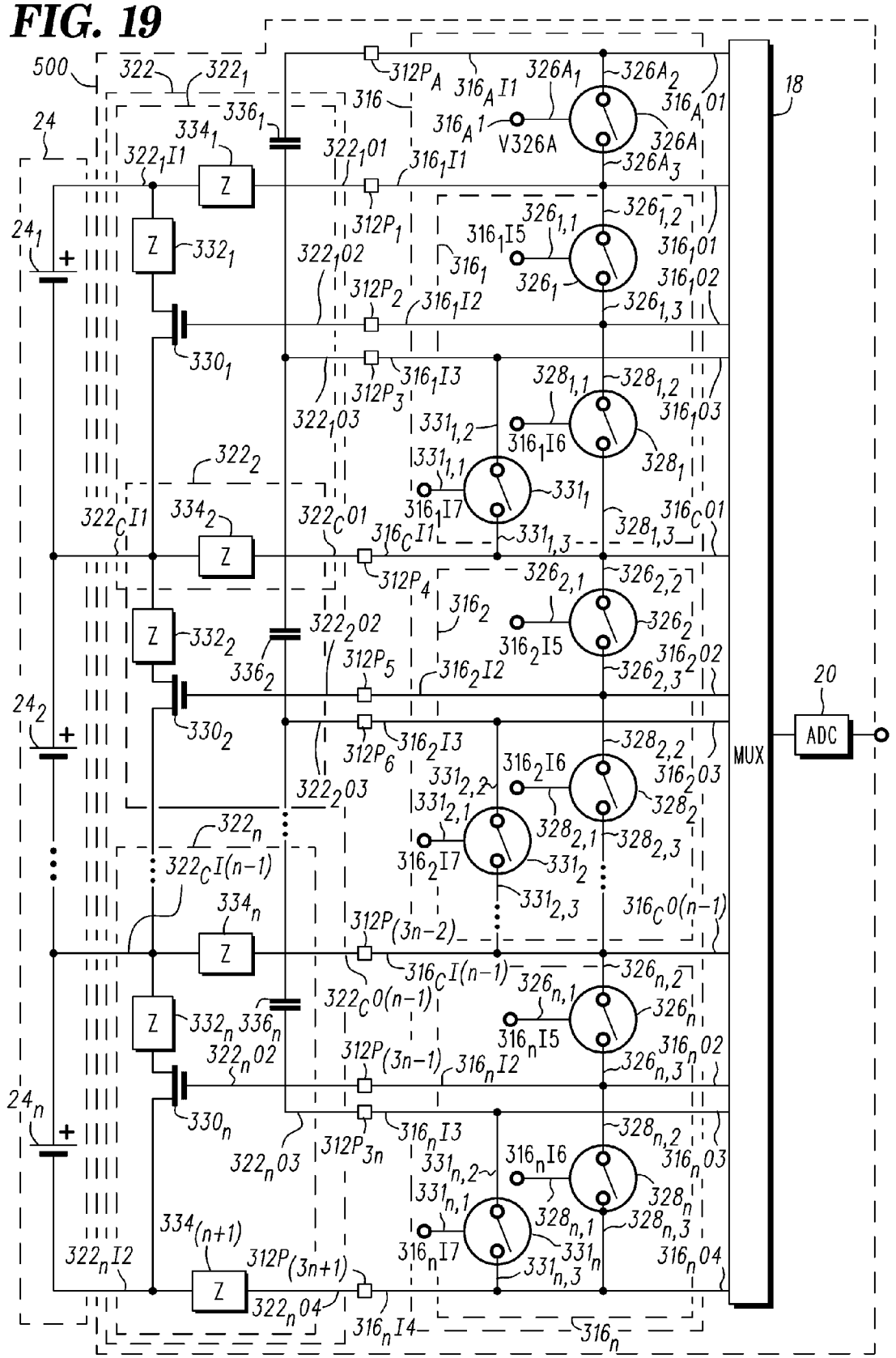
FIG. 19 is a schematic diagram of a portion of a battery monitoring and balancing system in accordance with another embodiment of the present invention.

FIG. 19 is a block diagram of a power cell monitor and control module 500 comprising control module 312 and filter circuit 322 as described with reference to FIGS. 11 and 17, but further including embodiments of circuit implementations of filter circuit 322 and interface circuit 316 described with reference to FIG. 18. Control module 500 is connected to a battery unit 24. Control module 500 is similar to control module 400 except that control module 500 includes balancing structures $330_1$, $330_2$, ..., $330_n$, and balancing structures $332_1$, $332_2$, ..., $332_n$. More particularly and following from the description of control module 400 described with reference to FIG. 15, transistor $330_1$ has a drain terminal connected to input terminal $322_n$I1 through resistor $332_1$, a source terminal connected to input terminal $322_C$I1, and a gate terminal that is connected to input pin $312P_2$. Output terminal $322_1$O1 is connected to input terminal $322_1$I1 through impedance element $334_1$. An energy storage element $336_1$ has a terminal connected to input pin $312P_4$ and a terminal connected to input pin $312P_3$. By way of example, impedance elements $334_1$ and $334_2$ are resistors and energy storage element $336_1$ is a capacitor. Resistors $332_1$ and $334_1$ each have a terminal commonly connected together to form a node that may be connected to or, alternatively, may form input terminal $322_1$I1. The other terminal of resistor $332_1$ is connected to the drain terminal of transistor $330_1$ and the other terminal of resistor $334_1$ is connected to input pin $312P_1$ via an output terminal $322_1O1$. Resistor $334_2$ has a terminal that is connected to the source terminal of transistor $330_1$ to form a node that may be connected to or, alternatively, may serve as input terminal $322_CI1$ and a terminal that serves as or, alternatively, may be connected to output terminal $322_CO1$, which output terminal may be connected to input pin $312P_4$.

Transistor $330_2$ has a drain terminal connected to input terminal $322_CI1$ through resistor $332_2$, a source terminal connected to input terminal $322_CI(n-1)$, and a gate terminal that is connected to input pin $312P_5$ via an output terminal $322_2O2$. Output terminal $322_CO1$ is connected to input terminal $322_CI1$ through impedance element $334_2$. An energy storage element $336_2$ has a terminal connected to input pin $312P_3$ and a terminal connected to input pin $312P_6$. By way of example, impedance element $334_2$ is a resistor and energy storage element $336_2$ is a capacitor. Resistors $332_2$ and $334_2$ each have a terminal commonly connected together to form a node that may be connected to or, alternatively, may form input terminal $322_CI1$. The other terminal of resistor $332_2$ is connected to the drain terminal of transistor $330_2$ and the other terminal of resistor $334_2$ is connected to an input pin $312P_4$ via an output terminal $322_CO1$. It should be noted that similar shared components and connections exist between filter section $322_2$ and another filter section connected to filter section $322_2$ as exist between filter section $322_1$ and filter section $322_2$. For the sake of clarity, not all components of filter section $322_2$ are shown.

Transistor $330_n$ has a drain terminal connected to input terminal $322_CI(n-1)$ through resistor $332_n$, a source terminal connected to input terminal $322_nI2$, and a gate terminal that is connected to input pin $312P_{(3n-1)}$ via an output terminal $322_nO2$. Output terminal $322_nO4$ is connected to input terminal $322_nI2$ through impedance element $334_{(n+1)}$. An energy storage element $336_n$ has a terminal connected to input pin $312P_{3n}$. By way of example, impedance element $334_{(n+1)}$ is a resistor and energy storage element $336_n$ is a capacitor. Resistors $332_n$ and $334_n$ each have a terminal commonly connected together to form a node that may be connected to or, alternatively, may form input terminal $322_CI(n-1)$. The other terminal of resistor $332_n$ is connected to the drain terminal of transistor $330_n$ and the other terminal of resistor $334_n$ is connected to input pin $312P_{(3n-2)}$ via an output terminal $322_CO(n-1)$. Resistor $334_{(n+1)}$ has a terminal that is connected to the source terminal of transistor $330_n$ to form a node that may be connected to or, alternatively, serves as input terminal $322_nI2$ and a terminal that serves as or, alternatively, may be connected to output terminal $322_nO4$, which output terminal $322_nO4$ is connected to input pin $312P_{(3n+1)}$.

In accordance with another embodiment, the polarities of the cells are switched such that the cells have the opposite polarities shown in the figures. Alternatively, the n-channel transistors can be replaced by p-channel transistors.

Still referring to FIG. 19, switching sections $316_1, \ldots, 316_n$ operate in at least three different operating modes including a filtering continuous observation mode, a differential sample and hold mode, and a balancing mode. As discussed above, the operating mode may be selected in accordance with the states of switching elements 326A, $326_1, \ldots, 326_n, 328_1, \ldots, 328_n$, and $331_1, \ldots, 331_n$, i.e., combinations in which these switching elements are opened or closed.

In the filtering continuous observation operating mode, the voltages across power cells $24_1, \ldots, 24_n$ are monitored by configuring switching elements $326_1, \ldots, 326_n$, to be opened and switching elements $328_1, \ldots, 328_n$, $331_1, \ldots, 331_n$, and 326A to be closed. The voltages across power cells $24_1, \ldots, 24_n$ can be monitored by ADC 20 by configuring MUX 18 using techniques similar to those described with reference to FIG. 15.

In the differential sample and hold operating mode, the voltages across power cells $24_1, \ldots, 24_n$ can be sampled and stored or held by applying proper control voltages V326A, $V326_1, \ldots, V326_n, V328_1, \ldots, V328_n$ and $V331_1, \ldots, V331_n$ to the control terminals of switching elements 326A, $326_1, \ldots, 326_n, 328_1, \ldots, 328_n$ and $331_1, \ldots, 331_n$, respectively. For sampling, the switching elements are configured to enable the filtering continuous observation mode. In response to these switching element configurations, capacitors $336_1, \ldots, 336_n$ are charged to voltages substantially equal to the voltages across power cells $24_1, \ldots, 24_n$ i.e., capacitors $336_1, \ldots, 336_n$ sample the voltages of power cells $24_1, \ldots, 24_n$. Capacitors $336_1, \ldots, 336_n$ serve as filters and filter the sampled signals. It should be noted that the on-resistances (Rdson's) of switching elements 326A and $331_1, \ldots, 331_n$, are in series with both terminals of capacitors $336_1, \ldots, 336_n$, which reduces issues associated with common mode noise.

After sampling the voltages of power cells $24_1, \ldots, 24_n$, the information is held on capacitors $336_1, \ldots, 336_n$ by applying control signals V326A and $V331_1, \ldots, V331_n$ to the control terminals of switching elements $326_A$ and $331_1, \ldots, 331_n$, respectively, that are suitable for opening these switching elements. The switching elements $326_1, \ldots, 326_n$ and $328_1, \ldots, 328_n$ do not change state, i.e. they keep the same state as in the filtering continuous observation mode. In response to this switching configuration, capacitors $336_1, \ldots, 336_n$ are isolated from the stack of power cells $24_1, \ldots, 24_n$, thereby holding the voltages that appeared on power cells $24_1, \ldots, 24_n$.

The sampled and hold voltages across power cells $24_1, \ldots, 24_n$ can be monitored by ADC 20 by configuring MUX 18 in much the same way as described with reference to FIG. 15.

In the balancing operating mode, switching elements $331_1, \ldots, 331_n$ and 362A are opened or closed while the voltage across power cells $24_1, \ldots, 24_n$ is balanced using techniques similar to those described with reference to FIGS. 16 and 17.

Figure 20:
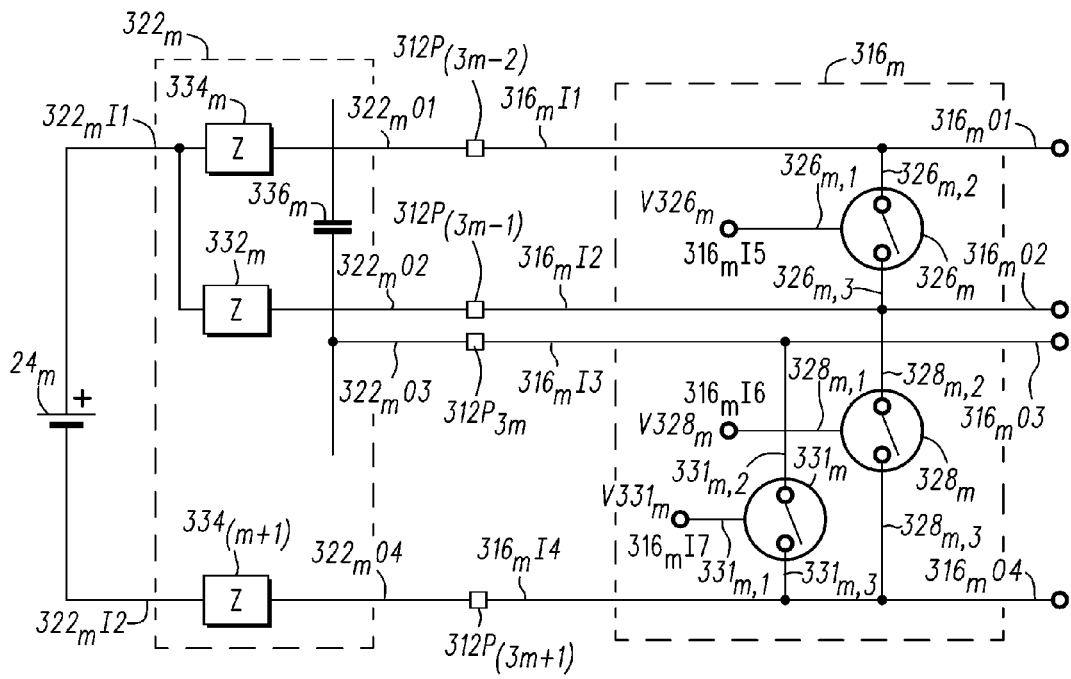
FIG. 20 is a schematic diagram of a portion of a battery monitoring and balancing system in accordance with another embodiment of the present invention.
Figure 21:
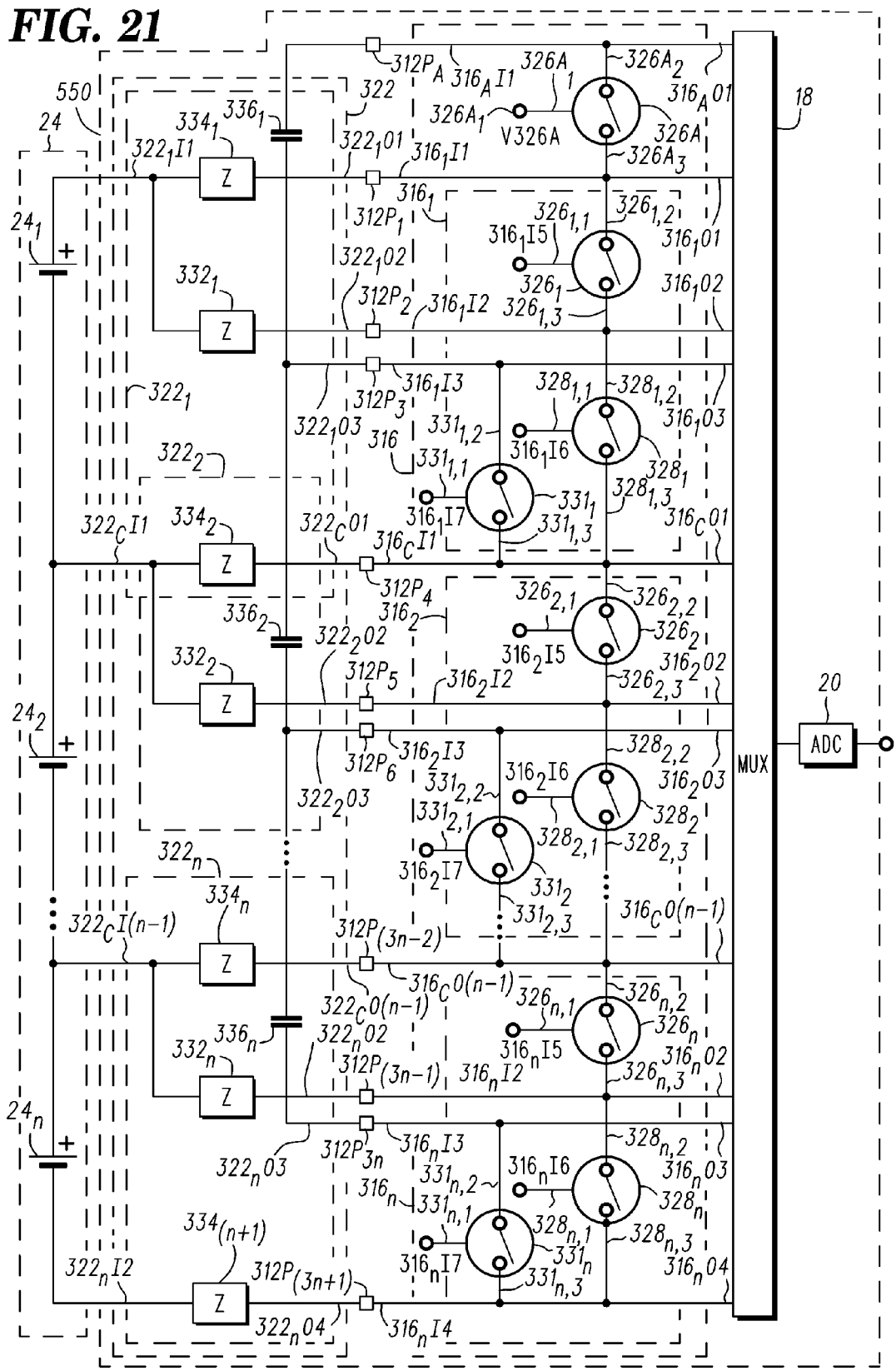
FIG. 21 is a schematic diagram of a portion of a battery monitoring and balancing system in accordance with another embodiment of the present invention.

FIG. 20 is a circuit schematic of a switching section $316_m$ of interface network 316 (described with reference to FIG. 11) connected to a power cell 24 through a filter section 322 in accordance with another embodiment of the present invention. It should be noted that switching networks $316_1$, $316_2, \ldots, 316_n$ in FIG. 21 are comprised of switching sections $316_m$ and that the variable m is used to represent integers $1, 2, \ldots, n$. For example, switching network $316_1$ corresponds to switching section $316_m$, where m is replaced by 1, switching network $316_2$ corresponds to switching section $316_m$, where m is replaced by 2, and switching network $316_n$ corresponds to switching section $316_m$, where m is replaced by n.

Switching section $316_m$ has been described with reference to FIG. 12. It should be noted that switching element $326_m$ is an optional circuit element that is used for balancing in embodiments in which balancing resistor $332_m$ is absent such as the embodiment shown in FIG. 12.

Filter section $322_m$ is similar to the filter section described with reference to FIG. 14, except that it includes a balancing element $332_m$. Output terminal $322_mO1$ is connected to input terminal $322_mI1$ through impedance element $334_m$. An energy storage element $336_m$ has a terminal connected to input pin $312P_{3m}$. By way of example, balancing element $332_m$ and impedance elements $334_m$ and $334_{(m+1)}$ are resistors and energy storage element $336_m$ is a capacitor. Resistors $332_m$ and $334_m$ each have a terminal commonly connected together to form a node that may be connected to or, alternatively, may form input terminal $322_mI1$. The other terminal of resistor $332_m$ is connected to input pin $312P_{(3m-1)}$ via output terminal $322_mO2$. One terminal of capacitor $336_m$ may be connected to or, alternatively, serves as output terminal $322_mO3$, which output terminal is connected to input pin $312P_{3m}$. The other terminal of capacitor $336_m$ may be connected to other circuitry as shown in FIG. 21. Resistor $334_{(m+1)}$ has a terminal that may be connected to or, alternatively, serves as input terminal $322_mI2$ and a terminal that serves as or, alternatively, is connected to output terminal $322_mO4$.

Power cell $24_m$ comprises a battery cell having a positive terminal connected to input terminal $322_mI1$ of filter section $322_m$ and a negative terminal connected to input terminal $322_mI2$ of filter section $322_m$.

It should be noted that output terminal $322_mO1$ is electrically connected to input pin $312P_{(3m-2)}$, output terminal $322_mO2$ is electrically connected to input pin $312P_{(3m-1)}$, output terminal $322_mO3$ is electrically connected to input pin $312P_{3m}$, and output terminal $322_mO4$ is electrically connected to input pin $312P_{(3m+1)}$.

FIG. 21 is a block diagram of a power cell monitor and control module 550 comprising control module 312 and filter circuit 322 as described with reference to FIG. 11, but further including embodiments of circuit implementations of filter circuit 322 and interface circuit 316 described with reference to FIG. 20. Control module 550 is connected to a battery unit 24. Control module 550 is similar to control module 500 except that control module 550 includes balancing structures $332_1, 332_2, \ldots, 332_n$, but not balancing structures $330_1, 330_2, \ldots, 330_n$. More particularly and following from the description of control module 500 described with reference to FIG. 19, output terminal $322_1O1$ is connected to input terminal $322_nI1$ through impedance element $334_1$. An energy storage element $336_1$ has a terminal connected to input pin $312P_4$ and a terminal connected to input pin $312P_3$. By way of example, balancing element $332_1$ and impedance elements $334_1$ and $334_2$ are resistors and energy storage element $336_1$ is a capacitor. Resistors $332_1$ and $334_1$ each have a terminal commonly connected together to form a node that may be connected to or, alternatively, may form input terminal $322_1I1$. The other terminal of resistor $332_1$ may be connected to or alternatively may serve as output terminal $322_1O2$ and the other terminal of resistor $334_1$ is connected to a terminal of capacitor $336_1$ and may form a node that serves as or, alternatively, may be connected to an output terminal $322_1O1$. Output terminal output terminal $322_1O1$ is connected to input pin $312P_1$ and output terminal $322_1O2$ is connected to input pin $312P_2$. Resistor $334_2$ has a terminal that is connected to or, alternatively, serves as input terminal $322_CI1$ and a terminal that may serve as or, alternatively, may be connected to output terminal $322_CO1$.

Output terminal $322_CO1$ is connected to input terminal $322_CI1$ through impedance element $334_2$. An energy storage element $336_2$ has a terminal connected to input pin $312P_3$ and a terminal connected to input pin $312P_6$. By way of example, balancing element $332_2$ and impedance element $334_2$ are resistors and energy storage element $336_2$ is a capacitor. Resistors $332_2$ and $334_2$ each have a terminal commonly connected together to form a node that may be connected to or, alternatively, may form input terminal $322_CI1$. The other terminal of resistor $332_2$ is connected to or, alternatively, serves as output terminal $322_2O2$ and the other terminal of resistor $334_2$ may serve as or, alternatively, may be connected to an output terminal $322_CO1$. Output terminal $322_2O2$ is connected to input pin $312P_5$. It should be noted that similar shared components and connections exist between filter section $322_2$ and another filter section connected to filter section $322_2$ as exist between filter section $322_1$ and filter section $322_2$. For the sake of clarity, not all components of filter section $322_2$ are shown.

Output terminal $322_nO4$ is connected to input terminal $322_nI2$ through impedance element $334_{(n+1)}$. An energy storage element $336_n$ has a terminal connected to input pin $312P_{3n}$ and may serve as output terminal $322_nO3$. By way of example, balancing element $332_n$ and impedance element $334_{(n+1)}$ are resistors and energy storage element $336_n$ is a capacitor. Resistors $332_n$ and $334_n$ each have a terminal commonly connected together to form a node that may be connected to or, alternatively, may form input terminal $322_CI(n-1)$. The other terminal of resistor $332_n$ may be connected to or, alternatively, serves as output terminal $332_nO2$ which may be connected to input pin $312P_{(3n-1)}$ and the other terminal of resistor $334_n$ may be connected to input pin $312P_{(3n-2)}$. Resistor $334_{(n+1)}$ has a terminal that is connected to or, alternatively, may serve as input terminal $322_nI2$ and a terminal that may serve as or, alternatively, may be connected to output terminal $322_nO4$ which output terminal may be connected to input pin $312P_{(3n+1)}$.

In accordance with another embodiment, the polarities of the cells are switched such that the cells have the opposite polarities shown in the figures.

Still referring to FIG. 21, switching networks $316_1, \ldots, 316_n$ operate in at least three different operating modes including a filtering continuous observation mode, a differential sample and hold mode, and a balancing mode. As discussed above, the operating mode may be selected in accordance with the states of switching elements 326A, $326_1, \ldots, 326_n, 328_1, \ldots, 328_n$, and $331_1, \ldots, 331_n$, i.e., combinations in which these switching elements are opened or closed.

In the filtering continuous observation operating mode, the voltages across power cells $24_1, \ldots, 24_n$ are monitored by configuring switching elements $326_1, \ldots, 326_n$, and $328_1, \ldots, 328_n$, to be opened and switching elements $331_1, \ldots, 331_n$, and 326A to be closed. The voltages across power cells $24_1, \ldots, 24_n$ can be monitored by ADC 20 by configuring MUX 18 in much the same way as described with reference to FIG. 15.

In the differential sample and hold operating mode, the voltages across power cells $24_1, \ldots, 24_n$ can be sampled and stored or held and monitored by ADC 20 using techniques and switching configurations similar to those described with reference to FIG. 19.

In the balancing operating mode, switching elements $331_1, \ldots, 331_n$ and 362A are open or closed. For balancing power cell $24_1$, switching element $326_1$ is open and switching element $328_1$ is closed. Accordingly, a balancing current flowing through impedance element $332_1$, switching element $328_1$ and impedance element $334_2$ discharges power cell $24_1$. It should be noted that the voltages across the other power cells may be balanced using similar techniques. As discussed with reference to FIG. 12, switching element $328_m$ may be referred to as a balancing switching element and switching element $331_m$ may be referred to as a sampling switching element. It should be noted that switching elements $326_1, \ldots, 326_n$ are optional circuit elements that may be omitted.

FIG. 22 is a circuit schematic of a switching section 316A$_m$ of interface network 316 (described with reference to FIGS. 14 and 15) connected to a power cell 24$_m$ through a filter section 322$_m$ in accordance with another embodiment of the present invention. Switching section 316A$_m$ is similar to switching section 316$_m$ described with reference to FIG. 14, except current control element 328$_m$, input pin 312P$_{(3m-1)}$, terminal 316$_m$I2, and terminal 316$_m$O2 are absent, conduction terminal 326$_{m,3}$ of current control element 326$_m$ is connected to conduction terminal 331$_{m,3}$ of switching element 331$_m$, and switching section 316A$_m$ further includes a filtering impedance element Z$_f$ that is connected to switching element 331$_m$. Although filtering impedance element Z$_f$ is shown as being connected between terminal 331$_{m,2}$ and terminal 316$_m$I3, this is not a limitation of the present invention. For example, filtering impedance element Z$_f$ may be connected between terminal 331$_{m,3}$ and terminal 316$_m$I4.

Accordingly, FIG. 22 illustrates an embodiment comprising partial integration of a filter impedance element with a filter resistance in the sample and hold path. In accordance with this embodiment, the over-all impedance of the balancing path is decoupled from the filter function, which is beneficial for using filter section 322$_m$ of FIG. 22 in embodiments such as those illustrated in FIGS. 14, 15, 20, and 21 where the balancing currents may be high or elevated and impedance elements 334$m$ and 334($m$+1) are ohmic resistances having low resistance values. Including impedance element Z$_f$ allows the use of smaller filter storage elements 336$_m$ that are substantially independent from impedance elements 334$_m$ and 334$_{(m+1)}$.

Figure 23:
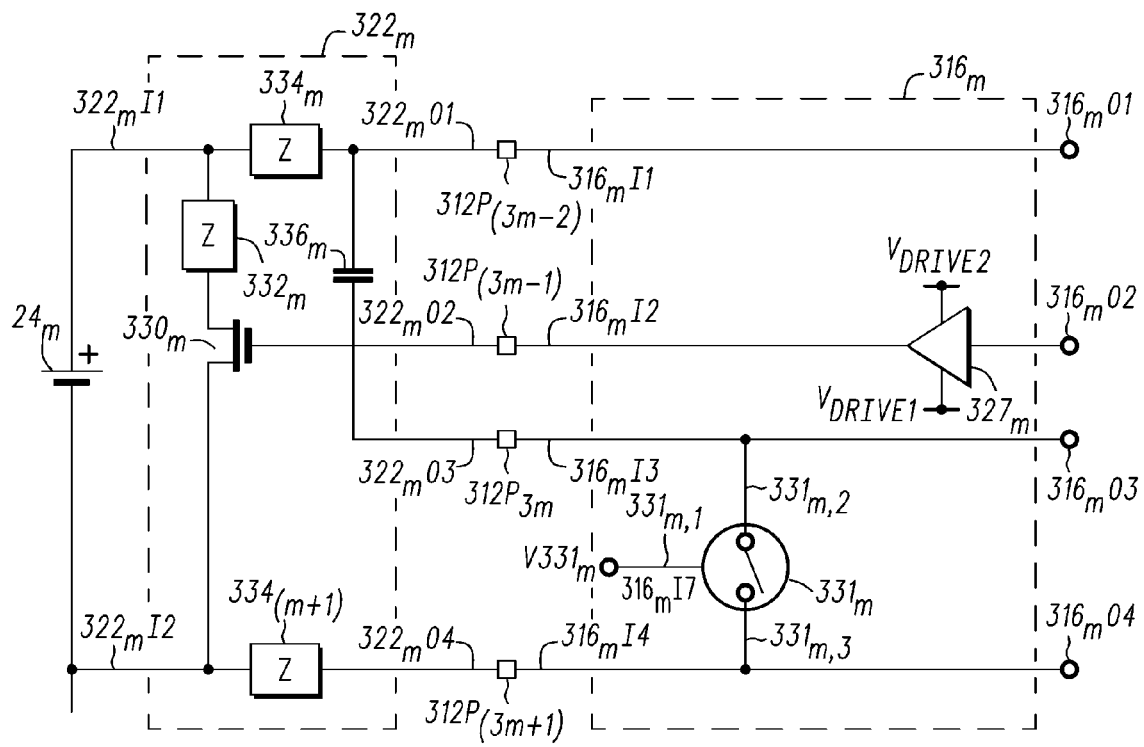
FIG. 23 is a schematic diagram of a portion of a battery monitoring and balancing system in accordance with another embodiment of the present invention.

FIG. 23 is a circuit schematic of a switching section 316$_m$ of interface network 316 (described with reference to FIG. 11) connected to a power cell 24 through a filter section 322 in accordance with another embodiment of the present invention. The embodiment of FIG. 23 is similar to that of FIG. 16, wherein switching elements 326$_m$ and 328$_m$ are replaced by a pre-driver 327$_m$ having an output connected to output pin 312P$_{(3m-1)}$ and an input connected to output terminal 316$_m$O2. Pre-driver 327$_m$ has a terminal coupled for receiving a drive signal V$_{DRIVE1}$ and a terminal coupled for receiving a drive signal V$_{DRIVE2}$. It should be noted that switching elements similar to switching elements 326$_m$ and 328$_m$ are included within pre-driver 327$_m$.

Figure 24:
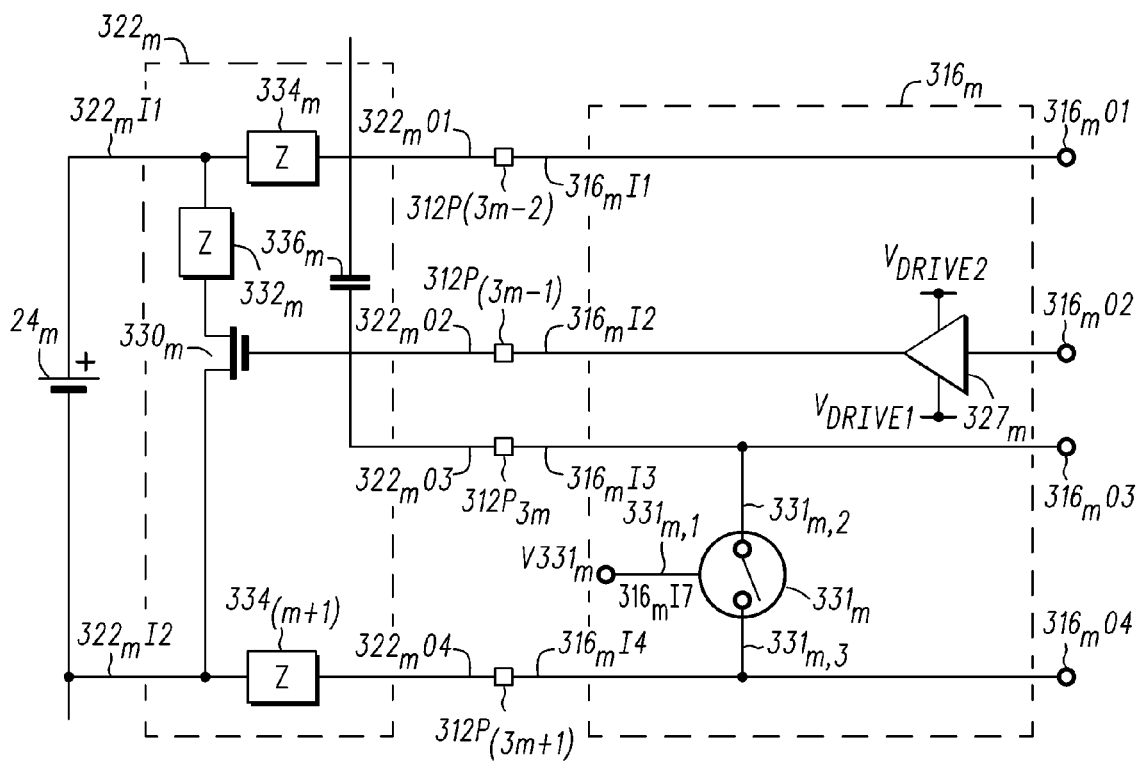
FIG. 24 is a schematic diagram of a portion of a battery monitoring and balancing system in accordance with another embodiment of the present invention.

FIG. 24 is a circuit schematic of a switching section 316$_m$ of interface network 316 (described with reference to FIG. 11) connected to a power cell 24 through a filter section 322 in accordance with another embodiment of the present invention. The embodiment of FIG. 24 is similar to that of FIG. 18, wherein switching elements 326$_m$ and 328$_m$ are replaced by a pre-driver 327$_m$ having an output connected to output pin 312P$_{(3m-1)}$ and an input connected to output terminal 316$_m$O2. Pre-driver 327$_m$ has a terminal coupled for receiving a drive signal V$_{DRIVE1}$ and a terminal coupled for receiving a drive signal V$_{DRIVE2}$. It should be noted that switching elements similar to switching elements 326$_m$ and 328$_m$ are included within pre-driver 327$_m$.

Although specific embodiments have been disclosed herein, it is not intended that the invention be limited to the disclosed embodiments. Those skilled in the art will recognize that modifications and variations can be made without departing from the spirit of the invention. It is intended that the invention encompass all such modifications and variations as fall within the scope of the appended claims. For example, the polarities of the cells may be switched such that the cells have the opposite polarities shown in the figures. Alternatively, the n-channel transistors can be replaced by p-channel transistors.

What is claimed is:
1. A monitor and control circuit, comprising:
a first filter circuit having a first input terminal, a first common input terminal, a first output terminal, a second output terminal, and a first common output terminal, the first input terminal of the first filter circuit configured to be connected to a positive side electrode of a first battery cell and the first common input terminal configured to be connected to a negative side supply electrode of the first battery cell and to a positive side electrode of a second battery cell, the first filter circuit comprising:
a first impedance element having first and second terminals, the first terminal of the first impedance element serving as the first input terminal of the first filter circuit and the second terminal of the first impedance element serving as the first output terminal of the first filter circuit; and
a first common impedance element having first and second terminals, the first terminal of the first common impedance element serving as the first common input terminal of the first filter circuit and the second terminal of the first common impedance element serving as the first common output terminal of the first filter circuit; and
a first capacitor having a first terminal and a second terminal, the first terminal of the first capacitor coupled to the second output terminal of the first filter circuit;
a second filter circuit comprising the first common input terminal, a second common input terminal, a first output terminal, the first common output terminal, and a second common output terminal, the second common input terminal configured to be connected to a negative side electrode of the second battery cell, the second filter circuit comprising:
the first common impedance element;
a second common impedance element having first and second terminals, the first terminal of the second common impedance element serving as the second common input terminal of the second filter circuit and the second terminal of the second common impedance element serving as the second common output terminal of the second filter circuit;
a second capacitor having a first terminal and a second terminal, the first terminal of the second capacitor coupled to the first output terminal of the second filter circuit; and
a switching network having first, second, and third input terminals and first and second switching input terminals, the first input terminal of the switching network coupled to the first output terminal of the first filter circuit, the second input terminal of the switching network coupled to the first common output terminal of the first filter circuit, the first switching input terminal coupled to the second output terminal of the first filter circuit, the third input terminal coupled to the second common output terminal of the second filter circuit, and the second switching input terminal coupled to the first output terminal of the second filter circuit, wherein the switching network comprises:
a first switching element having a control terminal, a first current carrying terminal, and a second current carrying terminal, the first current carrying terminal of the first switching element coupled to the first common output terminal of the first filter circuit, the second current carrying terminal of the first switching element coupled to the second output terminal of the first filter circuit; and a second switching element having a control terminal, a first current carrying terminal, and a second current carrying terminal, the first current carrying terminal of the second switching element coupled to the second common output terminal of the second filter circuit and the second current carrying terminal of the second switching element coupled to the first output terminal of the second filter circuit.

2. The monitor and control circuit of claim 1, further including a third impedance element having a first terminal and a second terminal, the first terminal of the third impedance element coupled to the second current carrying terminal of the second switching element and the second terminal of the third impedance element coupled to the second switching input terminal of the switching network.

3. The monitor and control circuit of claim 1, further including:
a first transistor having a control electrode and first and second current carrying electrodes, the control electrode of the first transistor coupled to the second output terminal of the first filter circuit and the second current carrying electrode of the first transistor coupled to the first common input terminal of the first filter circuit;
a third impedance element having first and second terminals, the first terminal of the third impedance element coupled to the first terminal of the first impedance element and the second terminal of the third impedance element coupled to the first current carrying electrode of the first transistor;
a second transistor having a control electrode and first and second current carrying electrodes, the first current carrying electrode of the second transistor coupled to the first common input terminal and the second current carrying electrode of the second transistor coupled to the second common input terminal; and
a fourth impedance element having first and second terminals, the first terminal of the fourth impedance element coupled to the first common input terminal and the second terminal of the fourth impedance element coupled to the first current carrying electrode of the second transistor.

4. The monitor and control circuit of claim 1, wherein the second terminal of the first capacitor is coupled to the first output terminal of the first filter circuit.

5. The monitor and control circuit of claim 1, further including:
a third impedance element having a first terminal and a second terminal, the first terminal of the third impedance element directly coupled to the second current carrying terminal of the first switching element and the second terminal of the third impedance element directly coupled to the second output terminal of the first filter circuit; and
a fourth impedance element having a first terminal and a second terminal, the first terminal of the fourth impedance element directly coupled to the second current carrying terminal of the second switching element and the second terminal of the fourth impedance element directly coupled to the first output terminal of the second filter circuit.

6. The monitor and control circuit of claim 1, wherein the second terminal of the second capacitor is connected to the first terminal of the first capacitor.

7. A monitor and control circuit having a first terminal configured to be connected to a positive side supply electrode of a first battery cell, a second terminal configured to be connected to a negative side supply electrode of the first battery cell and configured to be connected to a positive side supply electrode of a second battery cell, and a third terminal configured to be connected to a negative side supply electrode of the second battery cell, comprising:
a switching network having a first common terminal, a second common terminal, a third common terminal, a first switching network input terminal, and a second switching network input terminal, the switching network comprising:
a first sampling switch having a control terminal and first and second current carrying terminals, the first current carrying terminal of the first sampling switch coupled to the second common terminal of the switching network and the second current carrying terminal of the first sampling switch coupled to the first switching network input terminal of the switching network;
a second sampling switch having a control terminal and first and second current carrying terminals, the first current carrying terminal of the second sampling switch coupled to the third common terminal of the switching network and the first current carrying terminal of the second sampling switch coupled to the second switching network input terminal of the switching network;
a first impedance element having a first terminal and a second terminal, the first terminal of the first impedance element coupled to the first terminal of the monitor and control circuit and the second terminal of the first impedance element coupled to the first common terminal of the switching network;
a first energy storage element having a first terminal and a second terminal, the first terminal of the first energy storage element coupled to the first switching network input terminal of the switching network;
a second impedance element having a first terminal and a second terminal, the first terminal of the second impedance element coupled to the second terminal of the monitor and control circuit and the second terminal of the second impedance element coupled to the second common terminal of the switching network;
a second energy storage element having a first terminal and a second terminal, the first terminal of the second energy storage element coupled to the second switching network input of the switching network;
a third impedance element having a first terminal and a second terminal, the first terminal of the third impedance element coupled to the third terminal of the monitor and control circuit.

8. The monitor and control circuit of claim 7, further including a fourth impedance element having first and second terminals, the first terminal of the fourth impedance element coupled to the second current carrying terminal of the first sampling switch and the second terminal of the fourth impedance element coupled to the first switching network input terminal of the switching network.

9. The monitor and control circuit of claim 8, further including a fifth impedance element having first and second terminals, the first terminal of the fifth impedance element coupled to the second current carrying terminal of the second sampling switch and the second terminal of the fifth impedance element coupled to the second switching network input terminal of the switching network.

10. The monitor and control circuit of claim 7, wherein the second terminal of the first energy storage element is coupled to the first common terminal of the switching network.

11. The circuit of claim 10, wherein the second terminal of the second energy storage element is connected to the second common terminal of the switching network.

12. The monitor and control circuit of claim 7, wherein the second terminal of the second energy storage element is coupled to the first terminal of the first energy storage element.

13. A circuit, comprising:
a filter circuit having a first terminal configured to be connected to a positive side supply electrode of a first battery cell, a second terminal configured to be connected to a negative side supply electrode of the first battery cell and to a positive side supply electrode of a second battery cell, and a third terminal configured to be connected to a negative side supply electrode of the second battery cell, the filter circuit further including a first common output terminal, a second common output terminal, a third common output terminal, a first filter output terminal, and a second filter output terminal, the filter circuit comprising:
a first impedance element having a first terminal and a second terminal, the first terminal of the first impedance element serving as the first terminal of the filter circuit;
a second impedance element having a first terminal and a second terminal, wherein the first terminal of the second impedance element serves as the second terminal of the filter circuit;
a third impedance element having a first terminal and a second terminal, wherein the first terminal of the third impedance element serves as the third terminal of the filter circuit;
a first energy storage element having a first terminal and a second terminal, the first terminal of the first energy storage element coupled to the first filter output terminal;
a second energy storage element having a first terminal and a second terminal, the first terminal of the second energy storage element coupled to the second filter output terminal;
a switching network having a first common input terminal coupled to the first common output terminal of the filter circuit, a second common input terminal coupled to the second common output terminal of the filter circuit, a third common input terminal coupled to the third common output terminal of the filter circuit, a first switching network input terminal coupled to the first filter output terminal, and a second switching network input terminal coupled to the second filter output terminal, wherein the switching network further comprises a first switch having a control terminal and first and second terminals, the first terminal of the first switch coupled to the second common input terminal of the switching network and the second terminal of the first switch coupled to the first switching network input terminal of the switching network.

14. The circuit of claim 13, wherein the second terminal of the second energy storage element is coupled to the first terminal of the first energy storage element.

15. The circuit of claim 13, wherein the second terminal of the first energy storage element is coupled to the first common output terminal of the filter circuit and to the first common input terminal of the switching network.

16. The circuit of claim 15, wherein the second terminal of the second energy storage element is coupled to the second common output terminal of the filter circuit and to the second common input terminal of the switching network.

17. The circuit of claim 13, further including:
a fourth impedance element having a first terminal and a second terminal, the first terminal of the fourth impedance element directly coupled to the second terminal of the first switch and the second terminal of the fourth impedance element directly coupled to the first switching network input terminal of the switching network.

18. The circuit of claim 17, further including a second switch having a control terminal and first and second terminals, the first terminal of the second switch coupled to the third common input terminal of the switching network and the second terminal of the second switch coupled to the second switching network input terminal of the switching network.

19. The circuit of claim 18, further including:
a fifth impedance element having a first terminal and a second terminal, the first terminal of the fifth impedance element directly coupled to the second terminal of the second switch and the second terminal of the fifth impedance element directly coupled to the second switching network input terminal of the switching network.

20. The circuit of claim 13, further including a second switch having a control terminal and first and second terminals, the first terminal of the second switch coupled to the third common input terminal of the switching network and the second terminal of the second switch coupled to the second switching network input terminal of the switching network.

* * * * *